US012574442B2

(12) United States Patent　　　　(10) Patent No.:　US 12,574,442 B2
Deitel et al.　　　　　　　　　　　　(45) Date of Patent:　　Mar. 10, 2026

(54) TECHNIQUES FOR MANAGING CONNECTIONS BETWEEN COMPUTER SYSTEMS

(71) Applicant: Apple Inc., Cupertino, CA (US)

(72) Inventors: Joshua D. Deitel, San Francisco, CA (US); Vincenzo O. Giuliani, Thousand Oaks, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/649,288

(22) Filed: Apr. 29, 2024

(65) Prior Publication Data

US 2024/0406267 A1　　Dec. 5, 2024

Related U.S. Application Data

(60) Provisional application No. 63/471,048, filed on Jun. 5, 2023.

(51) Int. Cl.
　H04L 67/125　　　(2022.01)
　H04L 9/40　　　　(2022.01)
(52) U.S. Cl.
　CPC ............ H04L 67/125 (2013.01); H04L 63/08 (2013.01)
(58) Field of Classification Search
　CPC .............................. H04L 67/125; H04L 63/08
　See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,732,193 B2 * | 5/2014 | Skeen ................. G06F 16/9537 |
| | | | 705/26.1 |
| 9,348,458 B2 | 5/2016 | Hotelling et al. | |
| 9,933,937 B2 | 4/2018 | Lemay et al. | |
| 9,973,910 B1 | 5/2018 | Dannamaneni et al. | |

(Continued)

FOREIGN PATENT DOCUMENTS

| | | |
|---|---|---|
| CN | 104735878 B | 7/2018 |
| KR | 2016-0150612 A | 12/2016 |

(Continued)

OTHER PUBLICATIONS

U.S. Appl. No. 60/936,562, filed Jun. 20, 2007.

(Continued)

*Primary Examiner* — Minh Chau Nguyen
(74) *Attorney, Agent, or Firm* — BAKERHOSTETLER; Kyle B. Morse; Benjamin Bolin

(57) ABSTRACT

The present disclosure generally relates to managing connections between computer systems.

54 Claims, 42 Drawing Sheets

(56)         References Cited

U.S. PATENT DOCUMENTS

| | | | |
|---|---|---|---|
| 10,298,567 B1 | 5/2019 | Chew et al. | |
| 11,275,405 B2 | 3/2022 | Hotelling | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2012/0268365 A1 | 10/2012 | Lee et al. | |
| 2013/0154486 A1 | 6/2013 | Barrilleaux | |
| 2015/0035440 A1 | 2/2015 | Spero | |
| 2015/0126806 A1 | 5/2015 | Barroso et al. | |
| 2015/0237470 A1 | 8/2015 | Mayor et al. | |
| 2016/0173929 A1 | 6/2016 | Klappert et al. | |
| 2016/0313902 A1 | 10/2016 | Hill et al. | |
| 2018/0167547 A1 | 6/2018 | Casey et al. | |
| 2018/0253145 A1 | 9/2018 | Swaminathan et al. | |
| 2019/0145615 A1 | 5/2019 | Newton et al. | |
| 2019/0334782 A1* | 10/2019 | Dellinger .......... | H04W 52/0267 |
| 2020/0279539 A1 | 9/2020 | Triverio et al. | |
| 2020/0304863 A1 | 9/2020 | Domm et al. | |
| 2020/0379711 A1 | 12/2020 | Graham et al. | |
| 2020/0379730 A1 | 12/2020 | Graham et al. | |
| 2021/0289262 A1* | 9/2021 | O'Connor ........... | H04N 21/251 |
| 2021/0304078 A1* | 9/2021 | Holland ................ | G06Q 50/40 |
| 2022/0100265 A1 | 3/2022 | Kies et al. | |
| 2022/0155946 A1 | 5/2022 | Sharifi et al. | |
| 2023/0066232 A1* | 3/2023 | Caro ................. | H04B 7/18517 |
| 2023/0098814 A1* | 3/2023 | Carrigan ................ | G06F 3/165 |
| | | | 715/716 |

FOREIGN PATENT DOCUMENTS

| | | | |
|---|---|---|---|
| WO | WO 2013/169849 A2 | 11/2013 | |
| WO | WO 2014/105276 A1 | 7/2014 | |

OTHER PUBLICATIONS

International Patent Application No. PCT/US2024/032194; Invitation to Pay Add'l Fees; dated Sep. 19, 2024; 12 pages.

Marquardt et al.; "Gradual Engagement: Facilitating Information Exchange between Digital Devices as a Function of Proximity"; ACM Int'l Conf. on Interactive Tabletops and Surfaces; 2012; 10 pages.

International Patent Application No. PCT/US2024/032396; Int'l Search Report and the Written Opinion; dated Sep. 25, 2024; 17 pages.

International Patent Application No. PCT/US2024/032189; Invitation to Pay Add'l Fees; dated Sep. 25, 2024; 10 pages.

T. Ricker; "This inexpensive backlight makes your big TV even more immersive"; The Verge; Jul. 8, 2021; p. 1-19, Vox Media, https://www.theverge.com/22566408/govee-immersion-ambilight-tv-backlight-review.

International Patent Application No. PCT/US2024/020808; Invitation to Pay Add'l Fees; dated Jul. 2, 2024; 16 pages.

International Patent Application No. PCT/US2024/020808; Int'l Search Report and the Written Opinion; dated Aug. 23, 2024; 21 pages.

International Patent Application No. PCT/US2024/032194; Int'l Search Report and the Written Opinion; dated Nov. 12, 2024; 18 pages.

International Patent Application No. PCT/US2024/032189; Int'l Search Report and the Written Opinion; dated Nov. 20, 2024; 18 pages.

International Patent Application No. PCT/US2024/053238; Invitation to Pay Add'l Fees; dated Jan. 31, 2025; 11 pages.

International Patent Application No. PCT/US2024/053238; Int'l Search Report and the Written Opinion; dated Mar. 24, 2025; 18 pages.

International Patent Application No. PCT/US2025/017399; Invitation to Pay Add'l Fees; dated Apr. 23, 2025; 11 pages.

U.S. Appl. No. 18/652,558; Non-Final Office Action; dated Jun. 16, 2025; 9 pages.

International Patent Application No. PCT/US2025/017399; Int'l Search Report and the Written Opinion; dated Jun. 17, 2025; 19 pages.

International Patent Application No. PCT/US2025/018166; Int'l Search Report and the Written Opinion; dated Aug. 19, 2025; 16 pages.

U.S. Appl. No. 18/643,722; Non-Final Office Action; dated Sep. 12, 2025; 12 pages.

* cited by examiner

Portable Multifunction Device
100

450
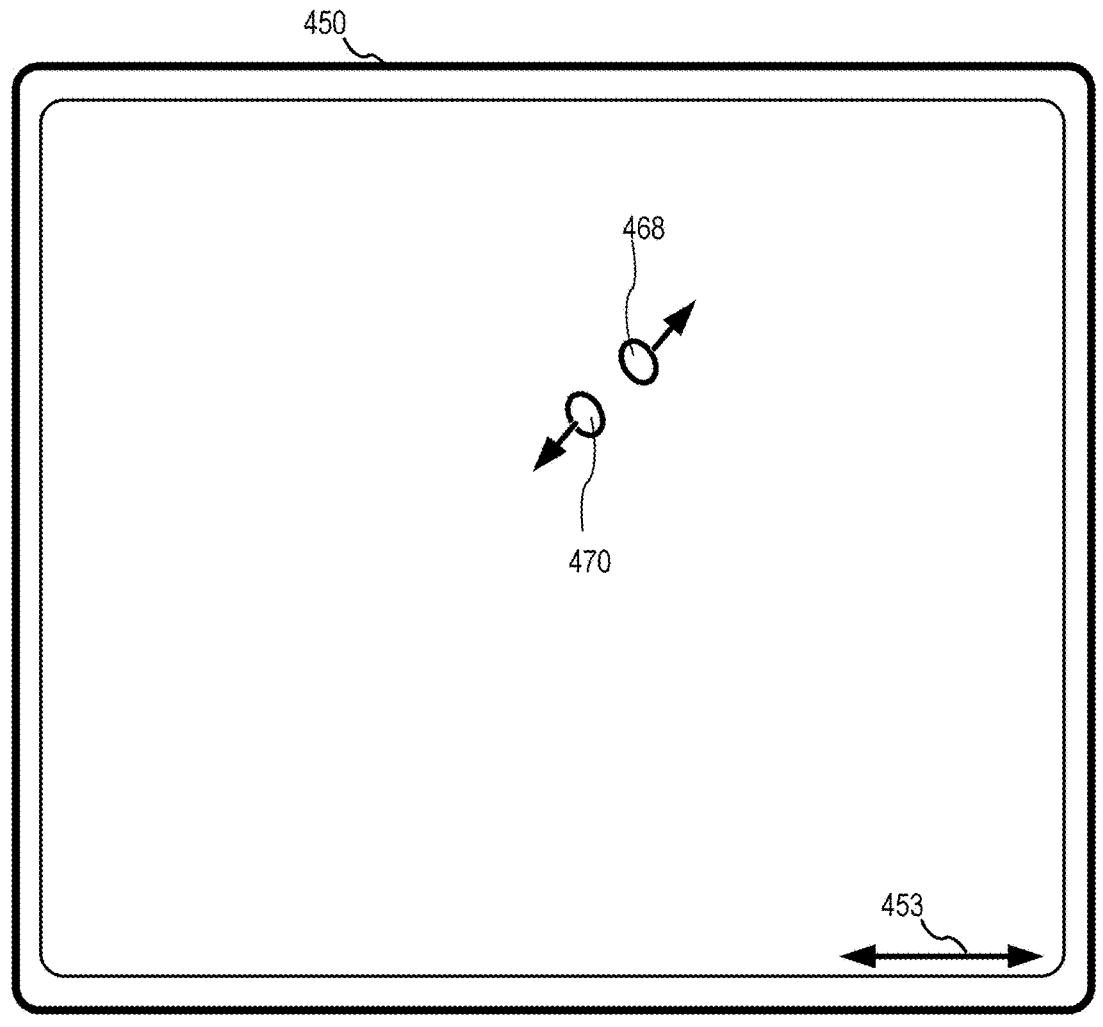
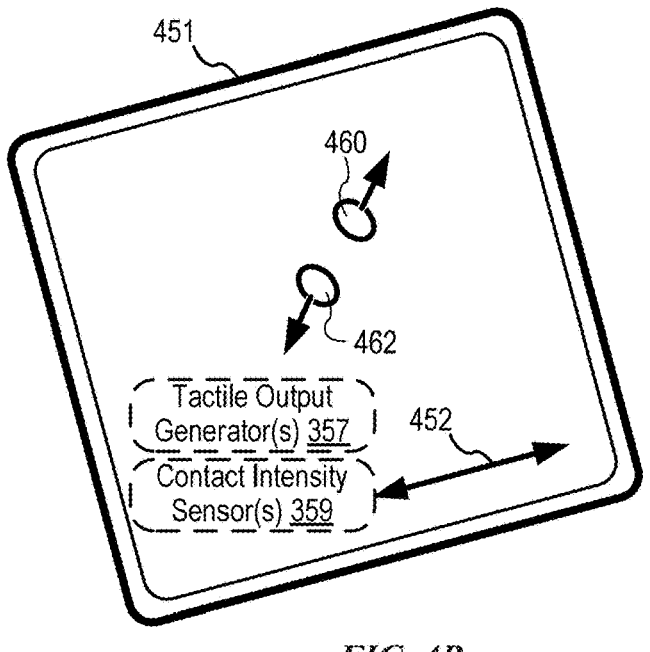
*FIG. 4B*

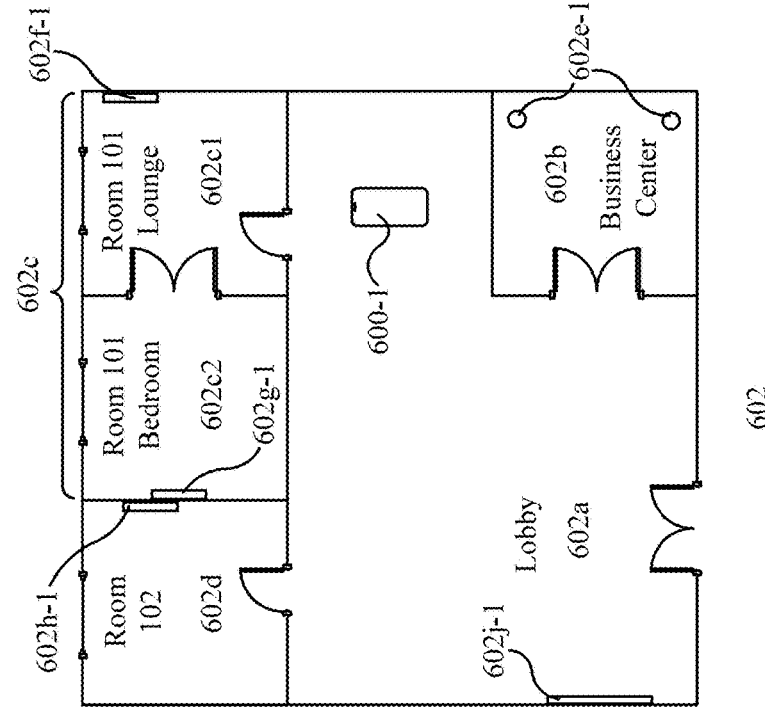
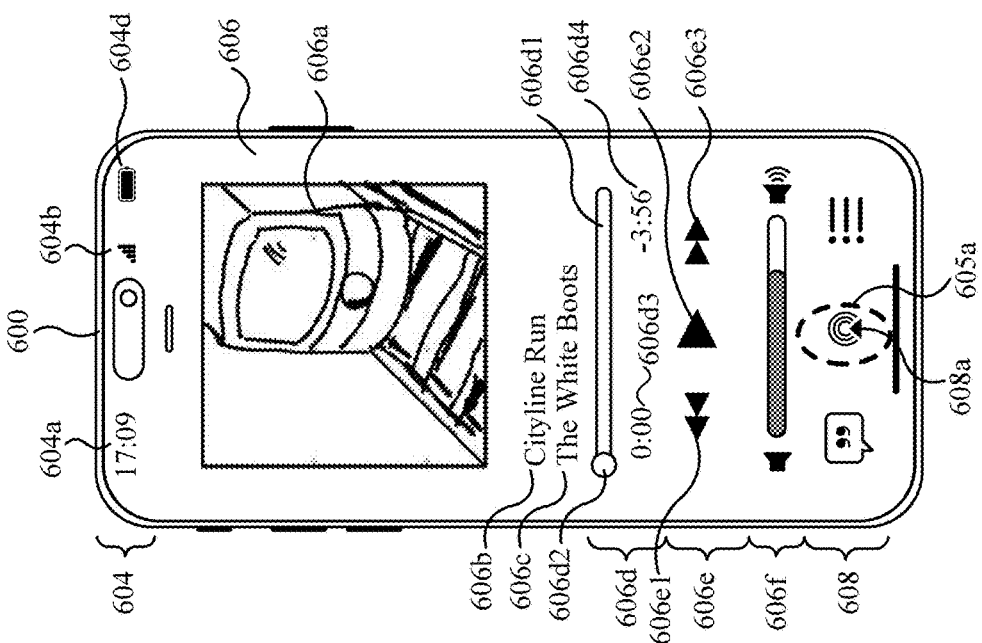
*FIG. 6A*

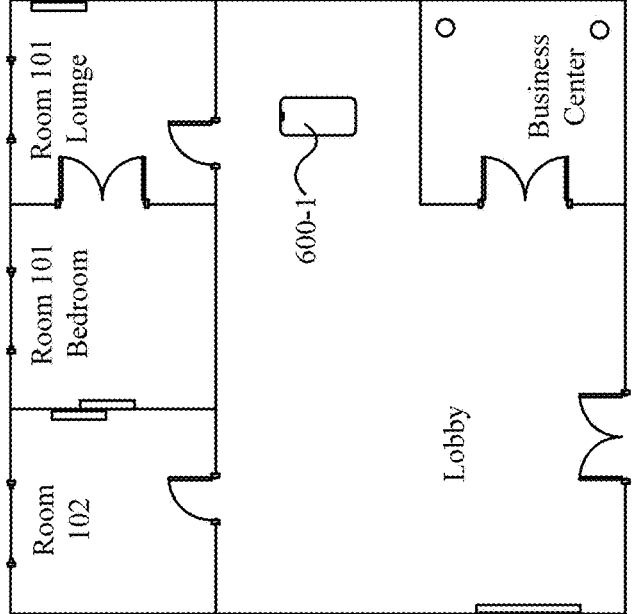
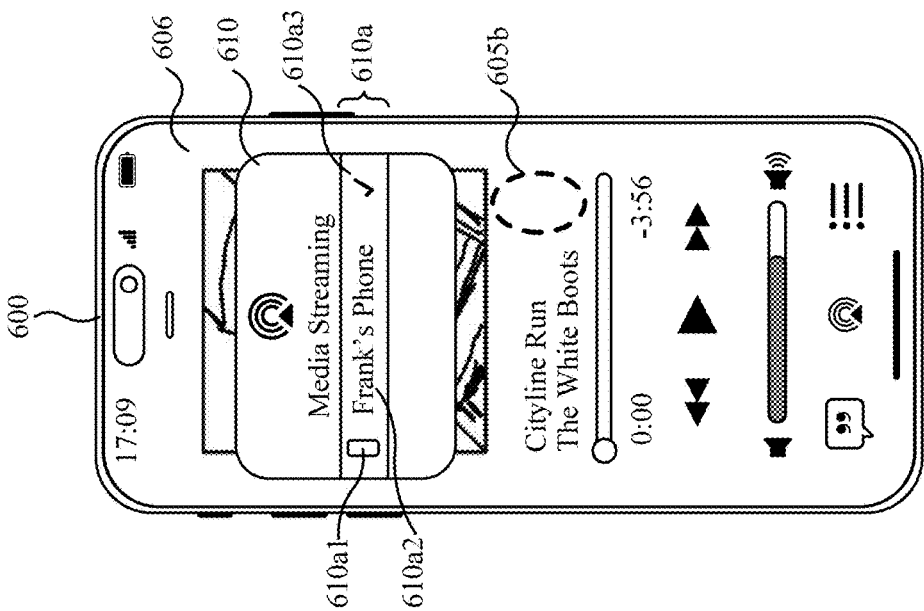
*FIG. 6B*

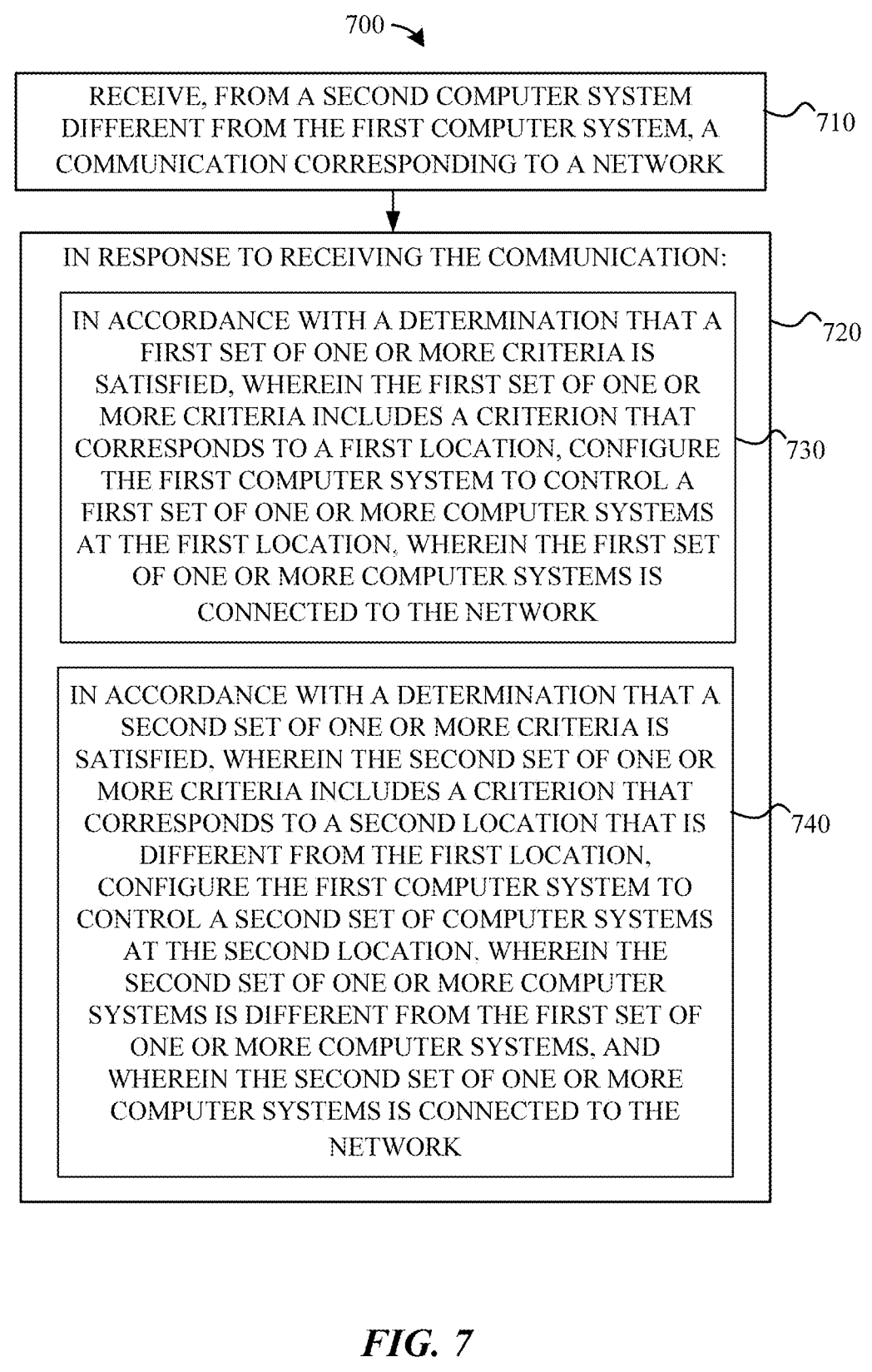

700

RECEIVE, FROM A SECOND COMPUTER SYSTEM DIFFERENT FROM THE FIRST COMPUTER SYSTEM, A COMMUNICATION CORRESPONDING TO A NETWORK    710

IN RESPONSE TO RECEIVING THE COMMUNICATION:    720

IN ACCORDANCE WITH A DETERMINATION THAT A FIRST SET OF ONE OR MORE CRITERIA IS SATISFIED, WHEREIN THE FIRST SET OF ONE OR MORE CRITERIA INCLUDES A CRITERION THAT CORRESPONDS TO A FIRST LOCATION, CONFIGURE THE FIRST COMPUTER SYSTEM TO CONTROL A FIRST SET OF ONE OR MORE COMPUTER SYSTEMS AT THE FIRST LOCATION, WHEREIN THE FIRST SET OF ONE OR MORE COMPUTER SYSTEMS IS CONNECTED TO THE NETWORK    730

IN ACCORDANCE WITH A DETERMINATION THAT A SECOND SET OF ONE OR MORE CRITERIA IS SATISFIED, WHEREIN THE SECOND SET OF ONE OR MORE CRITERIA INCLUDES A CRITERION THAT CORRESPONDS TO A SECOND LOCATION THAT IS DIFFERENT FROM THE FIRST LOCATION, CONFIGURE THE FIRST COMPUTER SYSTEM TO CONTROL A SECOND SET OF COMPUTER SYSTEMS AT THE SECOND LOCATION, WHEREIN THE SECOND SET OF ONE OR MORE COMPUTER SYSTEMS IS DIFFERENT FROM THE FIRST SET OF ONE OR MORE COMPUTER SYSTEMS, AND WHEREIN THE SECOND SET OF ONE OR MORE COMPUTER SYSTEMS IS CONNECTED TO THE NETWORK    740

*FIG. 7*

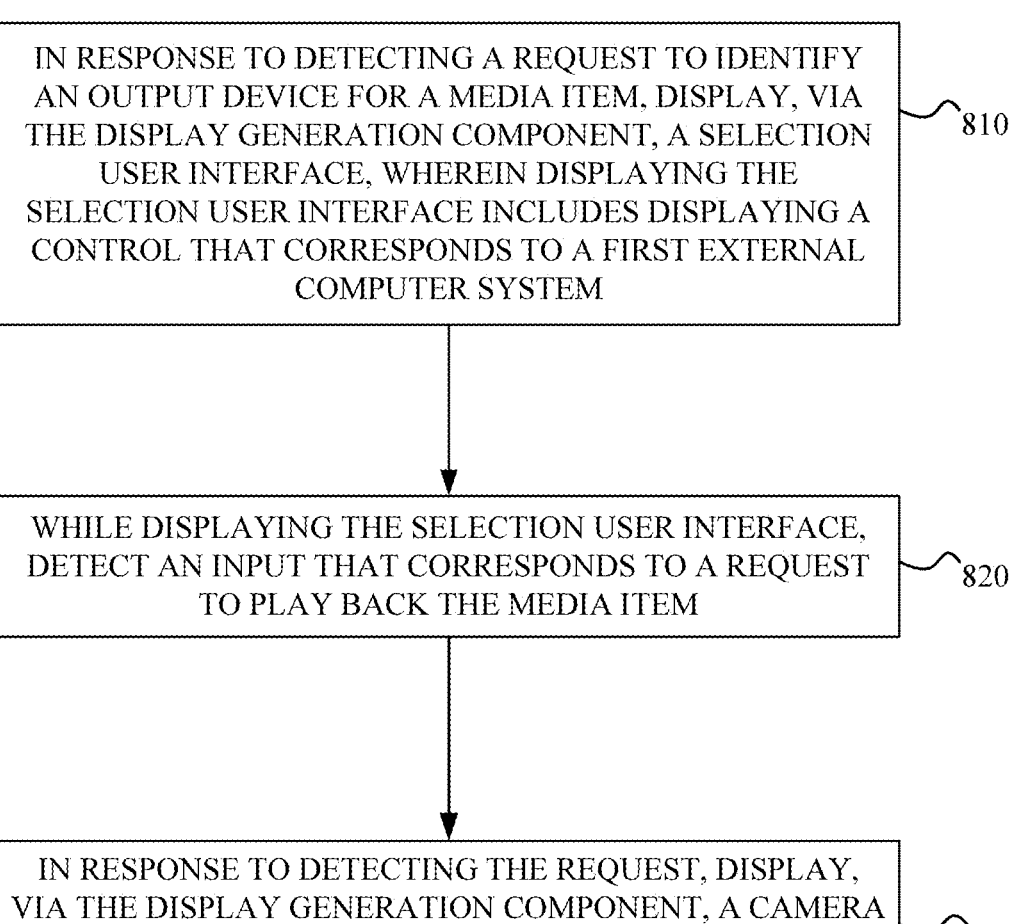

800

IN RESPONSE TO DETECTING A REQUEST TO IDENTIFY
AN OUTPUT DEVICE FOR A MEDIA ITEM, DISPLAY, VIA
THE DISPLAY GENERATION COMPONENT, A SELECTION
USER INTERFACE, WHEREIN DISPLAYING THE
SELECTION USER INTERFACE INCLUDES DISPLAYING A
CONTROL THAT CORRESPONDS TO A FIRST EXTERNAL
COMPUTER SYSTEM                                          810

WHILE DISPLAYING THE SELECTION USER INTERFACE,
DETECT AN INPUT THAT CORRESPONDS TO A REQUEST
TO PLAY BACK THE MEDIA ITEM                               820

IN RESPONSE TO DETECTING THE REQUEST, DISPLAY,
VIA THE DISPLAY GENERATION COMPONENT, A CAMERA
USER INTERFACE                                           830

*FIG. 8*

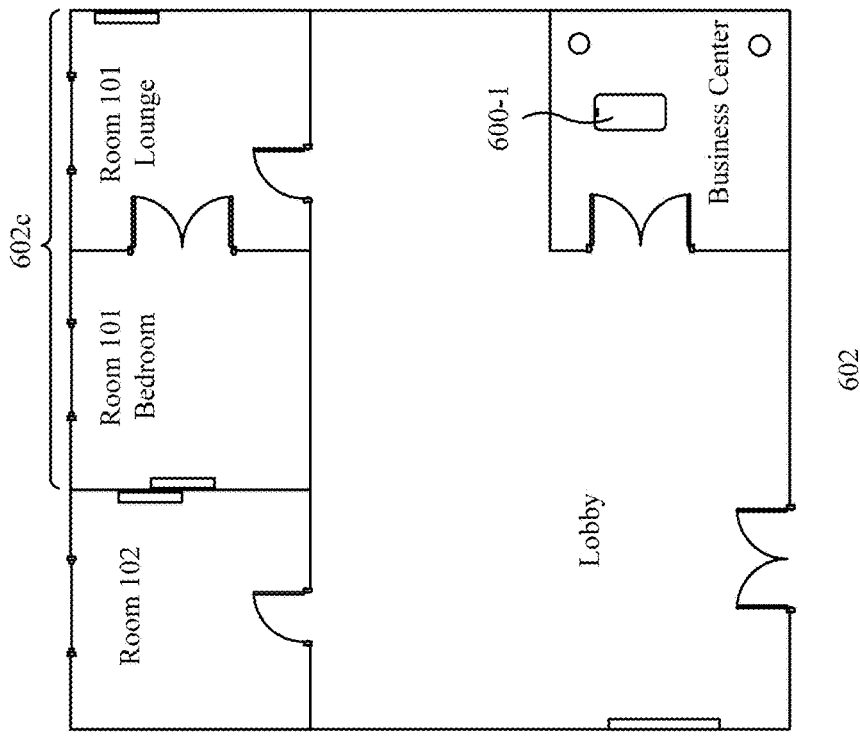
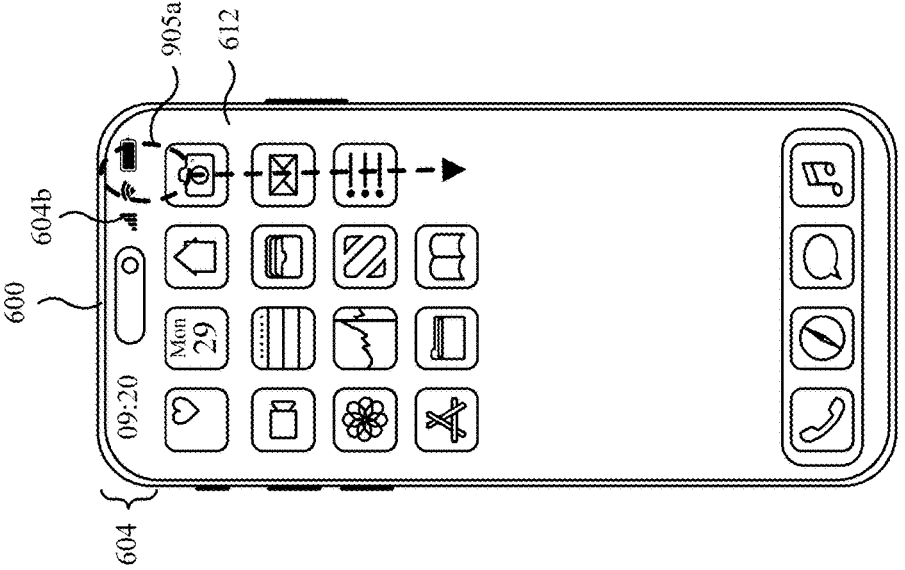
*FIG. 9A*

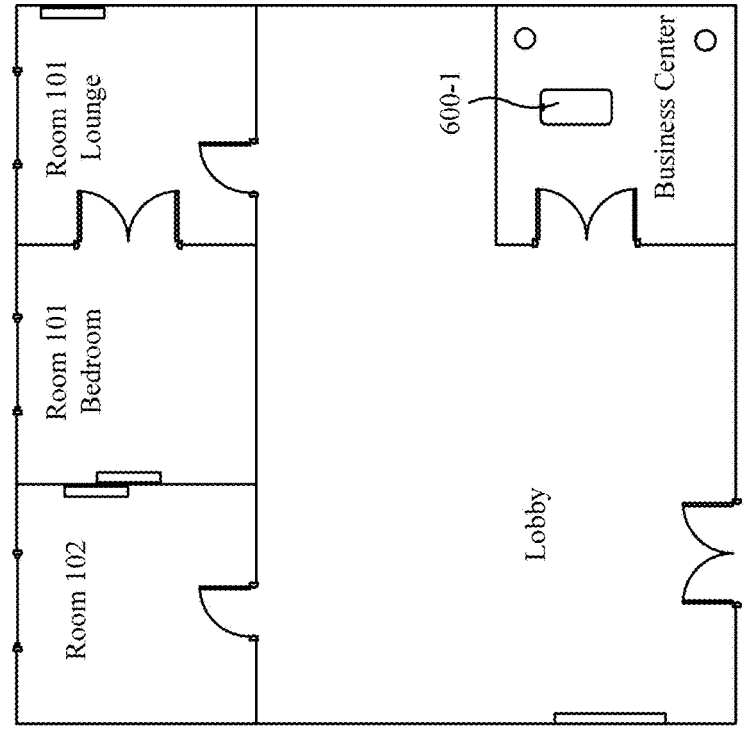
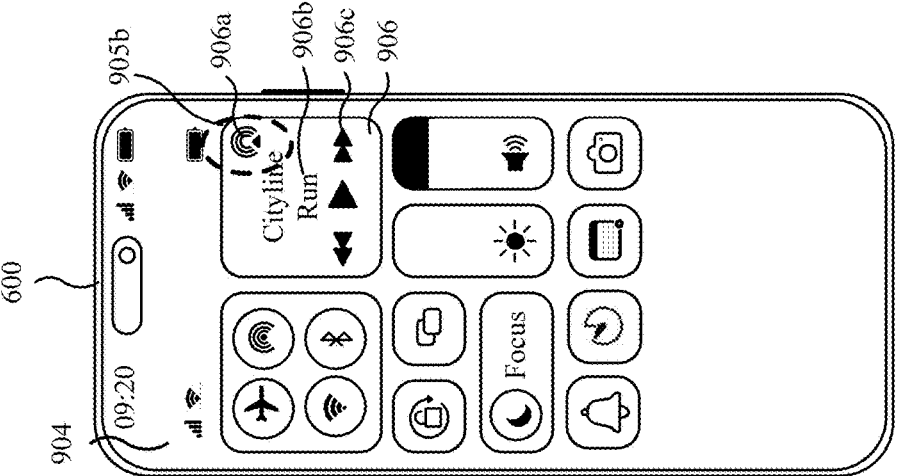
*FIG. 9B*

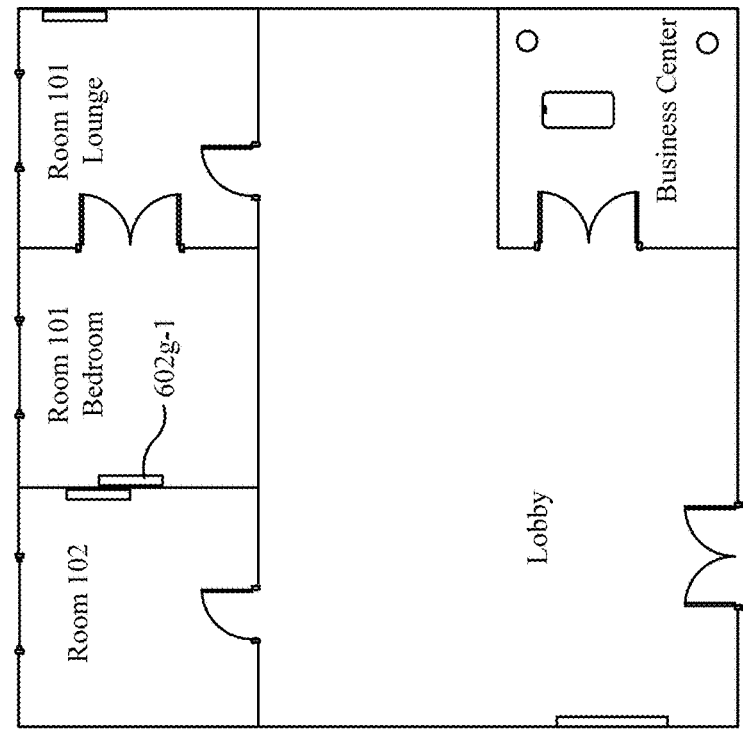
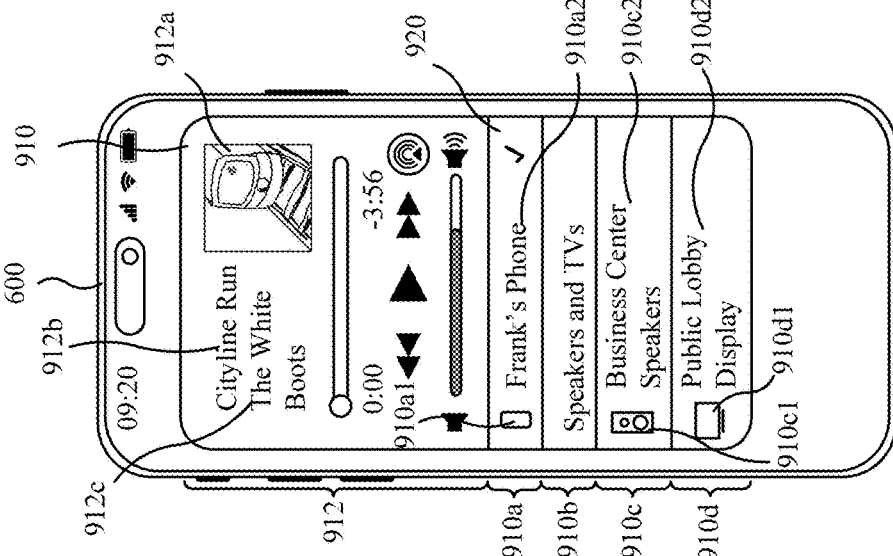
*FIG. 9C*

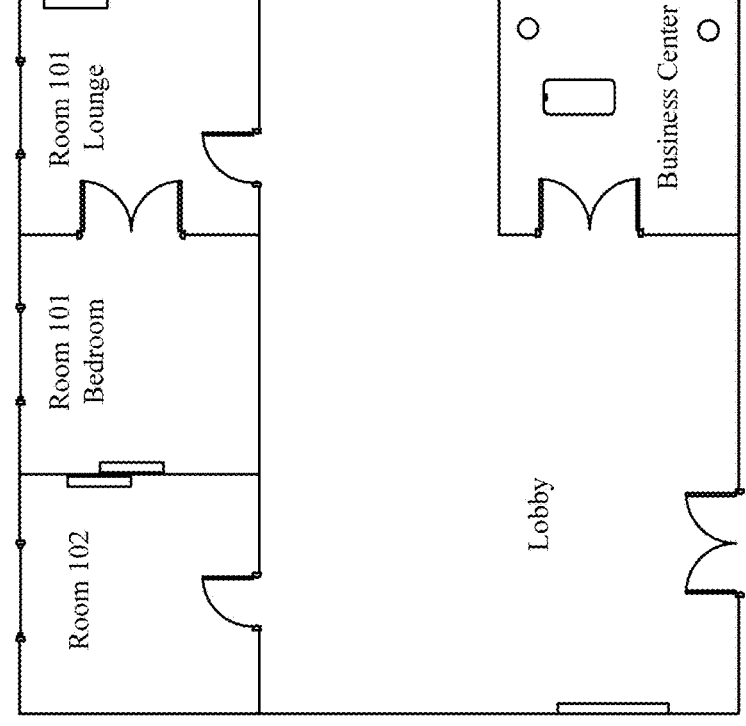
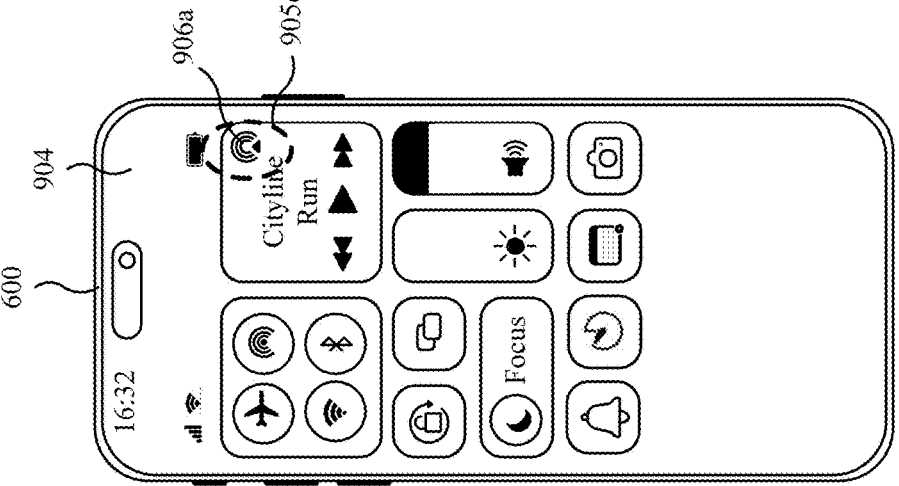
*FIG. 9D*

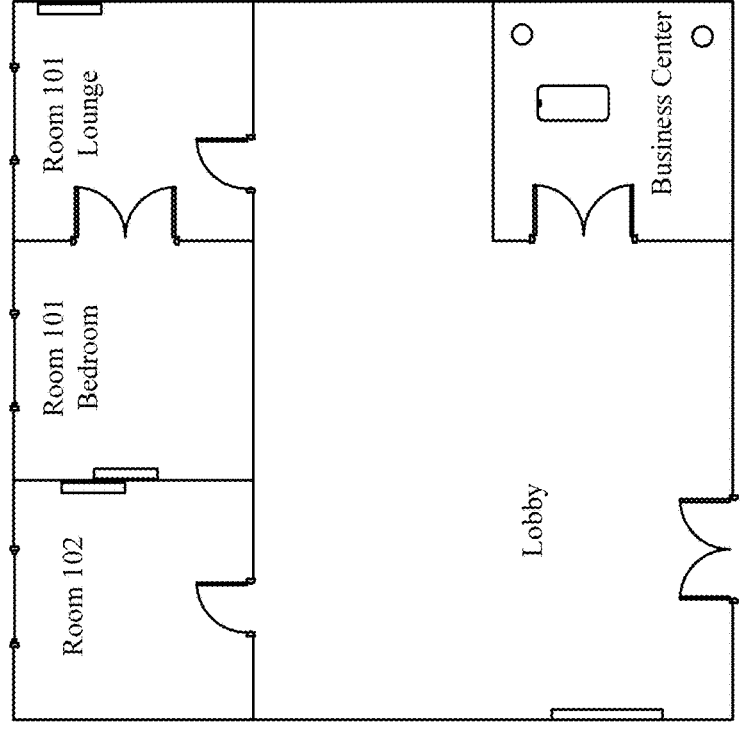
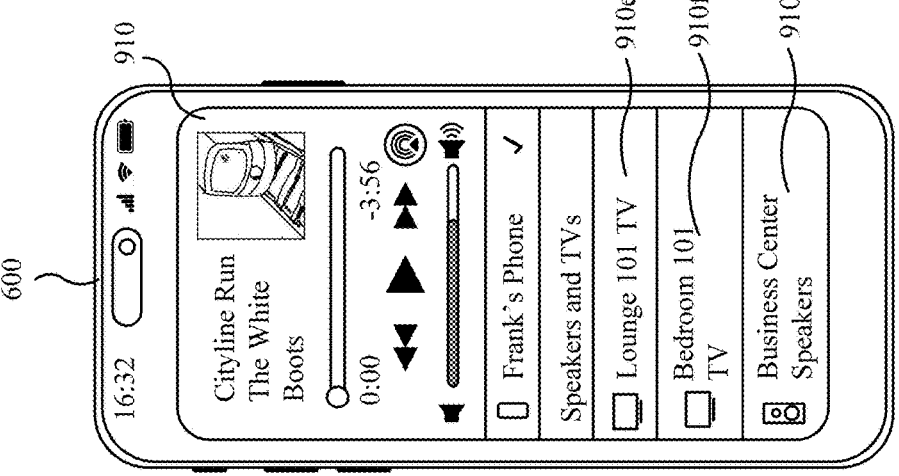
*FIG. 9E*

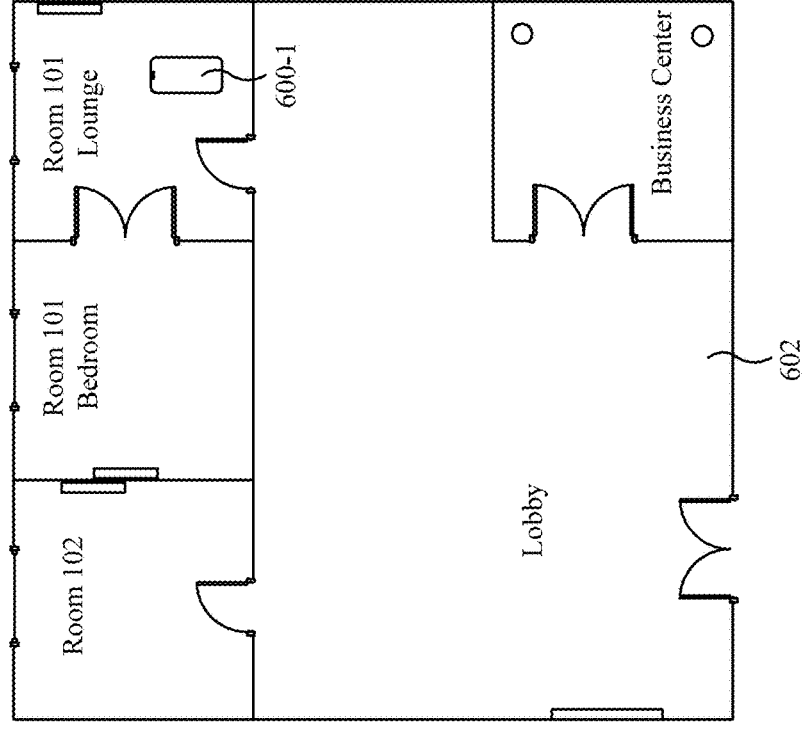
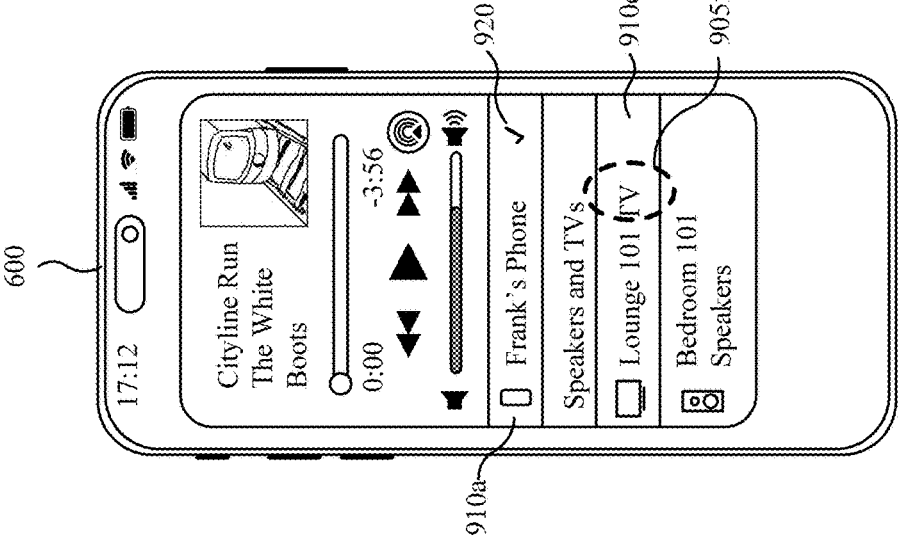
*FIG. 9F*

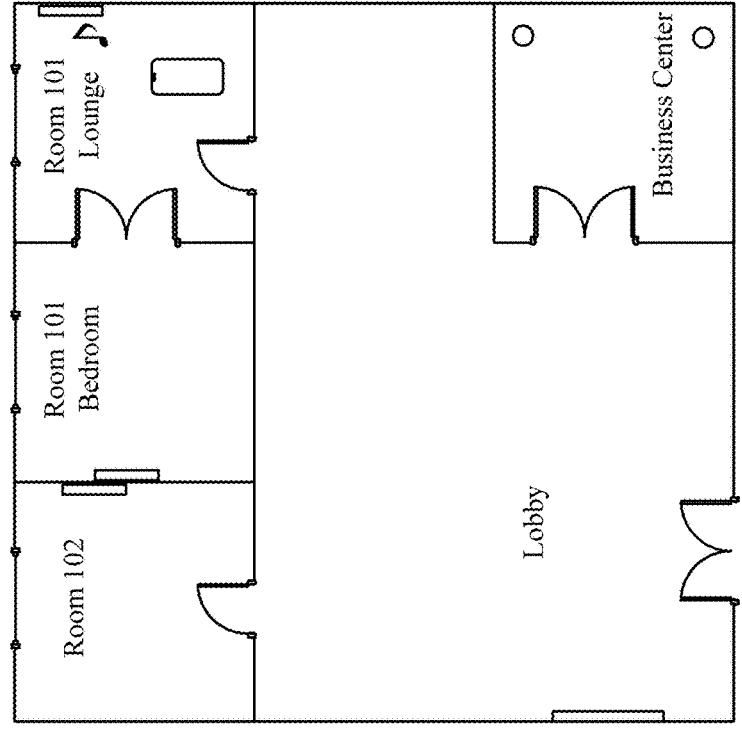
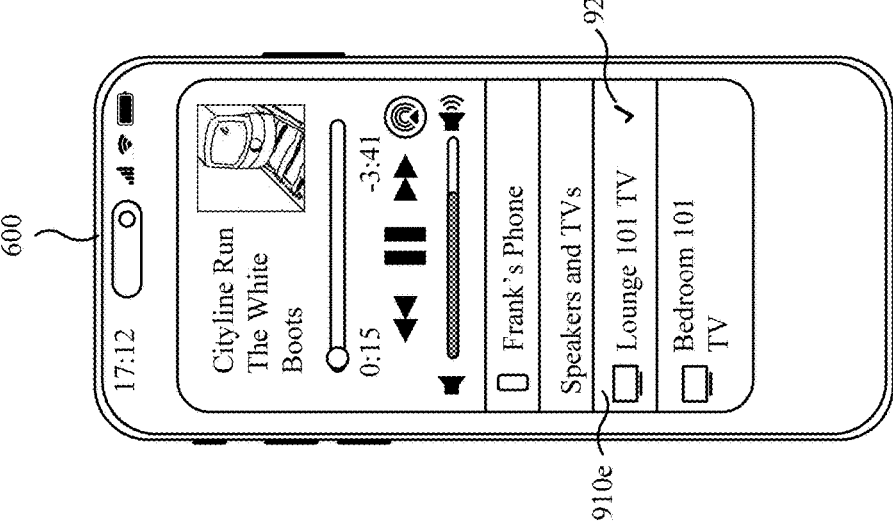
*FIG. 9G*

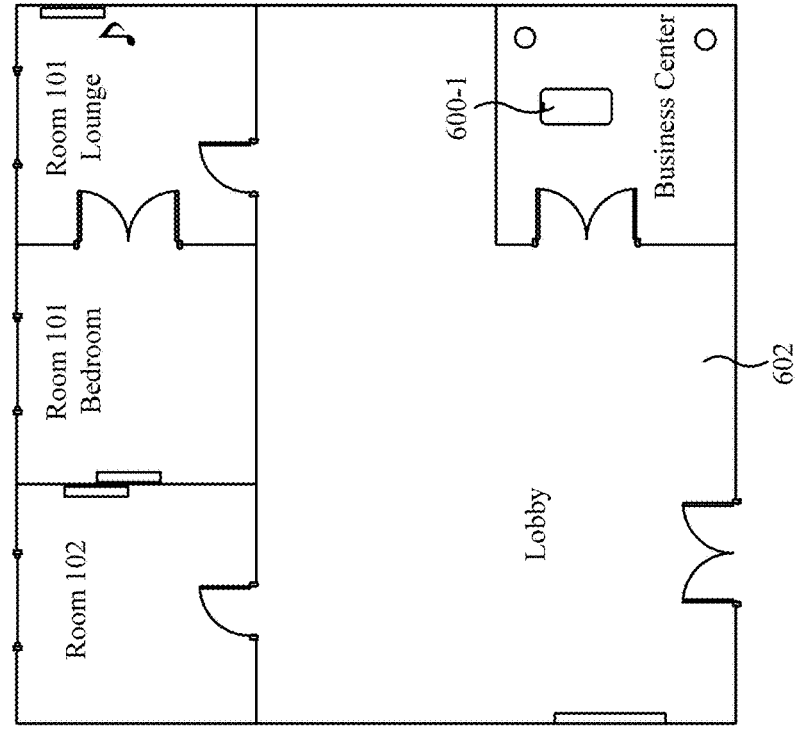
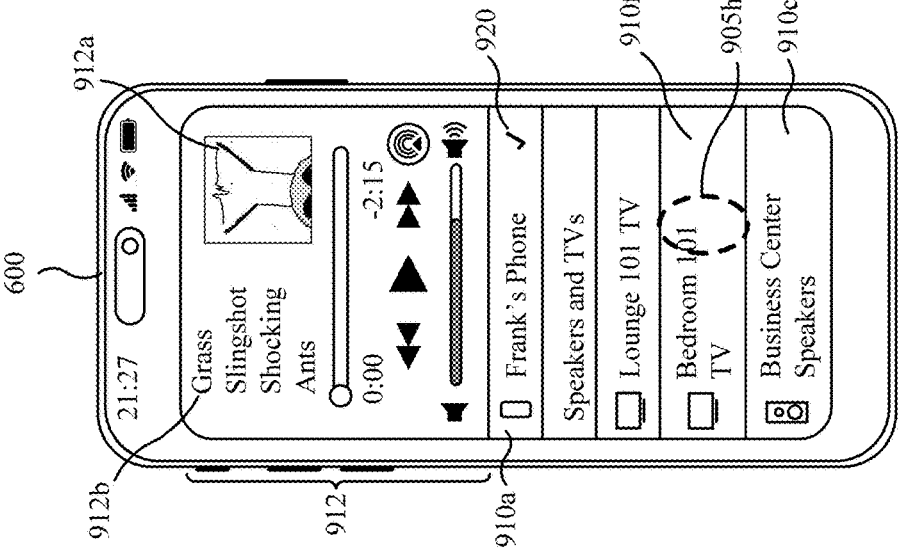
*FIG. 9H*

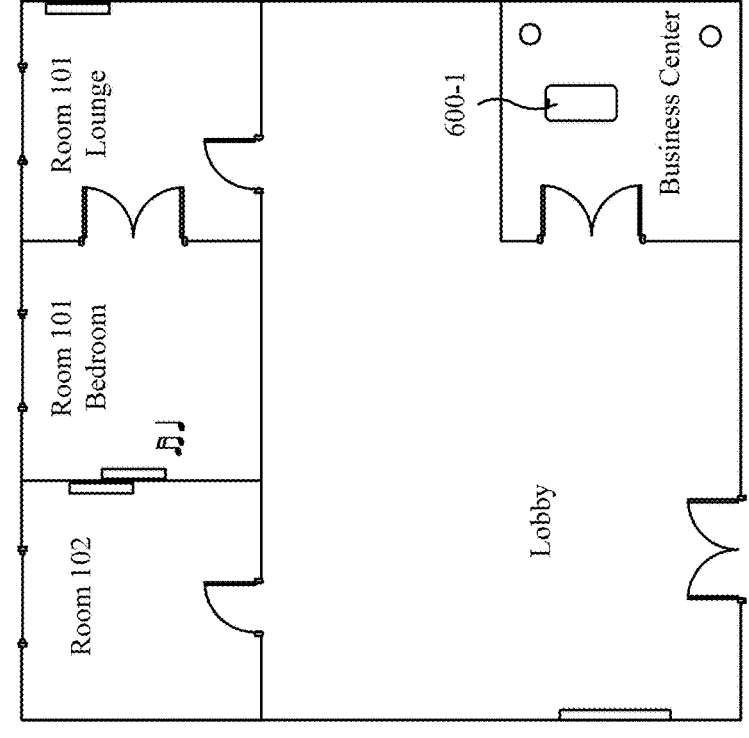
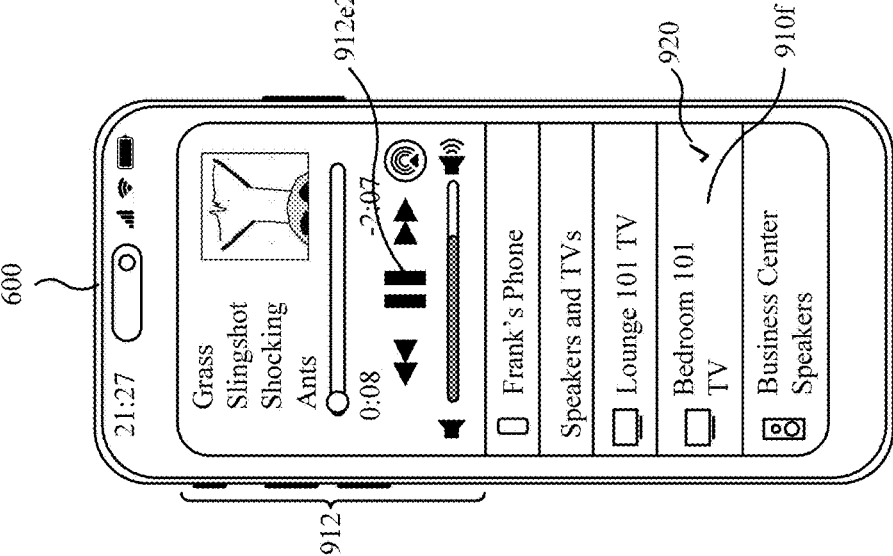
*FIG. 9I*

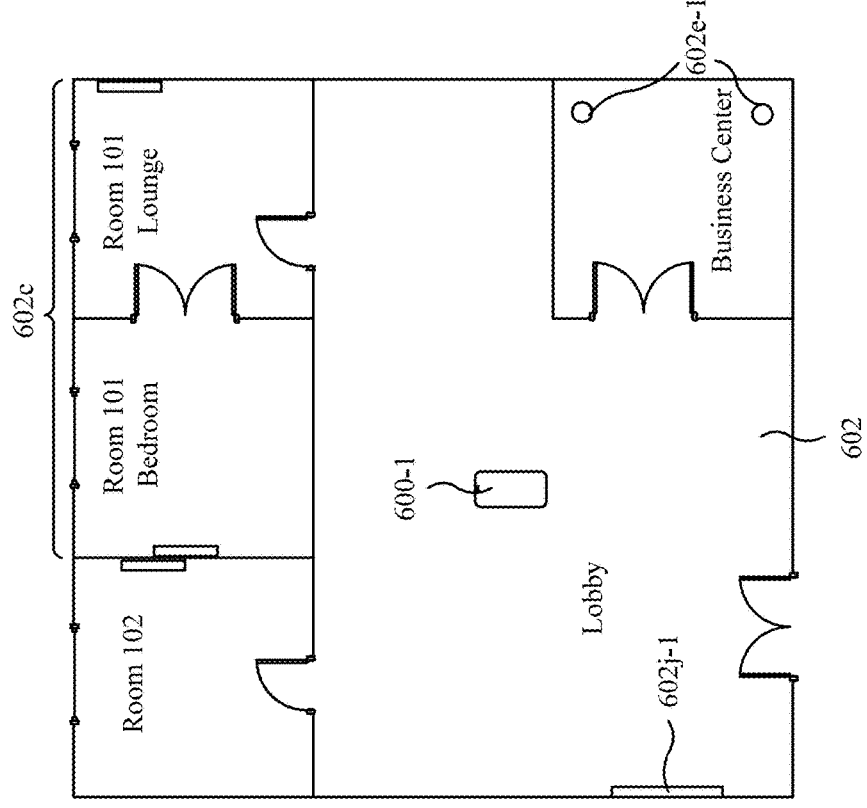
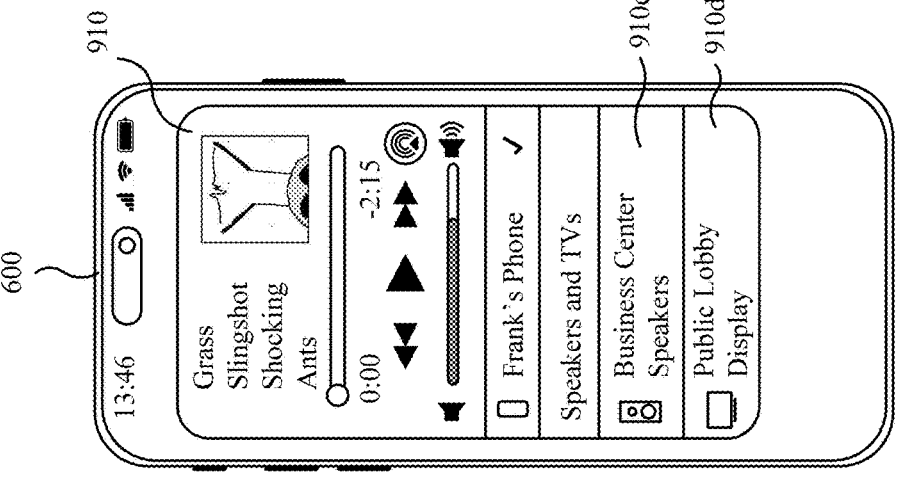
*FIG. 9J*

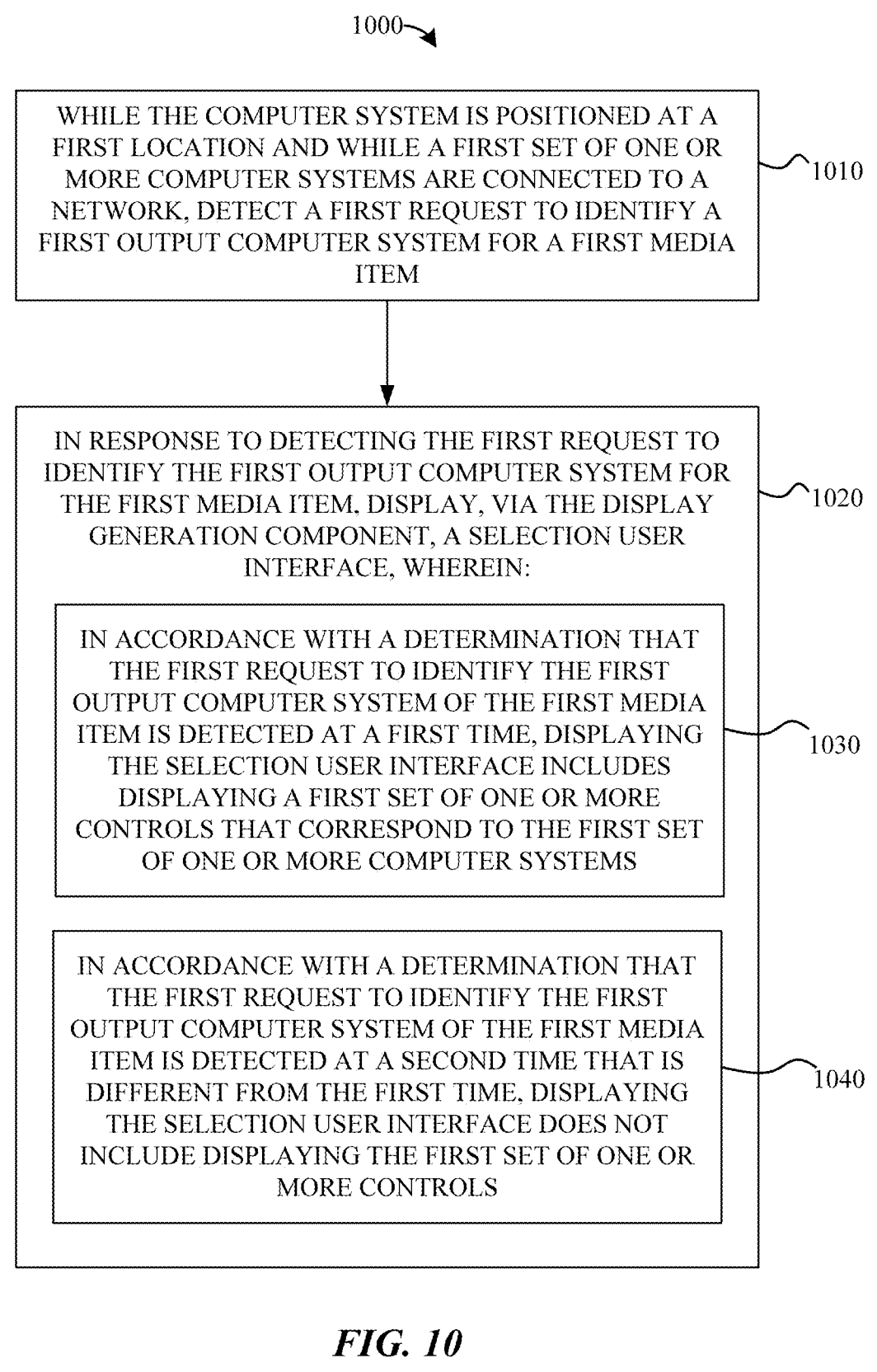

1000

WHILE THE COMPUTER SYSTEM IS POSITIONED AT A FIRST LOCATION AND WHILE A FIRST SET OF ONE OR MORE COMPUTER SYSTEMS ARE CONNECTED TO A NETWORK, DETECT A FIRST REQUEST TO IDENTIFY A FIRST OUTPUT COMPUTER SYSTEM FOR A FIRST MEDIA ITEM ⟩1010

IN RESPONSE TO DETECTING THE FIRST REQUEST TO IDENTIFY THE FIRST OUTPUT COMPUTER SYSTEM FOR THE FIRST MEDIA ITEM, DISPLAY, VIA THE DISPLAY GENERATION COMPONENT, A SELECTION USER INTERFACE, WHEREIN: ⟩1020

IN ACCORDANCE WITH A DETERMINATION THAT THE FIRST REQUEST TO IDENTIFY THE FIRST OUTPUT COMPUTER SYSTEM OF THE FIRST MEDIA ITEM IS DETECTED AT A FIRST TIME, DISPLAYING THE SELECTION USER INTERFACE INCLUDES DISPLAYING A FIRST SET OF ONE OR MORE CONTROLS THAT CORRESPOND TO THE FIRST SET OF ONE OR MORE COMPUTER SYSTEMS 1030

IN ACCORDANCE WITH A DETERMINATION THAT THE FIRST REQUEST TO IDENTIFY THE FIRST OUTPUT COMPUTER SYSTEM OF THE FIRST MEDIA ITEM IS DETECTED AT A SECOND TIME THAT IS DIFFERENT FROM THE FIRST TIME, DISPLAYING THE SELECTION USER INTERFACE DOES NOT INCLUDE DISPLAYING THE FIRST SET OF ONE OR MORE CONTROLS 1040

*FIG. 10*

TECHNIQUES FOR MANAGING CONNECTIONS BETWEEN COMPUTER SYSTEMS

CROSS-REFERENCE TO RELATED APPLICATIONS

The present application claims priority to U.S. Provisional Patent Application Ser. No. 63/471,048 entitled "TECHNIQUES FOR MANAGING CONNECTIONS BETWEEN COMPUTER SYSTEMS" filed Jun. 5, 2023, which is hereby incorporated by reference in its entirety for all purposes.

FIELD

The present disclosure relates generally to computer user interfaces, and more specifically to techniques for managing connections between computer systems.

BACKGROUND

Electronic devices often provide a user the ability to control the playback of media. Users can control the playback of various types of media using various types of electronic devices.

SUMMARY

Some techniques for managing connections between computer systems using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing connections between computer systems. Such methods and interfaces optionally complement or replace other methods for managing connections between computer systems. Such methods and interfaces reduce the cognitive burden on a user and produce a more efficient human-machine interface. For battery-operated computing devices, such methods and interfaces conserve power and increase the time between battery charges.

In some examples, a method that is performed at a first computer system is described. In some examples, the method comprises: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a non-transitory computer-readable storage medium storing one or more programs configured to be executed by one or more processors of a first computer system is described. In some examples, the one or more programs includes instructions for: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a transitory computer-readable storage medium storing one or more programs configured to be executed by one or more processors of a first computer system is described. In some examples, the one or more programs includes instructions for: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a first computer system is described. In some examples, the first computer system comprises one or more processors and memory storing one or more programs configured to be executed by the one or more processors. In some examples, the one or more programs includes instructions for: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a first computer system is described. In some examples, the first computer system comprises means for performing each of the following steps: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a computer program product is described. In some examples, the computer program product comprises one or more programs configured to be executed by one or more processors of a first computer system. In some examples, the one or more programs include instructions for: receiving, from a second computer system different from the first computer system, a communication corresponding to a network; in response to receiving the communication: in accordance with a determination that a first set of one or more criteria is satisfied, wherein the first set of one or more criteria includes a criterion that corresponds to a first location, configuring the first computer system to control a first set of one or more computer systems at the first location, wherein the first set of one or more computer systems is connected to the network; and in accordance with a determination that a second set of one or more criteria is satisfied, wherein the second set of one or more criteria includes a criterion that corresponds to a second location that is different from the first location, configuring the first computer system to control a second set of one or more computer systems at the second location, wherein the second set of one or more computer systems is different from the first set of one or more computer systems, and wherein the second set of one or more computer systems is connected to the network.

In some examples, a method that is performed at a computer system that is in communication with a display generation component is described. In some examples, the method comprises: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a non-transitory computer-readable storage medium storing one or more programs configured to be executed by one or more processors of a computer system that is in communication with a display generation component is described. In some examples, the one or more programs includes instructions for: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a transitory computer-readable storage medium storing one or more programs configured to be executed by one or more processors of a computer system that is in communication with a display generation component is described. In some examples, the one or more programs includes instructions for: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a computer system that is in communication with a display generation component is described. In some examples, the computer system that is in communication with a display generation component comprises one or more processors and memory storing one or more programs configured to be executed by the one or more processors. In some examples, the one or more programs includes instructions for: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a computer system that is in communication with a display generation component is described. In some examples, the computer system that is in communication with a display generation component comprises means for performing each of the following steps: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a computer program product is described. In some examples, the computer program product comprises one or more programs configured to be executed by one or more processors of a computer system that is in communication with a display generation component. In some examples, the one or more programs include instructions for: in response to detecting a request to identify an output device for a media item, displaying, via the display generation component, a selection user interface, wherein displaying the selection user interface includes displaying a control that corresponds to a first external computer system; while displaying the selection user interface, detecting an input that corresponds to a request to play back the media item; and in response to detecting the request, displaying, via the display generation component, a camera user interface.

In some examples, a method that is performed at a computer system that is in communication with a display generation component is described. In some examples, the method comprises: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

In some examples, a non-transitory computer-readable storage medium storing one or more programs configured to be executed by one or more processors of a computer system that is in communication with a display generation component is described. In some examples, the one or more programs includes instructions for: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

In some examples, a transitory computer-readable storage medium storing one or more programs configured to be executed by one or more processors of a computer system that is in communication with a display generation component is described. In some examples, the one or more programs includes instructions for: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

In some examples, a computer system that is in communication with a display generation component is described. In some examples, the computer system that is in communication with a display generation component comprises one or more processors and memory storing one or more programs configured to be executed by the one or more processors. In some examples, the one or more programs includes instructions for: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

In some examples, a computer system that is in communication with a display generation component is described. In some examples, the computer system that is in communication with a display generation component comprises means for performing each of the following steps: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

In some examples, a computer program product is described. In some examples, the computer program product comprises one or more programs configured to be executed by one or more processors of a computer system that is in communication with a display generation component. In some examples, the one or more programs include instructions for: while the computer system is positioned at a first location and while a first set of one or more computer systems are connected to a network, detecting a first request to identify a first output computer system for a first media item; and in response to detecting the first request to identify the first output computer system for the first media item, displaying, via the display generation component, a selection user interface, wherein: in accordance with a determination that the first request to identify the first output computer system of the first media item is detected at a first time, displaying the selection user interface includes displaying a first set of one or more controls that correspond to the first set of one or more computer systems; and in accordance with a determination that the first request to identify the first output computer system of the first media item is detected at a second time that is different from the first time, displaying the selection user interface does not include displaying the first set of one or more controls.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing connections between computer systems, thereby increasing the effectiveness, efficiency, and user satisfaction with such devices. Such methods and interfaces may complement or replace other methods for managing connections between computer systems.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some examples.

FIG. 7 is a flow diagram illustrating a method for managing connections between computer systems in accordance with some examples.

FIG. 8 is a flow diagram illustrating a method for performing an authentication process between computer systems in accordance with some examples.

FIGS. 9A-9J illustrate exemplary user interfaces for managing media playback operations of computer systems in accordance with some examples.

FIG. 10 is a flow diagram illustrating a method for managing media playback operations of computer systems in accordance with some embodiments.

DETAILED DESCRIPTION

Figure 1A:
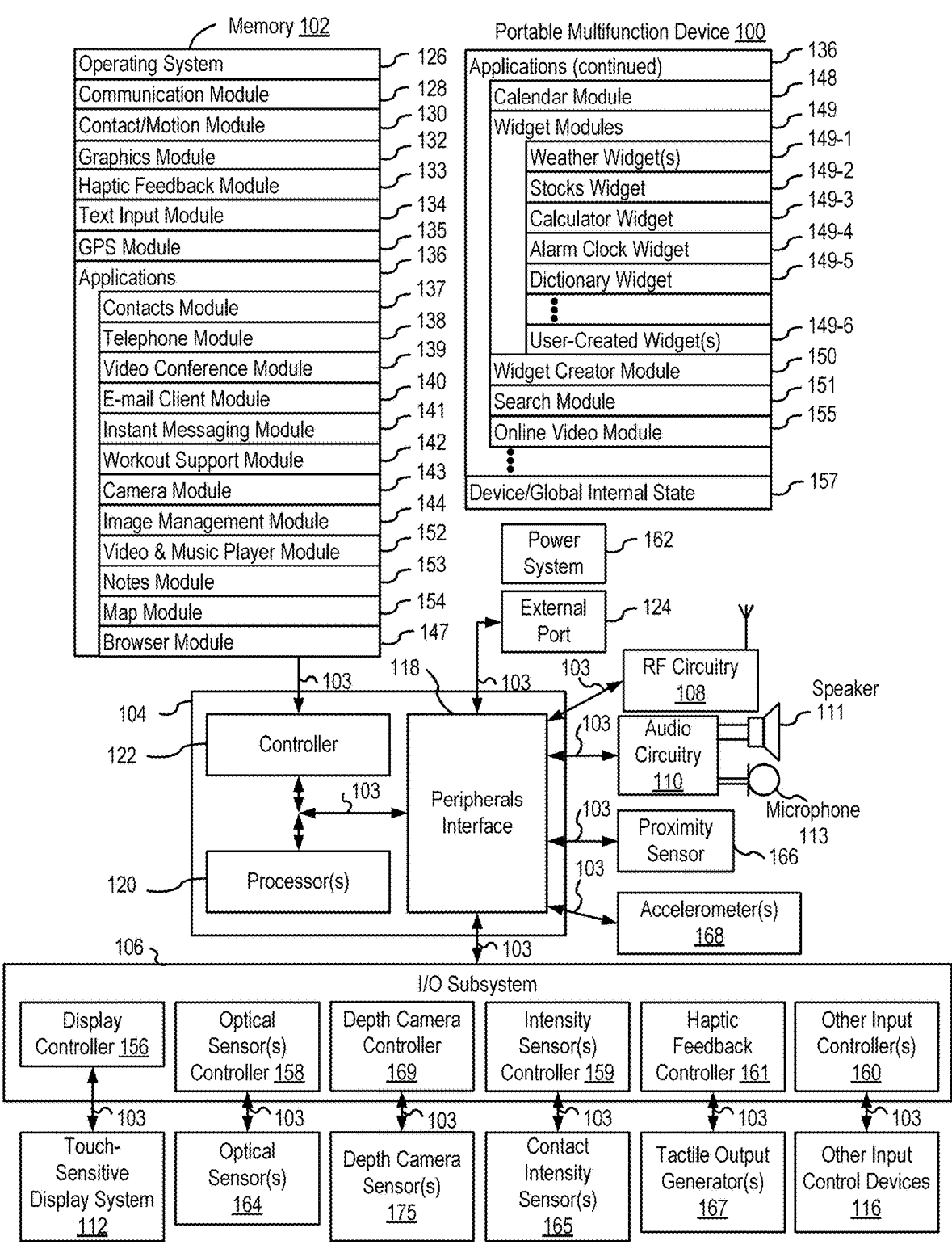
FIG. 1A is a block diagram illustrating a portable multifunction device with a touch-sensitive display in accordance with some examples.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing connections between computer systems. For example, connecting computer systems can be an automated process based on time of a detected request to connect computer systems and location of the computer systems at the time the request to connect the computer systems is detected. Further, an authentication process can be performed as part of the connecting the computer systems. Such techniques can reduce the cognitive burden on a user who manages connections between computer systems, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing connections between computer systems. FIGS. 6A-6U illustrate exemplary user interfaces for managing connections between computer systems in accordance with some examples. FIG. 7 is a flow diagram illustrating methods of managing connections between computer systems in accordance with some examples. FIG. 8 is a flow diagram illustrating methods of performing an authentication process between computer systems in accordance with some examples. The user interfaces in FIGS. 6A-6U are used to illustrate the processes described below, including the processes in FIG. 7 and FIG. 8. FIGS. 9A-9J illustrate exemplary user interfaces for managing media playback operations in accordance with some examples. FIG. 10 is a flow diagram illustrating methods of managing media playback operations in accordance with some embodiments. The user interfaces in FIGS. 9A-9J are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, increasing security and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, Analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three-dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
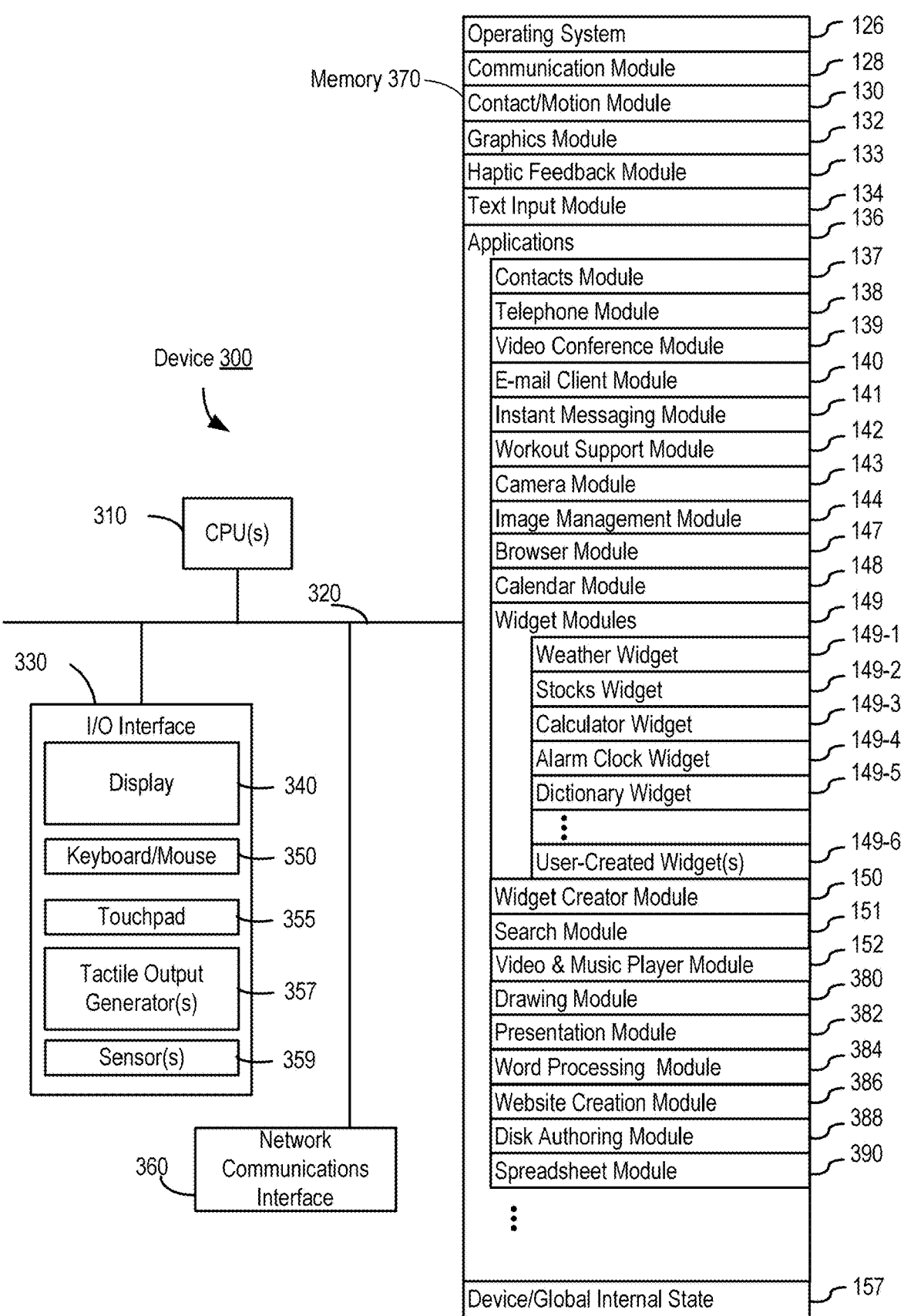
FIG. 3 is a block diagram of an exemplary multifunction device with a display and a touch-sensitive surface in accordance with some examples.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
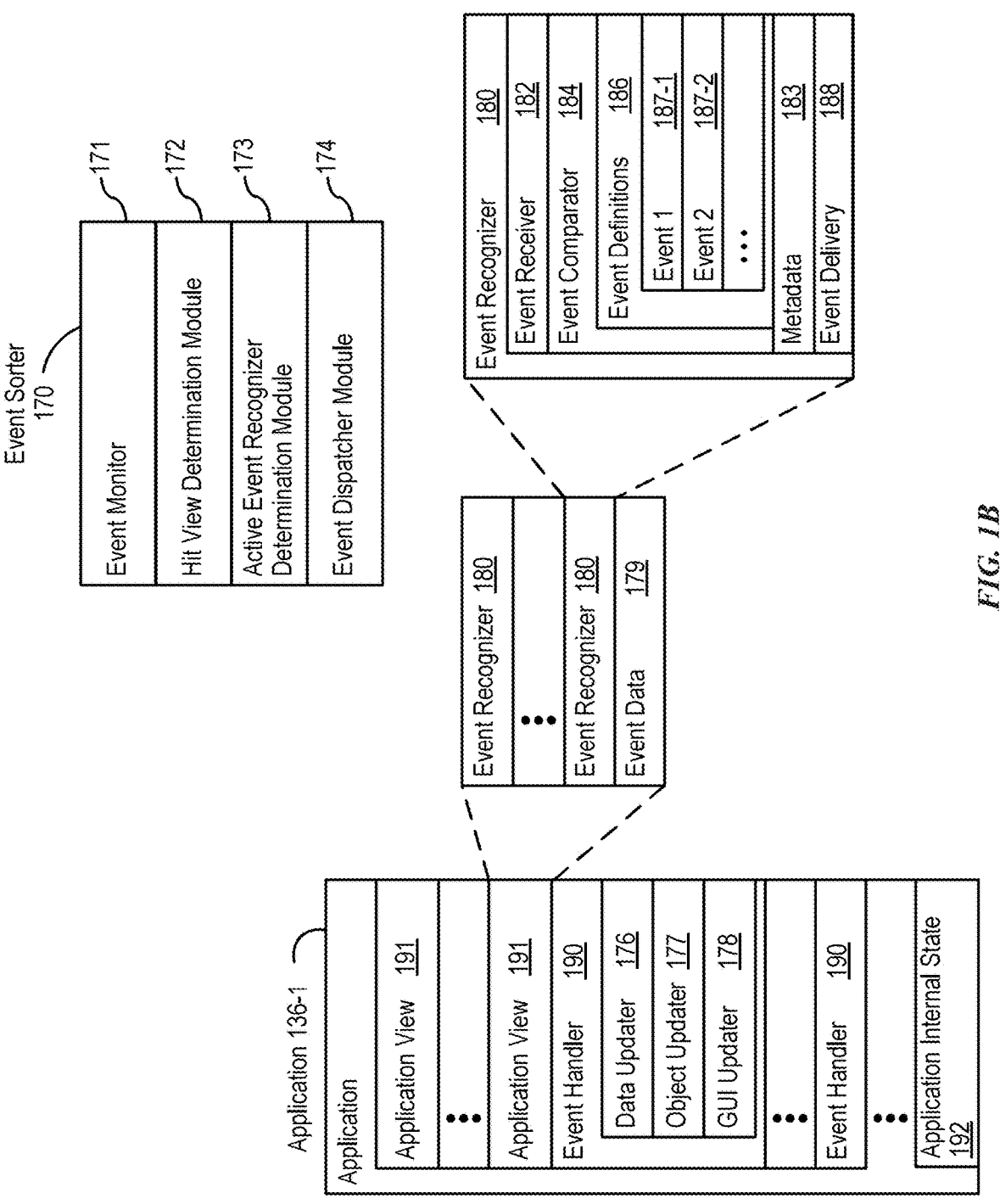
FIG. 1B is a block diagram illustrating exemplary components for event handling in accordance with some examples.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
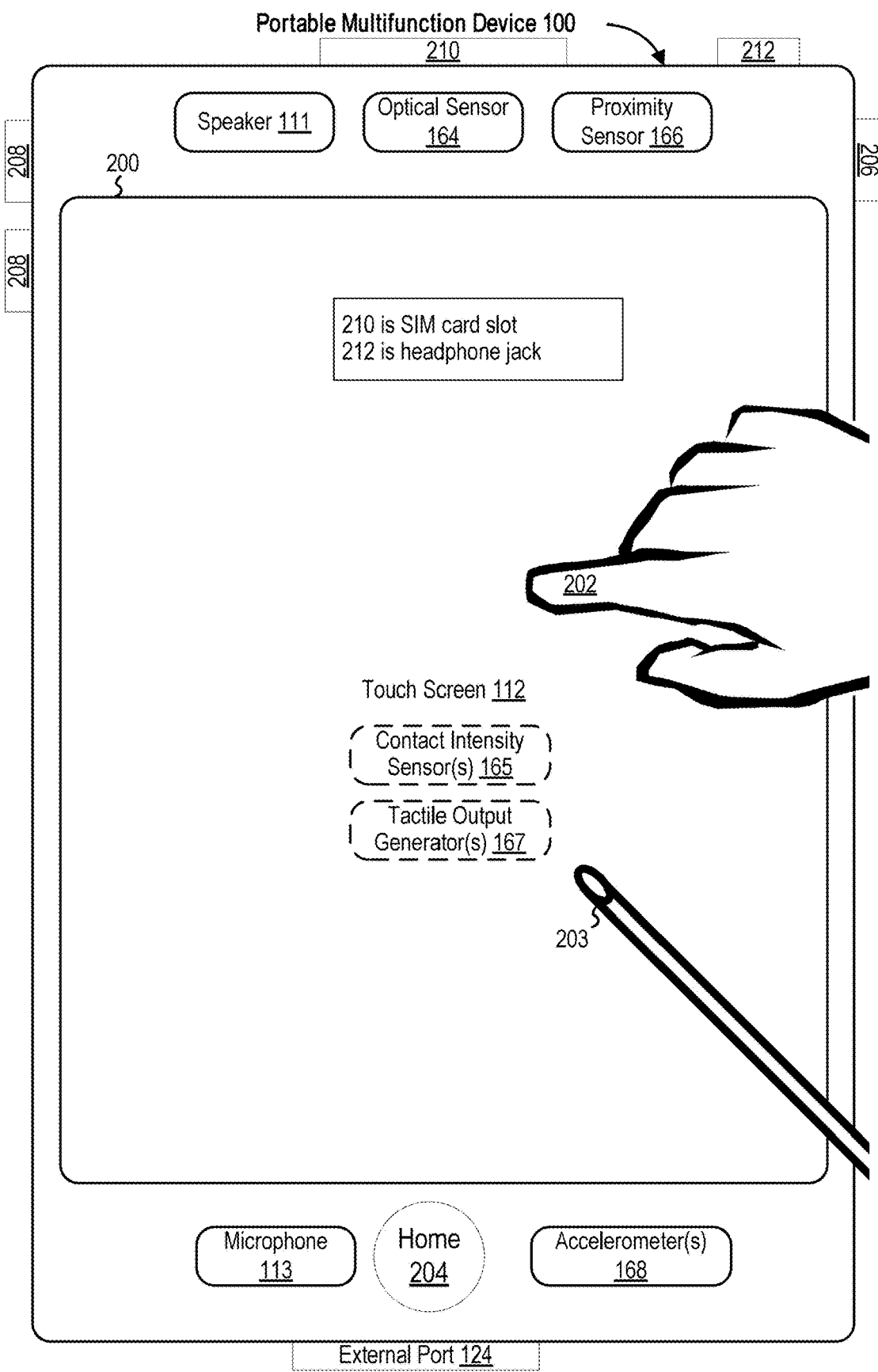
FIG. 2 illustrates a portable multifunction device having a touch screen in accordance with some examples.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
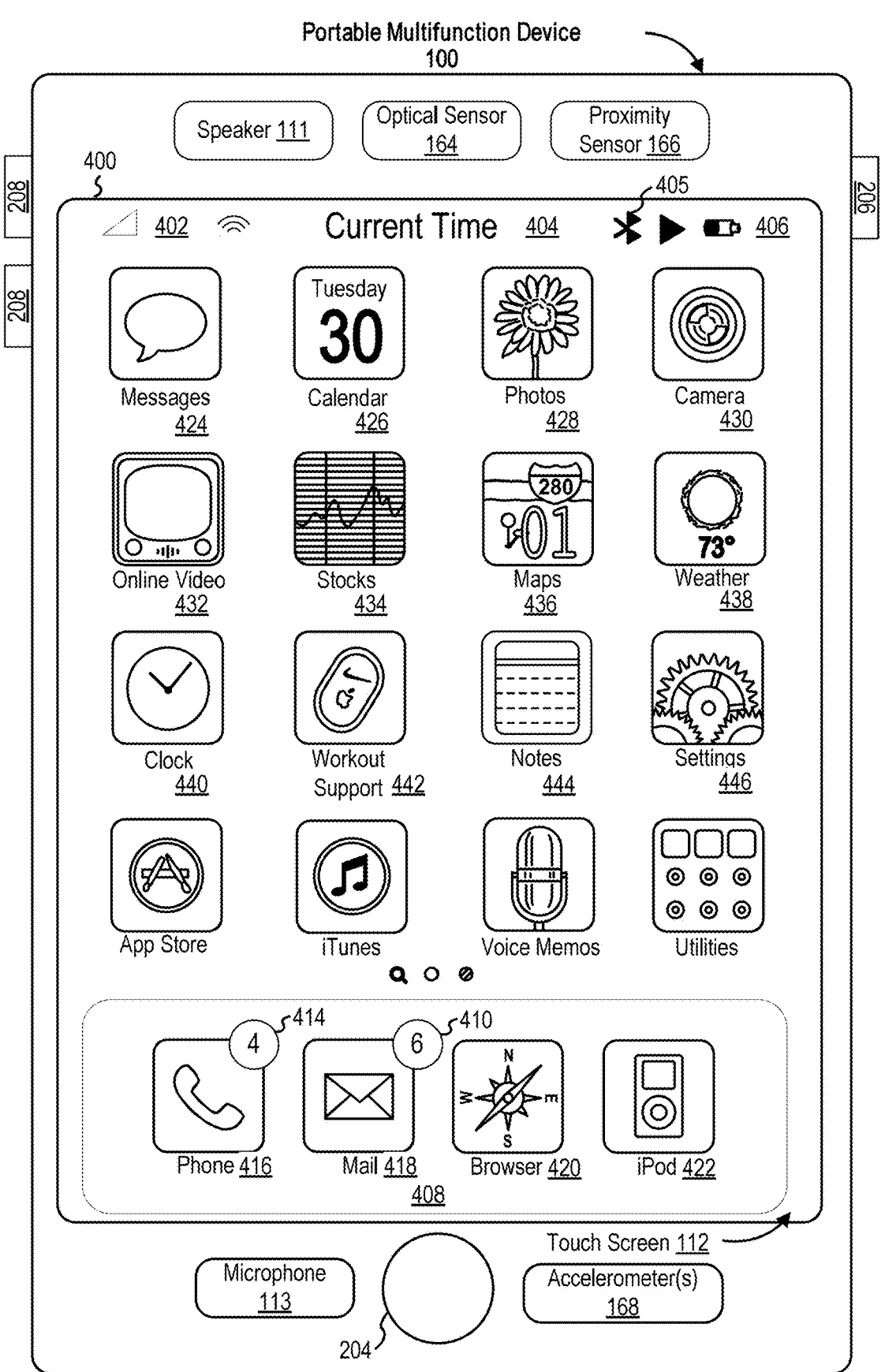
FIG. 4A illustrates an exemplary user interface for a menu of applications on a portable multifunction device in accordance with some examples.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
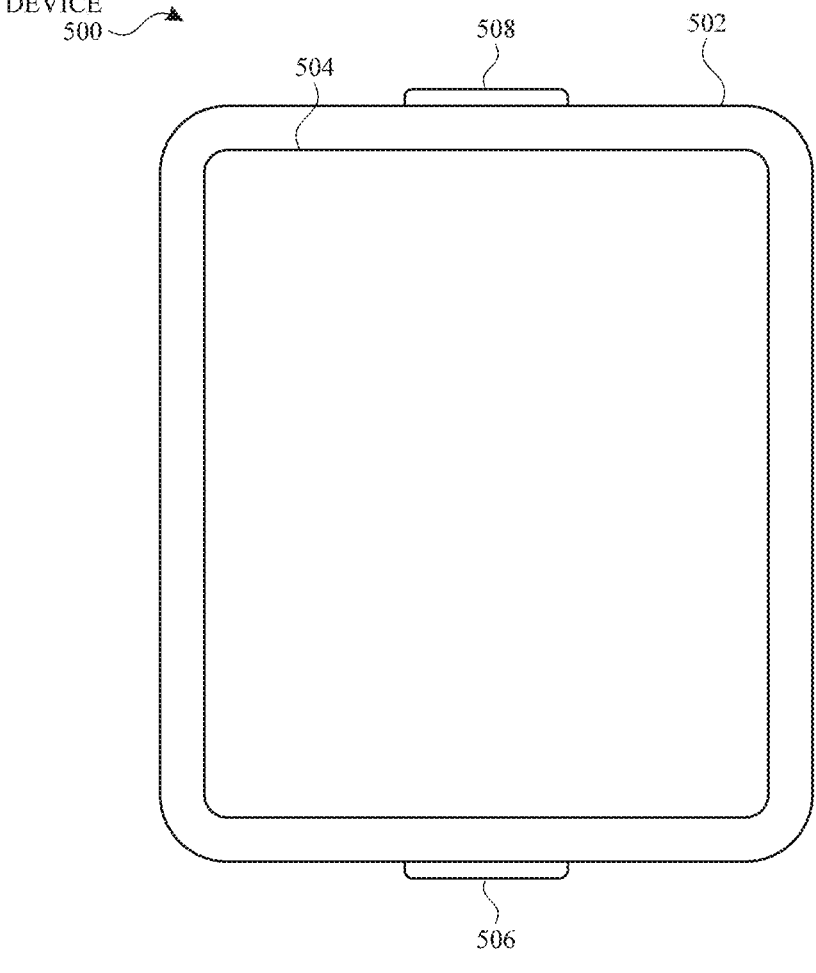
FIG. 5A illustrates a personal electronic device in accordance with some examples.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
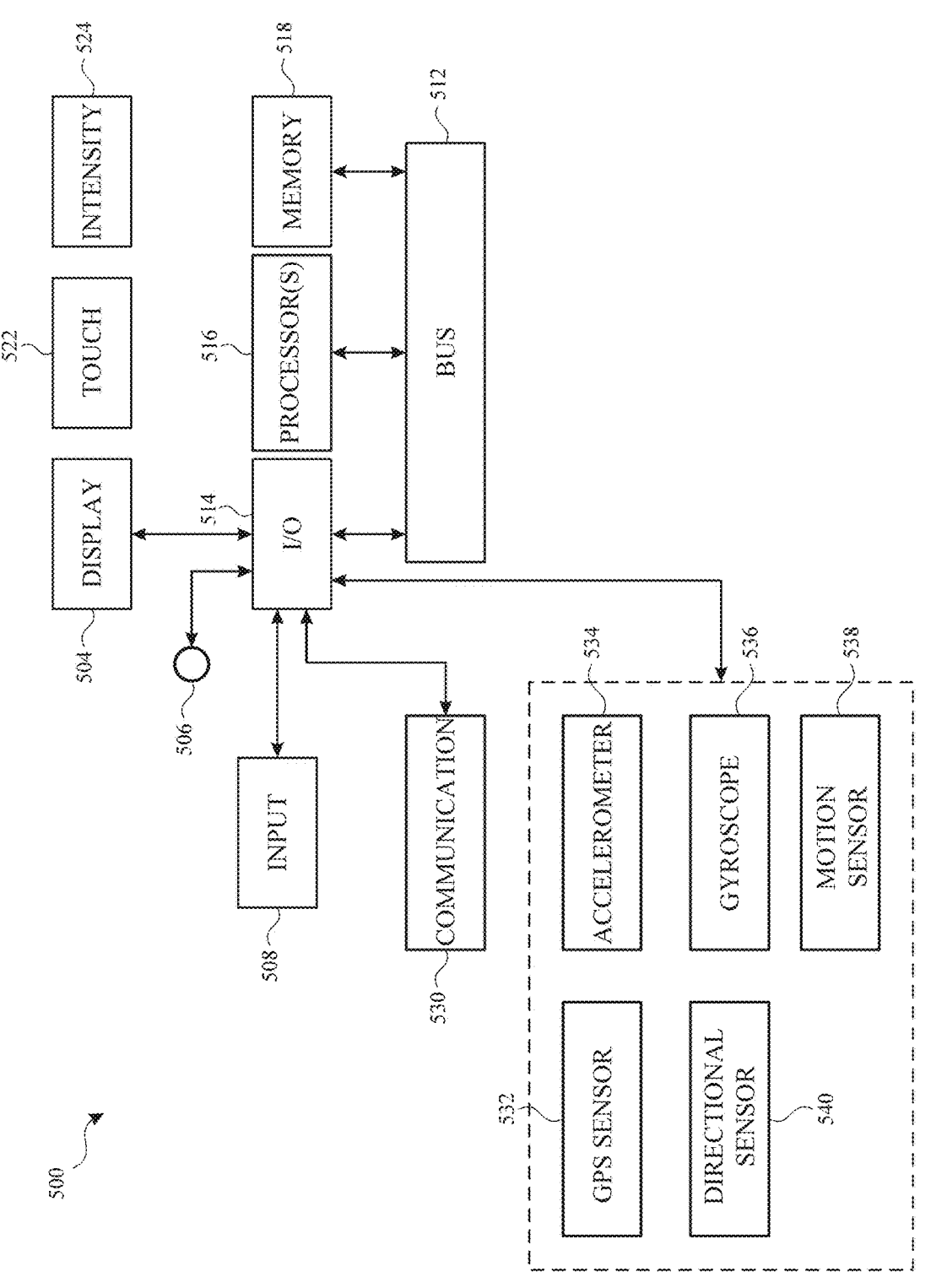
FIG. 5B is a block diagram illustrating a personal electronic device in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to touch screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for managing connections between computer systems in accordance with some embodiments. The user interfaces in these figures are used to illustrate the processes described below including the processes in FIGS. 7 and 8.

FIG. 6A illustrates computer system 600. At FIG. 6A, computer system 600 is a smartphone. While computer system 600 is depicted as a smartphone, it should be recognized that this is merely an example and techniques described herein can work with other types of computer systems, such as a tablet, a smart watch, a laptop, a personal gaming system, and/or a desktop computer. In some examples, computer system 600 includes one or more components and/or features described above in relation to electronic devices 100, 300, and/or 500.

As illustrated in FIG. 6A, computer system 600 displays media player user interface 606 (e.g., a "now playing" user interface). At FIG. 6A, computer system 600 is configured to play back a first media item (e.g., entitled "Cityline Run") that is a song media item. At FIG. 6A, the display of media player user interface 606 corresponds to the first media item (e.g., includes information and/or content based on the first media item).

As illustrated in FIG. 6A, media player user interface 606 includes media art 606a, media title 606b, media artist 606c, playback indicators 606d, playback controls 606e, and volume indicator 606f. Playback indicators 606d includes playback duration indicator 606d1, playback progress indicator 606d2, elapsed playback time indicator 606d3, and remaining playback time indicator 606d4. Further, as illustrated in FIG. 6A, playback controls 606e include skip back media item control 606e1, play/pause control 606e2, and skip forward control 606e3. Volume indicator 606f is a visual representation of a volume level of the playback of the first media item (e.g., the volume level corresponds to the amount of fill (e.g., shading, color, and/or darkening) of the horizontal bar).

At FIG. 6A, because media player user interface 606 corresponds to the first media item, media art 606a is a graphical representation (e.g., album art) of the first media item, media title 606b indicates the title of the first media item and media artist 606c indicates the name of the artist(s) of the first media item. Playback duration indicator 606d1 is a visual representation of the total playtime of the first media item. At FIG. 6A, playback duration indicator 606d1 is a bar of a set length. Computer system 600 displays playback progress indicator 606d2 as a circle overlaying playback duration indicator 606d1. Computer system 600 displays playback progress indicator 606d2 at a point along playback duration indicator 606d1 that corresponds to the progress of the playback of the first media item. Playback time indicator 606*d*3 indicates how much (e.g., in minutes and seconds) of the first media item has been played back. Playback time indicator 606*d*4 indicates how much of the first media item remains to be played back.

With respect to playback controls 606*e*, computer system 600 restarts the playback of the first media item or initiates the playback of a respective media item in a queue that is immediately prior to the first media item in response to detecting a selection of skip back media item control 606*e*1. Computer system 600 initiates (e.g., plays and/or resumes, if paused or stopped) the playback of the first media item or pauses (e.g., if playing) the playback of the first media item in response to detecting selection of play/pause control 606*e*2. Computer system 600 displays play/pause control 606*e*2 with an appearance of a triangle (e.g., a play symbol) (e.g., as shown in FIG. 6A) while the first media item is not currently playing back and computer system 600 displays play/pause control 606*e*2 with an appearance of two parallel bars (e.g., a pause symbol) while the first media item is being played back. Computer system 600 advances to a sequential media item in a queue in response to detecting an input that corresponds to selection of skip forward control 606*e*3.

As illustrated in FIG. 6A, computer system 600 displays status region 604 at a top region of media player user interface 606 and computer system 600 displays controls region 608 at a bottom region of media player user interface 606. Status region 604 includes time indicator 604*a*, network indicator 604*b*, and battery indicator 604*d*. Time indicator 604*a* indicates the current time, network indicator 604*b* indicates the strength of a cellular network that computer system 600 is connected to, and battery indicator 604*d* indicates the battery life of computer system 600. Controls region 608 includes media streaming control 608*a*. As discussed in greater detail below, media streaming control 608*a* corresponds to the media streaming functionalities of computer system 600. At FIG. 6A, computer system 600 is not connected to a network of the hotel. Accordingly, at FIG. 6A, status region 604 does not include an indication of a strength of the network of the hotel.

FIG. 6A includes diagram 602. Diagram 602 is a visual aid that corresponds to a representation of a floor plan of a hotel. As will be discussed throughout the examples herein, computer system 600 can be physically located within the hotel. In these examples, the location of computer system 600 (e.g., and one or more other computer systems) with respect to the hotel is illustrated in diagram 602. Although diagram 602 is a representation of a floor plan of a hotel, it should be recognized that this is merely an example and techniques described herein can work with other types of buildings, such as a home, an apartment, an office building, and/or a doctor's office.

At FIG. 6A, diagram 602 includes lobby 602*a* that is representative of a lobby area of the hotel, business center 602*b* that is representative of a business center of the hotel, hotel suite 602*c* that is representative of a first room in the hotel (e.g., room 101), and hotel room 602*d* that is representative of a second room in the hotel (e.g., room 102). As indicated by diagram 602, the first room in the hotel includes lounge 602*c*1 that includes lounge television 662 (e.g., as represented by television 602*f*-1 within diagram 602) and includes bedroom 602*c*2 that includes bedroom television 664 (e.g., as represented by television representation 602*g*-1 within diagram 602). Further, the second room of the hotel (e.g., room 102) includes bedroom television 674 (e.g., as represented by television representation 602*h*-1 within diagram 602). Additionally, the business center of the hotel includes business center speakers 670 (e.g., as indicated by speakers representation 602*e*-1 within diagram 602). Further, the lobby area of the hotel includes lobby television 668 (e.g., as represented by television representation 602*j*-1 in diagram 602). Diagram 602 also includes representation of computer system 600-1. Representation of computer system 600-1 indicates the position of computer system 600 within the hotel relative to the floor plan of the hotel. At FIG. 6A, as indicated by the positioning of representation of computer system 600-1 within diagram 602, computer system 600 is positioned outside of the first room of the hotel (e.g., room 101). In some examples, the first room of the hotel includes different types of computer systems than the second room of the hotel. In some examples, the first room and/or the second room of the hotel includes a combination of different types of computer systems such as televisions, touch screens, tablets, computers, laptops, presentation equipment, smart watches, and/or smartphones. In some examples, each of lounge television 662 (e.g., as shown in FIG. 6D), bedroom television 664 (e.g., as shown in FIG. 6O), business center speakers 670 (e.g., as represented by speakers representation 602*e*-1 within diagram 602), lobby television 668 (e.g., as represented by television representation 602*j*-1 in diagram 602) and bedroom television 674 (e.g., as shown in FIG. 6E) are connected to a wireless network of the hotel.

FIGS. 6A-6E illustrate a first method for connecting computer system 600 to one or more external computer systems such that computer system 600 can control the media playback operations of the one or more external computer systems. The method illustrated in FIGS. 6A-6E is an automated connection process based partly on the location of computer system 600.

In FIGS. 6A-6E, computer system 600 is positioned within the hotel at a point in time after a user of computer system 600 has checked into the first room of the hotel (e.g., room 101). Because the user has checked into the first room of the hotel, the first room of the hotel is registered with (e.g., is registered to, corresponds to, and/or is associated with) computer system 600. In some examples, computer system 600 is registered with the first room of the hotel as part of a check-in process that the user performs when the user arrives at the hotel. In some examples, computer system 600 is registered with the first room of the hotel as part of a reservation process that the user performs prior to the user arriving at the hotel. In some examples, "registered with" means that the hotel room is registered to be associated with computer system 600 (and/or a user account logged into computer system 600) (and/or a credential associated with and/or stored by computer system 600). In some examples, the first room of the hotel is registered with computer system 600 in response to a user of computer system 600 registering (e.g., checking in) with the hotel (e.g., via and/or with a computer system of the hotel) (e.g., and having a reservation for and/or otherwise being assigned the first room of the hotel). In some examples, the first room of the hotel is registered with computer system 600 in response to computer system 600 being registered with the first room of the hotel. In some examples, the first room of the hotel is registered with computer system 600 in response to computer system 600 receiving login credentials of a user. In some examples, the multiple rooms of the hotel are concurrently registered with computer system 600. In some examples, computer system 600 is connected to a wireless network (e.g., Wi-Fi, Bluetooth, and/or Ultra-Wideband network) of the hotel in response to the first room of the hotel registering with computer system 600.

At FIG. 6A, because the first room of the hotel (e.g., room 101) is registered with computer system 600, computer system 600 is granted permission to control the media playback operations of lounge television 662 and bedroom television 664 that are positioned in the first room of the hotel. Computer system 600 is granted permission to control the media playback operations of the computer systems positioned in the first room of the hotel by a computer system and/or server that is owned and/or operated by the hotel. At FIG. 6A, though computer system 600 is granted permission to control the media playback operations of computer systems positioned in the first room of the hotel, computer system 600 cannot control (e.g., is ineligible to control) the media playback operations of the computer systems in the first room of the hotel. That is, in some embodiments, granting the computer system 600 permission to control the media playback operations of the computer systems in the first room of the hotel does not connect computer system 600 to the computer systems in the first room of the hotel. In this example, because computer system 600 is not connected to the computer systems positioned in the first room of the hotel, computer system 600 cannot control the media playback operations of the computer systems in the first room of the hotel. In some examples, computer system 600 is not connected to the computer systems in the first room of the hotel because computer system 600 is not connected to the network of the hotel. In some examples, when computer system 600 is connected to the network of the hotel, computer system 600 cannot control the media playback operations of the computer systems positioned in the hotel room while computer system 600 is not positioned in the first room of the hotel. In some examples, computer system 600 is granted permission to control the media playback operations of the computer systems positioned in the first room based on computer system 600 having a specific credential (e.g., a digital key card and/or a pin code) that corresponds to the first room of the hotel. In some examples, computer system 600 is not granted permission to control the media playback operations of the computer systems in the first room of the hotel while computer system 600 is positioned outside the first room of the hotel. In some examples, computer system 600 is granted permission to control the media playback operations of the computer systems positioned in the first room of the hotel in response to computer system 600 establishing a trusted connection with a network of the hotel. At FIG. 6A, computer system 600 detects tap input 605a directed at media streaming control 608a.

As illustrated in FIG. 6B, in response to detecting tap input 605a, computer system 600 displays device selection user interface 610 over media player user interface 606. Device selection user interface 610 includes a list of computer systems whose media playback operations computer system 600 can control and/or computer systems that computer system 600 is connected to. At FIG. 6B, computer system 600 cannot control the media playback operations of lounge television 662 and bedroom television 664. That is, though computer system 600 has been granted permission to control the media playback operations of lounge television 662 and bedroom television 664, because computer system 600 has not yet connected to lounge television 662 and bedroom television 664, computer system 600 cannot control the playback operations of lounge television 662 and bedroom television 664. In some examples, when computer system 600 is connected to the network of the hotel, device selection user interface 610 does not include controls for lounge television 662 and bedroom television 664 because computer system 600 is not positioned in the first room. In some examples, when computer system 600 is connected to lounge television 662 and bedroom television 664, device selection user interface 610 does not include controls for lounge television 662 and bedroom television 664 because computer system 600 is not positioned in the first room.

As illustrated in FIG. 6B, because computer system 600 can control its own media playback operations, device selection user interface 610 includes current device control 610a that is representative of computer system 600. Current device control 610a includes current device icon 610a1, current device name 610a2, and current selection indicator 610a3. Current device icon 610a1 is a graphical representation of computer system 600 and current device name 610a2 is a textual representation of a name that is assigned (e.g., by the user or a default name) to computer system 600. Computer system 600 displays current selection indicator 610a3 within current device control 610a to indicate that computer system 600 is the designated computer system that will play back the first media item. At FIG. 6B, computer system 600 detects tap input 605b. Further, at FIG. 6B, computer system is moved inside the first room of the hotel.

Figure 6C:
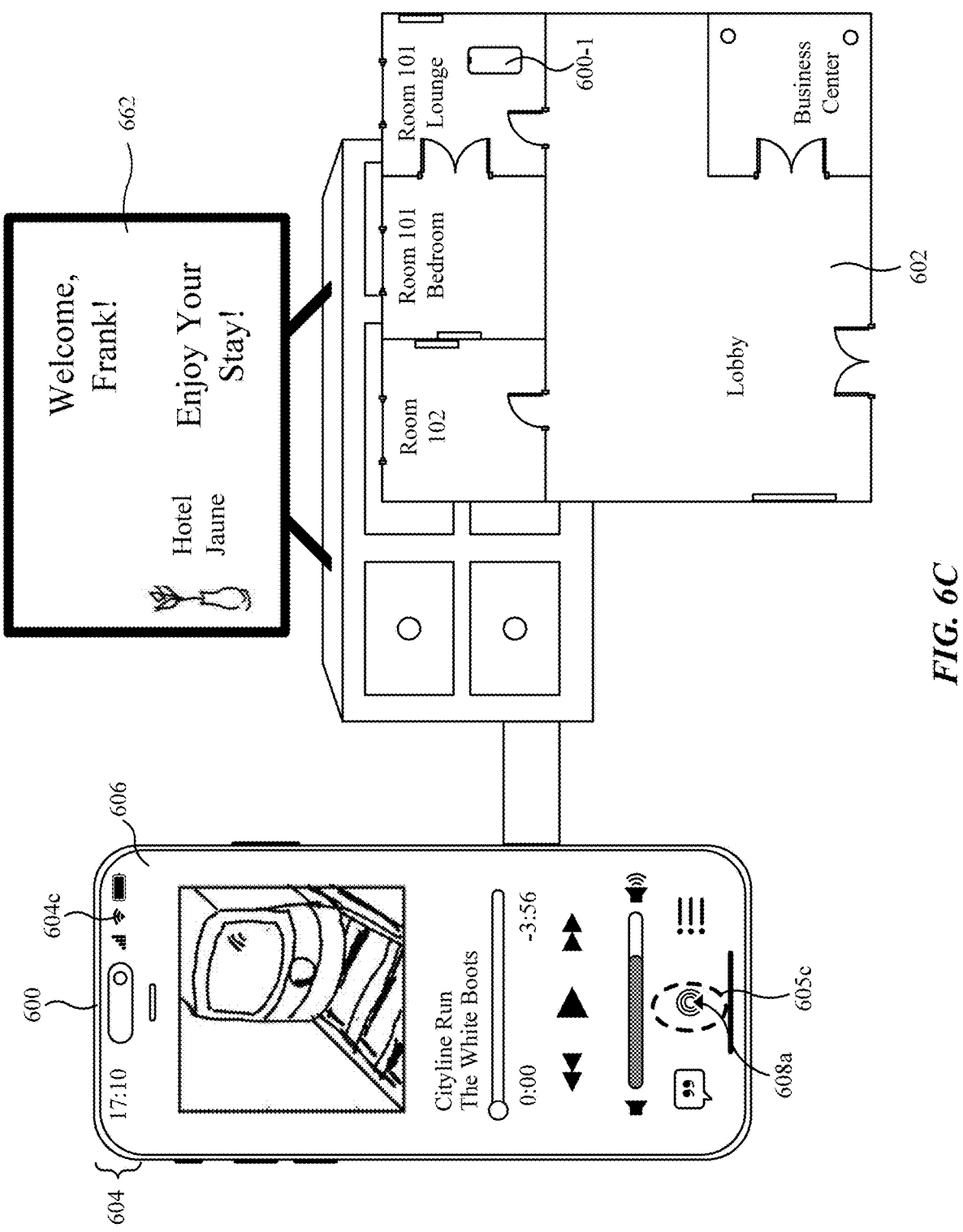
FIGS. 6A-6U illustrate exemplary user interfaces for managing connections between computer systems in accordance with some examples.
Figure 6D:
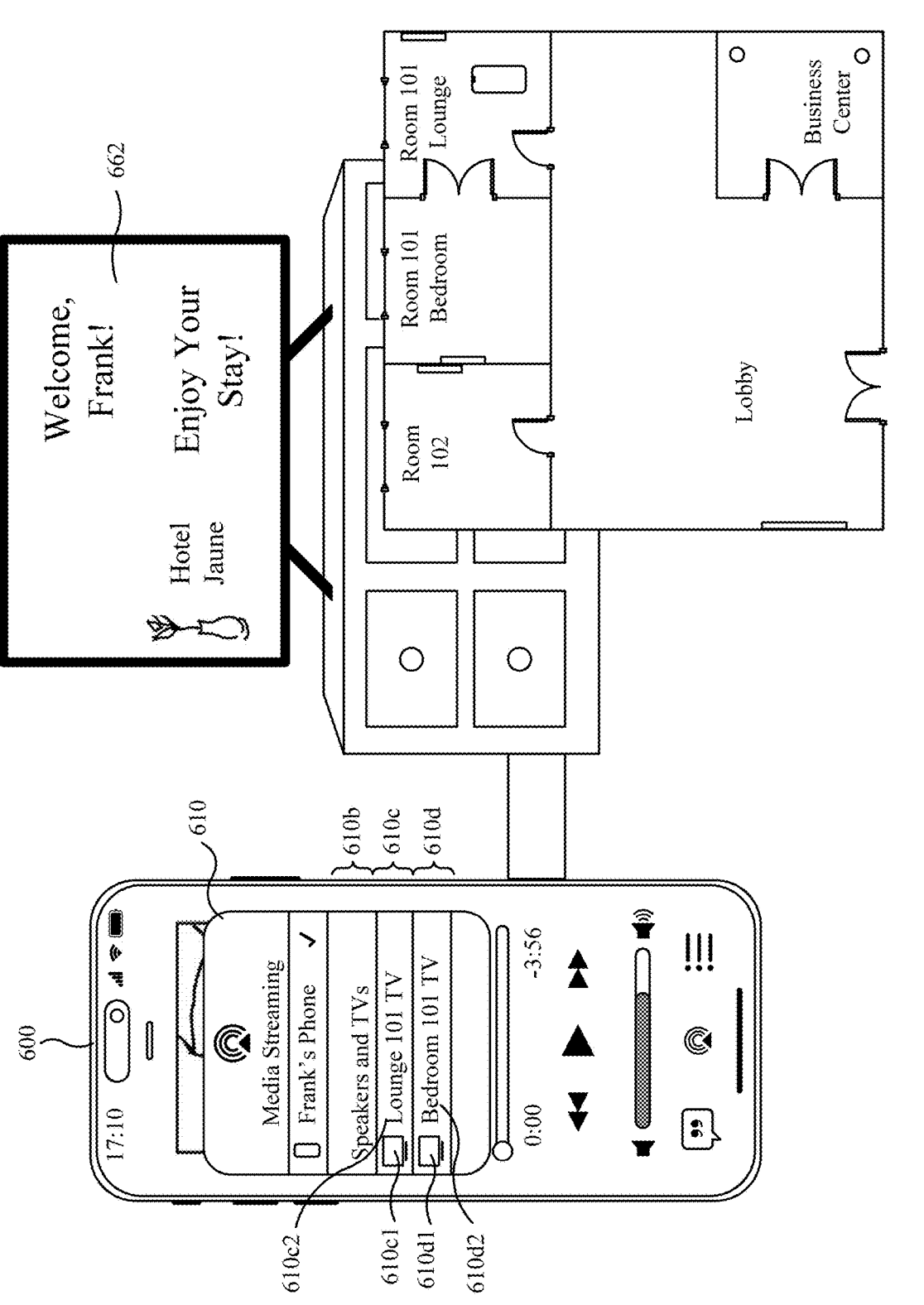
Figure 6E:
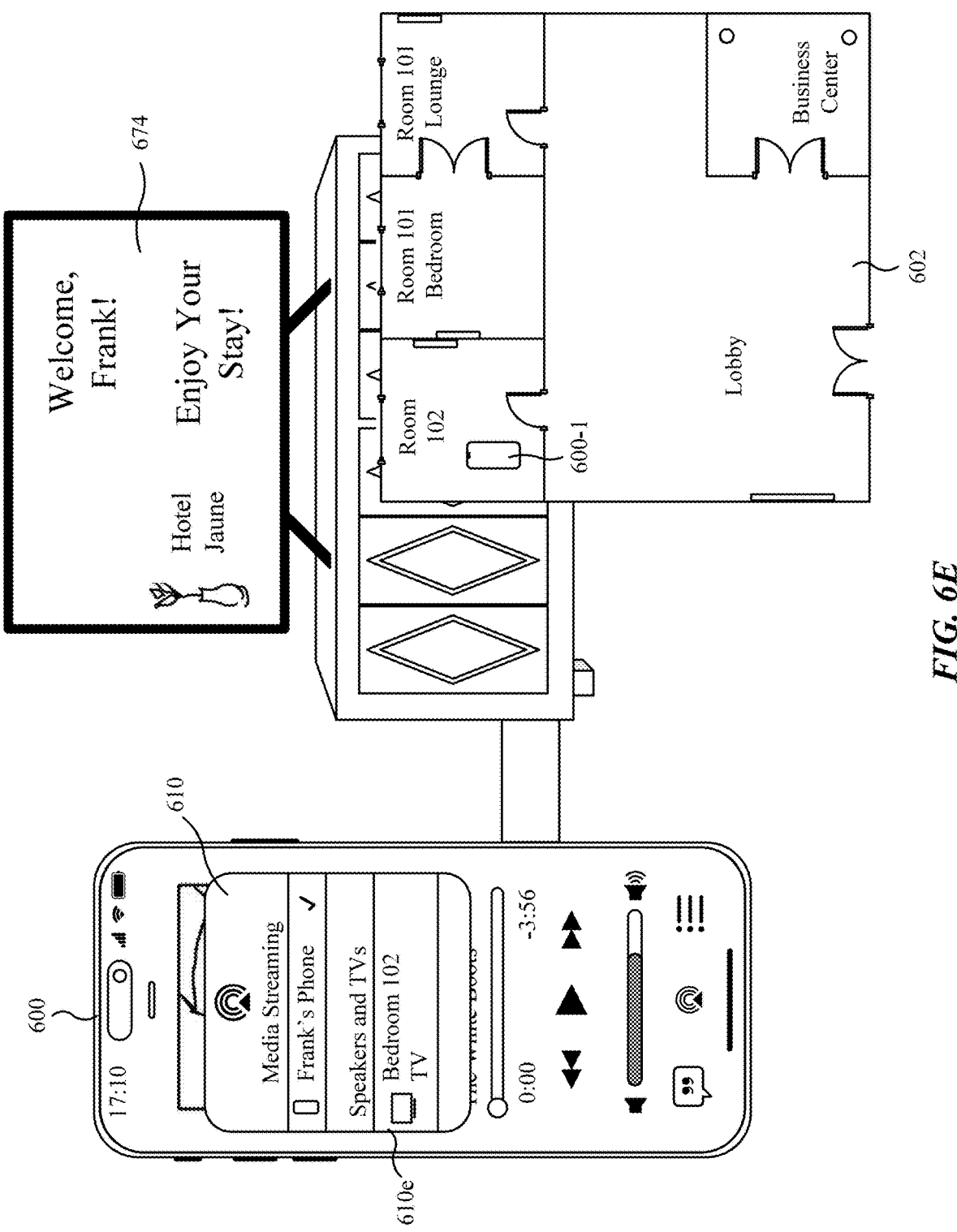

At FIG. 6C, in response to detecting tap input 605b, computer system 600 ceases to display device selection user interface 610. At FIG. 6C, as indicated by the positioning of representation of computer system 600-1 within diagram 602, computer system 600 is positioned within the first room of the hotel (e.g., room 101). As illustrated in FIG. 6C, diagram 602 is shown overlaid on a depiction of the interior of the first room of the hotel, the depiction illustrating lounge television 662. In this example, lounge television displays a personalized welcome message for the user of computer system 600 (e.g., based on information corresponding to the reservation/registration).

At FIG. 6C, a determination is made (e.g., by computer system 600 and/or another computer system) that computer system 600 is positioned within the first room of the hotel (e.g., room 101) while the first room of the hotel is registered with computer system 600. At FIG. 6C, based on the determination being made that computer system 600 is positioned within the first room of the hotel while the first room of the hotel is registered with computer system 600, computer system 600 automatically (e.g., without intervening user input) connects to a wireless network (e.g., Wi-Fi network and/or short range network (e.g., Bluetooth and/or Ultra-Wideband)) that corresponds the first room of the hotel and/or the hotel. As illustrated in FIG. 6C, in response to connecting to the wireless network, computer system 600 displays network indicator 604c within status region 604 to indicate that computer system 600 is connected to the wireless network.

Further, at FIG. 6C, based on the determination being made that computer system 600 is positioned within the first room of the hotel (e.g., room 101) while the first room of the hotel is registered with computer system 600, computer system 600 connects to lounge television 662 and bedroom television 664 that are both positioned within the first room of the hotel. That is, while the first room of the hotel is registered with computer system 600, computer system 600 automatically connects to the computer systems positioned within the first room of the hotel and connects to a network that services the first room of the hotel in response to computer system 600 being positioned within the first room of the hotel. At FIG. 6C, because computer system 600 is connected to lounge television 662 and bedroom television 664, computer system 600 is configured to control the media playback operations of both lounge television 662 and bedroom television 664. In some examples, computer system 600 remains connected to lounge television 662 and bedroom television 664 when computer system 600 transitions from being positioned inside the first room of the hotel to being positioned outside the first room of the hotel. In some examples, computer system 600 ceases being connected to the computer systems in the first room of the hotel in response to computer system 600 transitioning to being positioned outside of the first room of the hotel.

In some embodiments, computer system 600 connects to lounge television 662 and bedroom television 664 based on a determination that computer system 600 is positioned within the first room of the hotel and that computer system 600 has credentials (e.g., a digital room key and/or a passcode that corresponds to the first room of the hotel) that correspond to the first room of the hotel. In some embodiments, computer system 600 connects to lounge television 662 and bedroom television 664 based on a determination that computer system 600 has credentials (e.g., a digital room key and/or a passcode that corresponds to the first room of the hotel) that correspond to the first room of the hotel. In some embodiments, computer system connects to lounge television 662 and bedroom television 664 in response to computer system 600 successfully performing an authentication process with lounge television 662 and/or bedroom television 664. In some embodiments, computer system connects to lounge television 662 and bedroom television 664 prior to computer system 600 successfully performing an authentication process with lounge television 662 and/or bedroom television 664 (e.g., and wherein successfully performing the authentication process with (e.g., with one or more of) lounge television 662 or bedroom television 664 is required before their playback can be controlled by computer system 600). At FIG. 6C, computer system 600 detects tap input 605c directed at media streaming control 608a.

As illustrated in FIG. 6D, in response to detecting tap input 605c, computer system 600 displays device selection user interface 610. As discussed above, device selection user interface 610 includes a list of computer systems whose media playback operations computer system 600 can control and/or computer systems that are connected to computer system 600. As illustrated in FIG. 6D, because computer system 600 is connected to lounge television 662 and bedroom television 664, computer system 600 displays device selection user interface 610 with lounge television control 610c (e.g., representative of lounge television 662) and bedroom television control 610d (representative of bedroom television 664) under device type indicator 610b. Lounge television control 610c includes lounge television icon 610c1 that is a graphical representation of lounge television 662 and lounge television name 610c2 that indicates the name assigned to lounge television 662. Further, bedroom television control 610d includes bedroom television icon 610d1 that is a graphical representation of bedroom television 664 and bedroom television name 610d2 that indicates the name assigned to bedroom television 664.

At FIG. 6D there are two computer systems positioned within the first room of the hotel (e.g., room 101) and both are televisions. In some examples there are more than two computer systems positioned within the room that is registered with computer system 600. there are less than two computer systems positioned within the room registered with computer system 600. In some examples, a computer system positioned within the room that is registered with computer system 600 is a different type of device that does not include displays, such as speakers, exercise equipment, and/or printers.

FIG. 6E illustrates an alternative embodiment where the second room of the hotel (e.g., room 102) is registered with computer system 600 (e.g., and the first room of the hotel (e.g., room 101) is not registered with computer system 600). At FIG. 6E, as indicated by the positioning of representation of computer system 600-1 within diagram 602, computer system 600 is positioned within the second room of the hotel.

At FIG. 6E, computer system 600 is positioned within the second room of the hotel (e.g., room 102) while the second room of the hotel is registered with computer system 600. At FIG. 6E, based on the determination being made that computer system 600 is positioned within the second room of the hotel while the second room of the hotel is registered with computer system 600, computer system 600 connects to bedroom television 674 (e.g., represented by television representation 602h-1 in FIG. 6A) that is positioned within the second room of the hotel (e.g., and does not connect to lounge television 662 and bedroom television 664 that are positioned in the first room of the hotel).

As illustrated in FIG. 6E, because computer system 600 is connected to bedroom television 674, computer system 600 displays device selection user interface 610 with bedroom television control 610e that corresponds to bedroom television 674. At FIG. 6E, computer system 600 does not display lounge television control 610c and/or bedroom television control 610d within device selection user interface 610 because computer system 600 is not connected to lounge television 662 and/or bedroom television 664 (e.g., as a result of the second room of the hotel (e.g., room 102) being registered with computer system 600 and not the first room of the hotel).

Figure 6F:
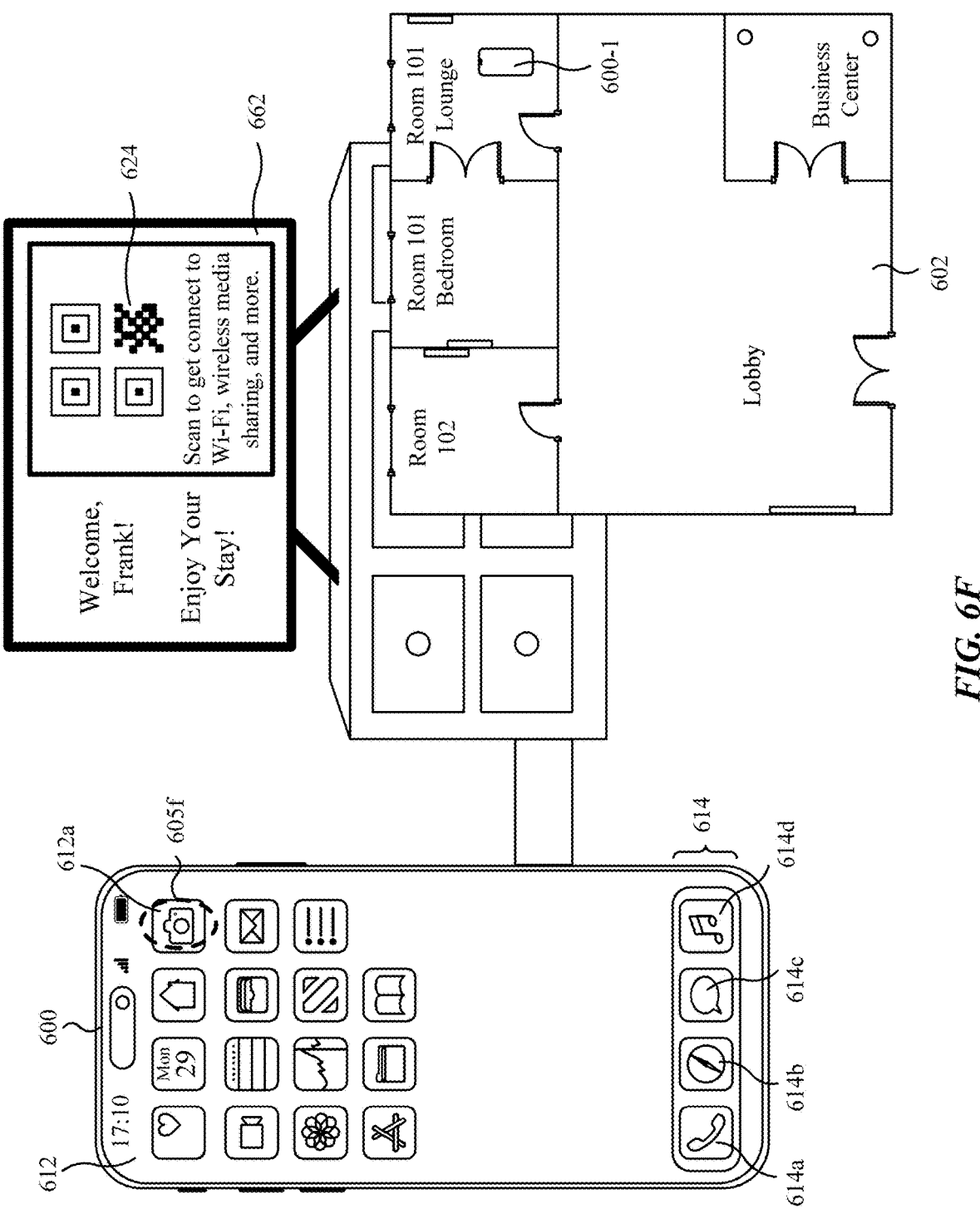
Figure 6G:
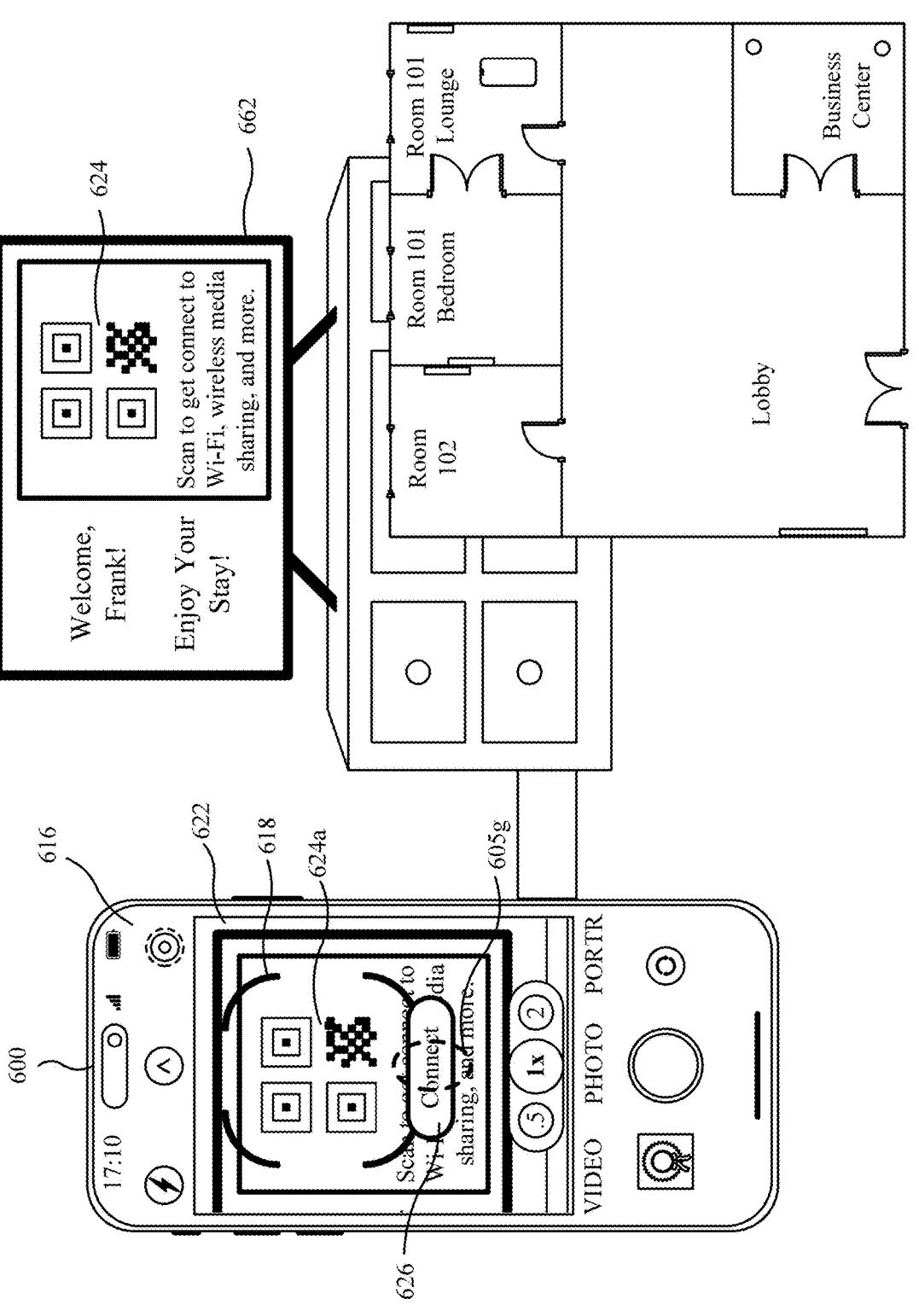
Figure 6H:
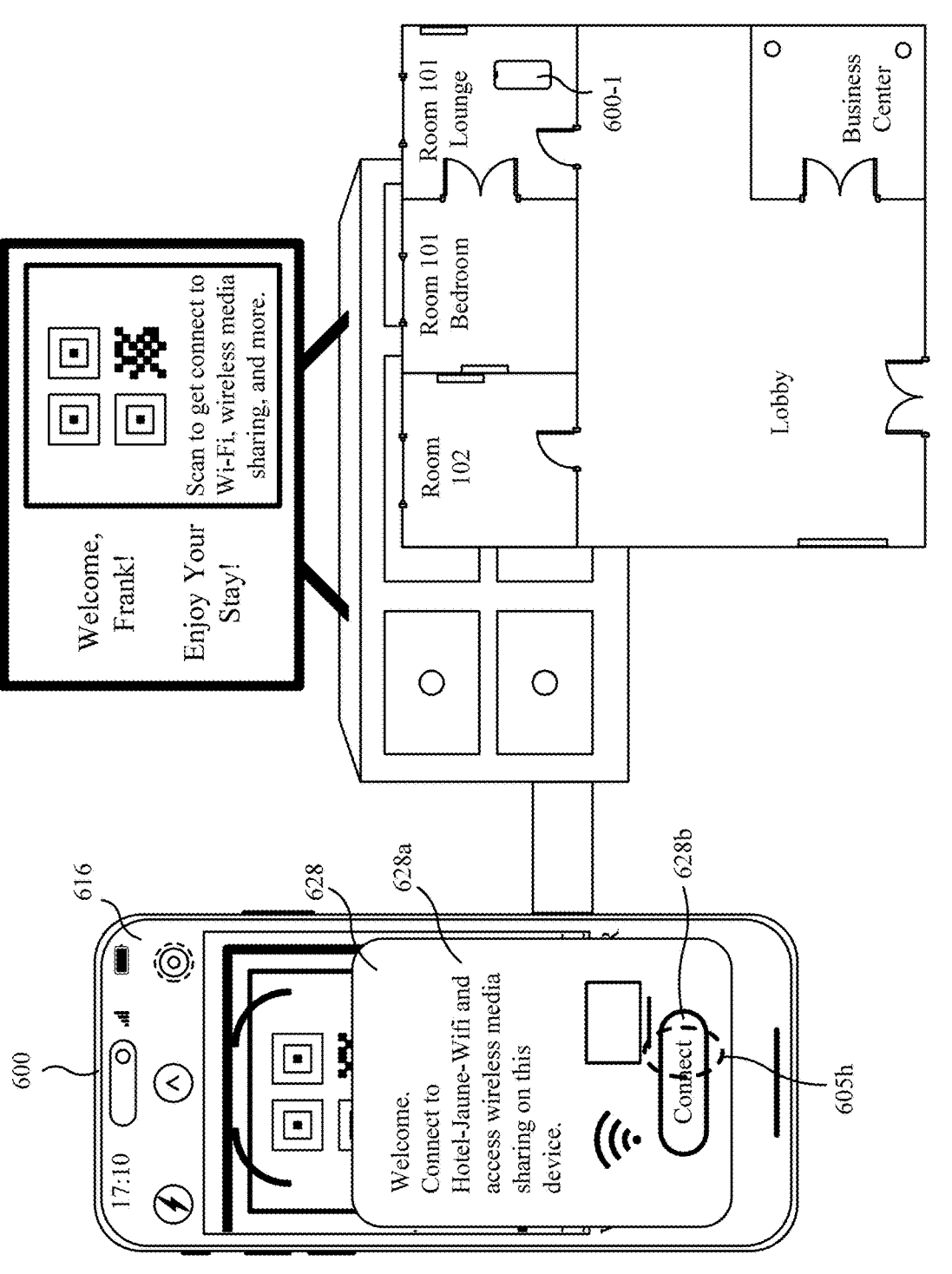
Figure 6I:
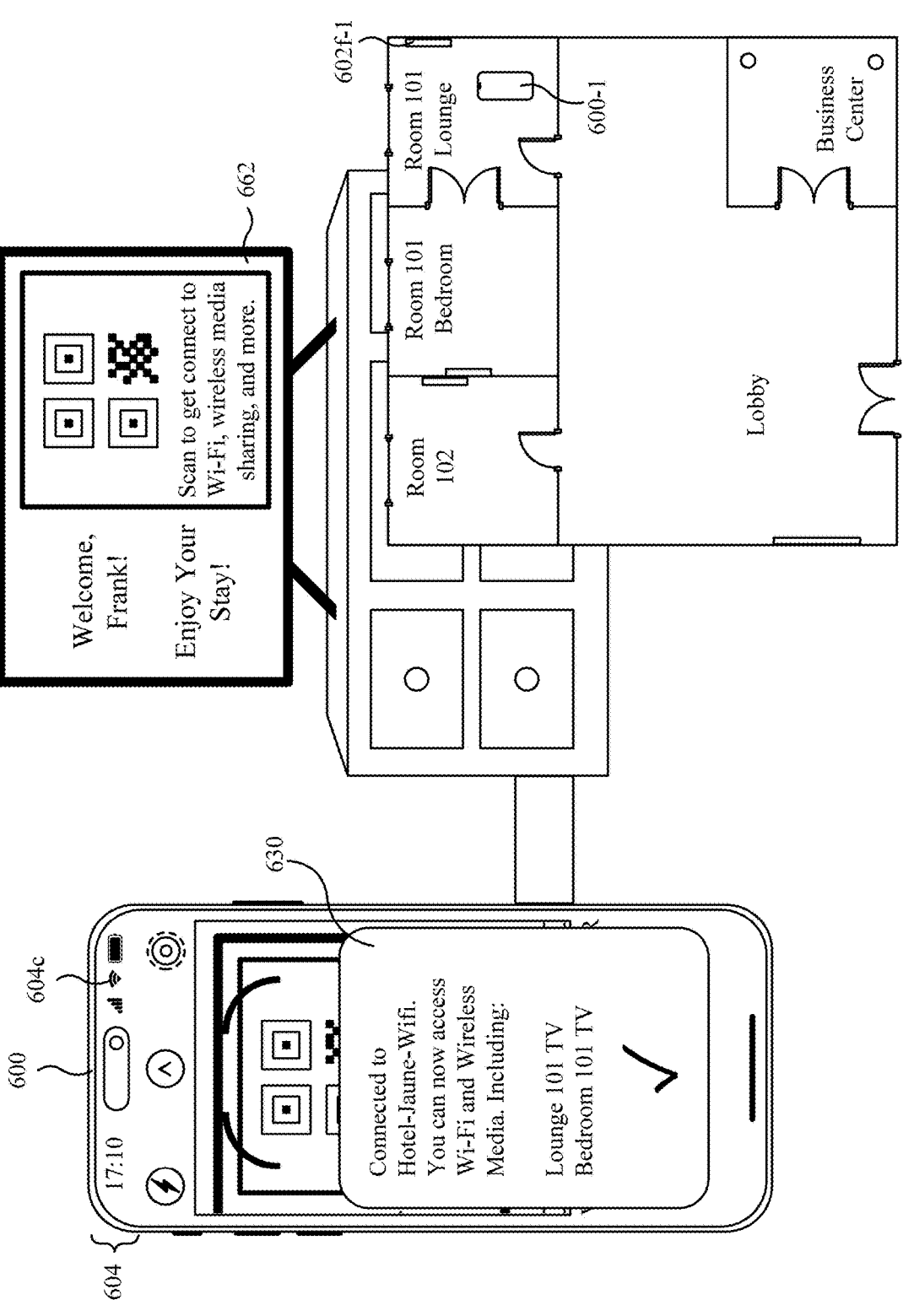
Figure 6J:
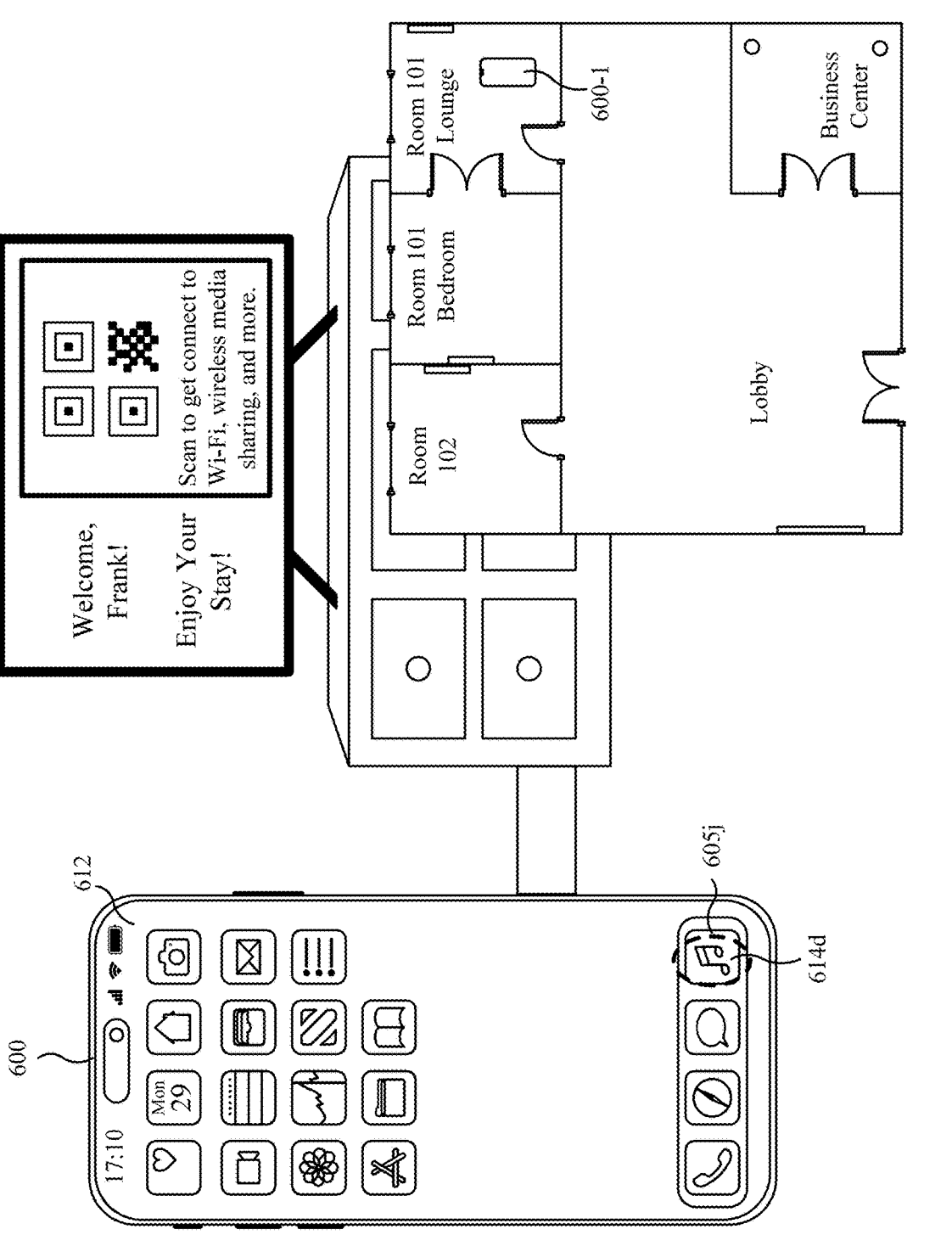
Figure 6K:
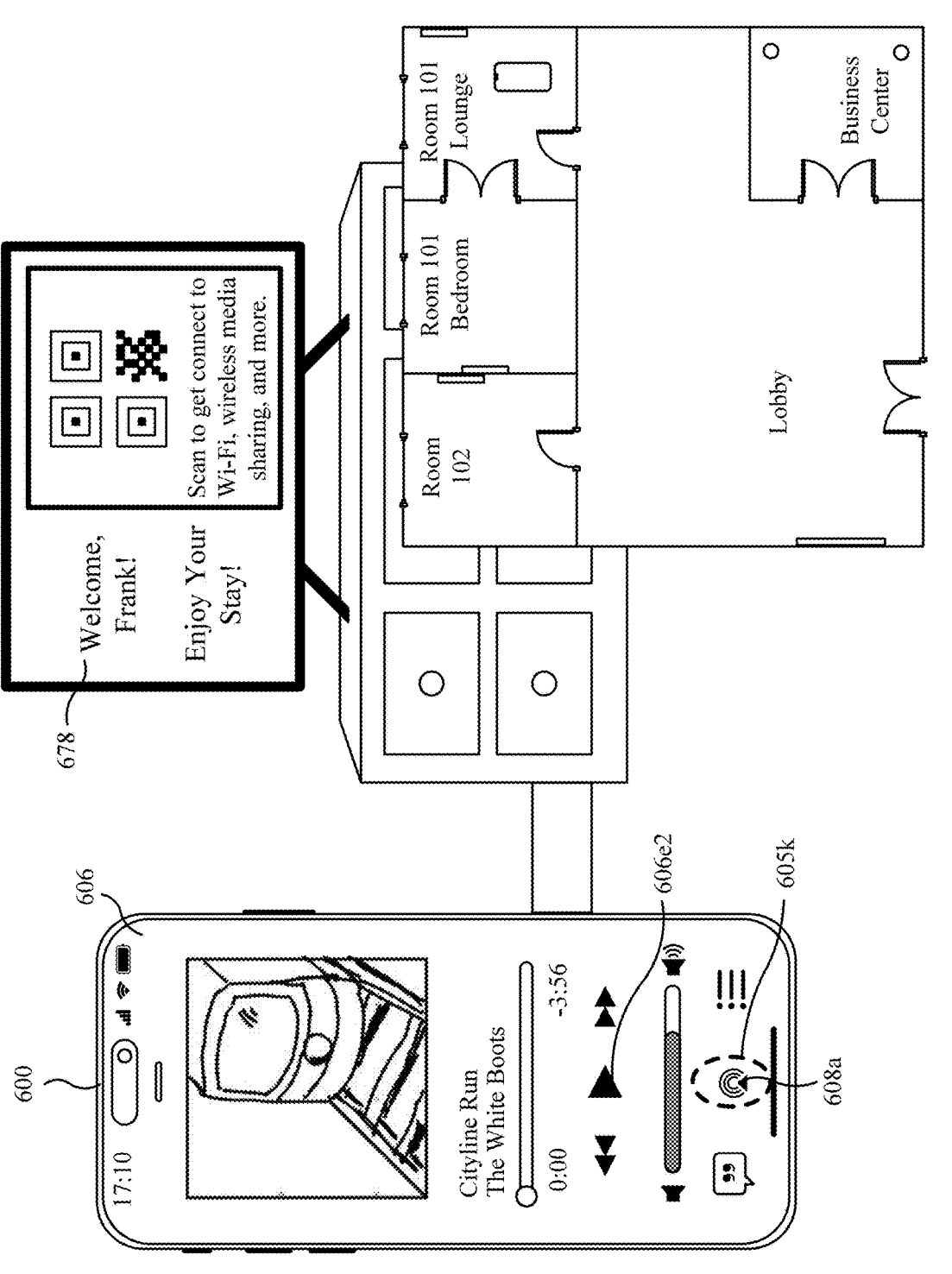
Figure 6L:
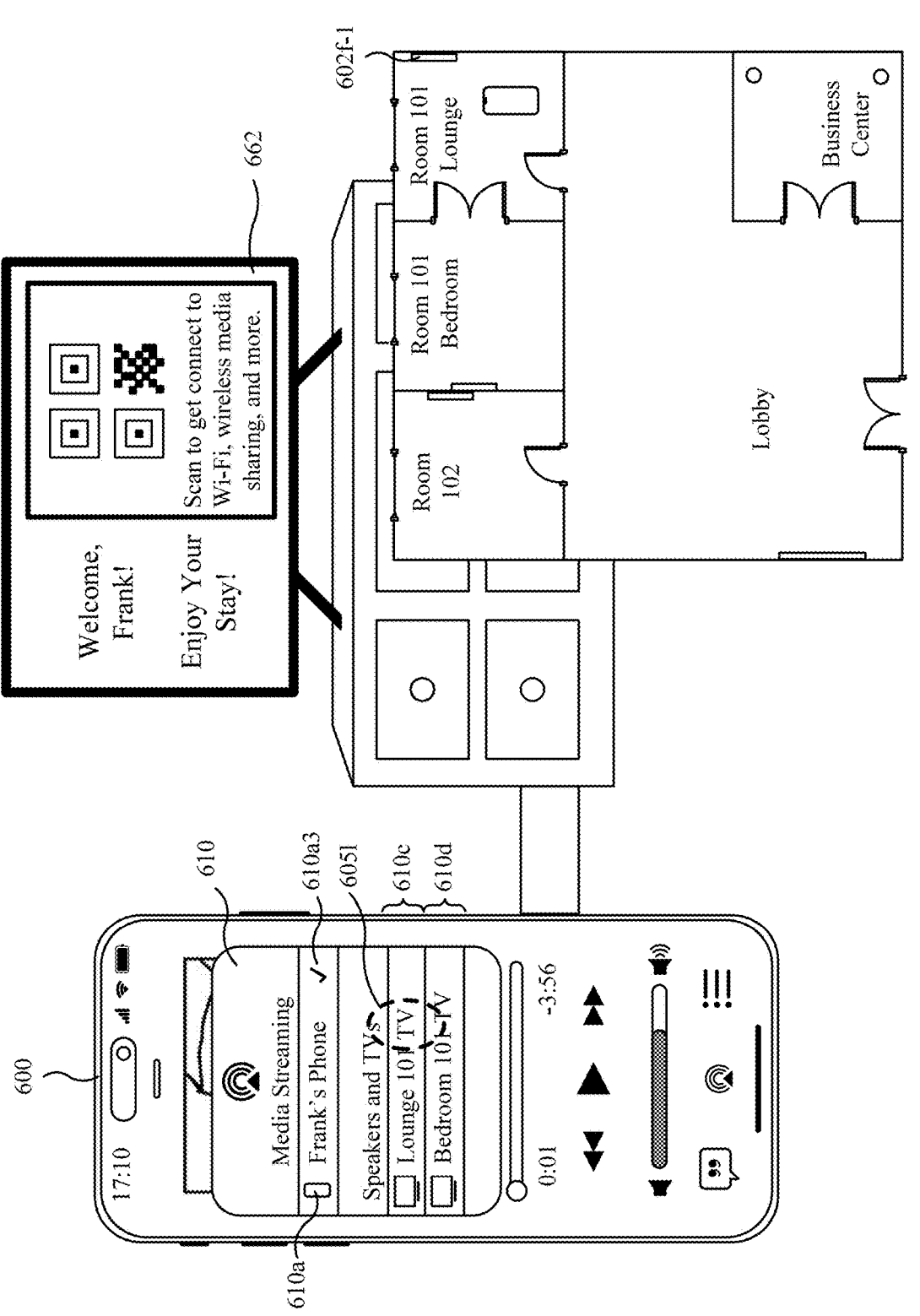
Figure 6M:
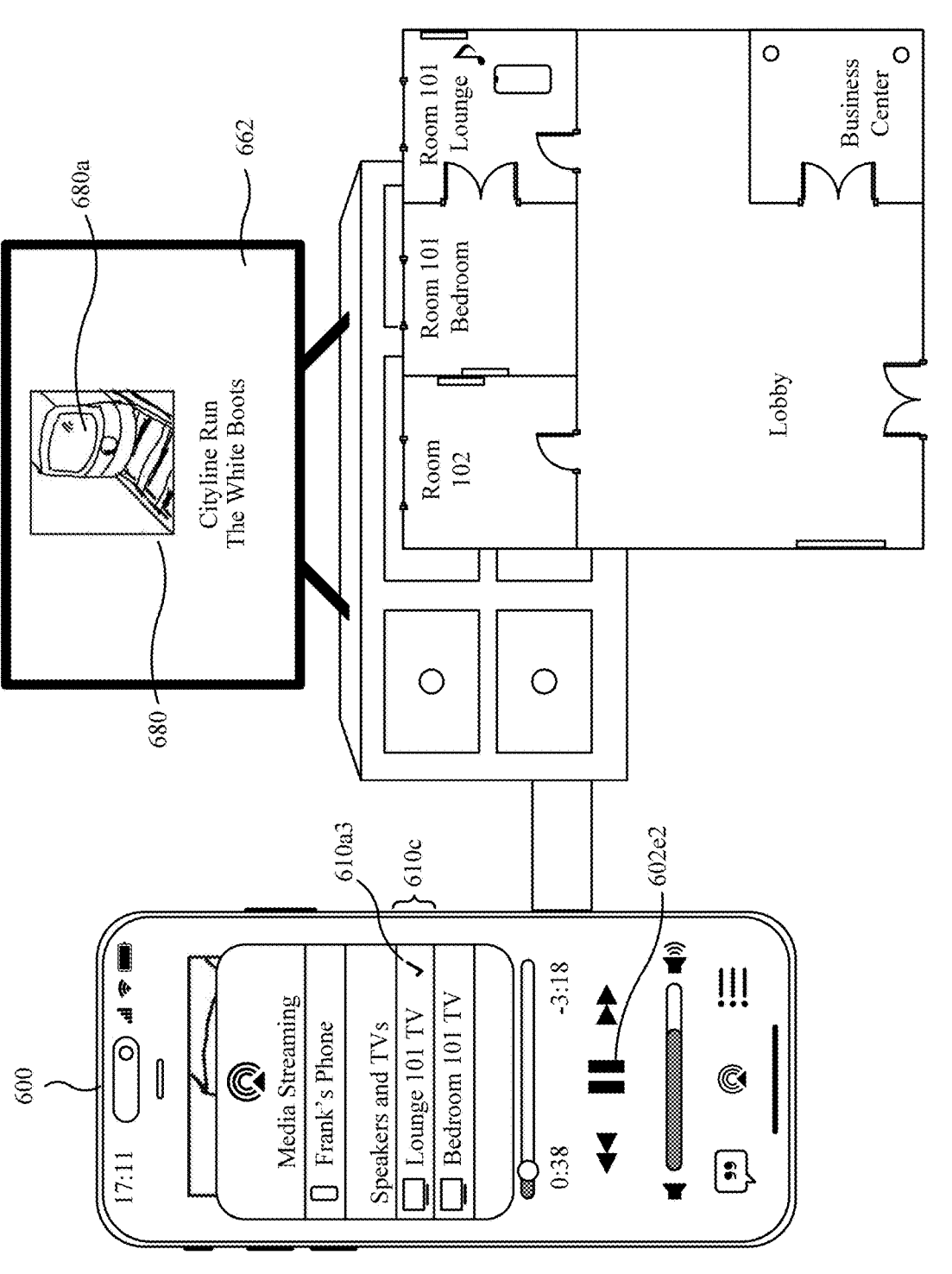
Figure 6N:
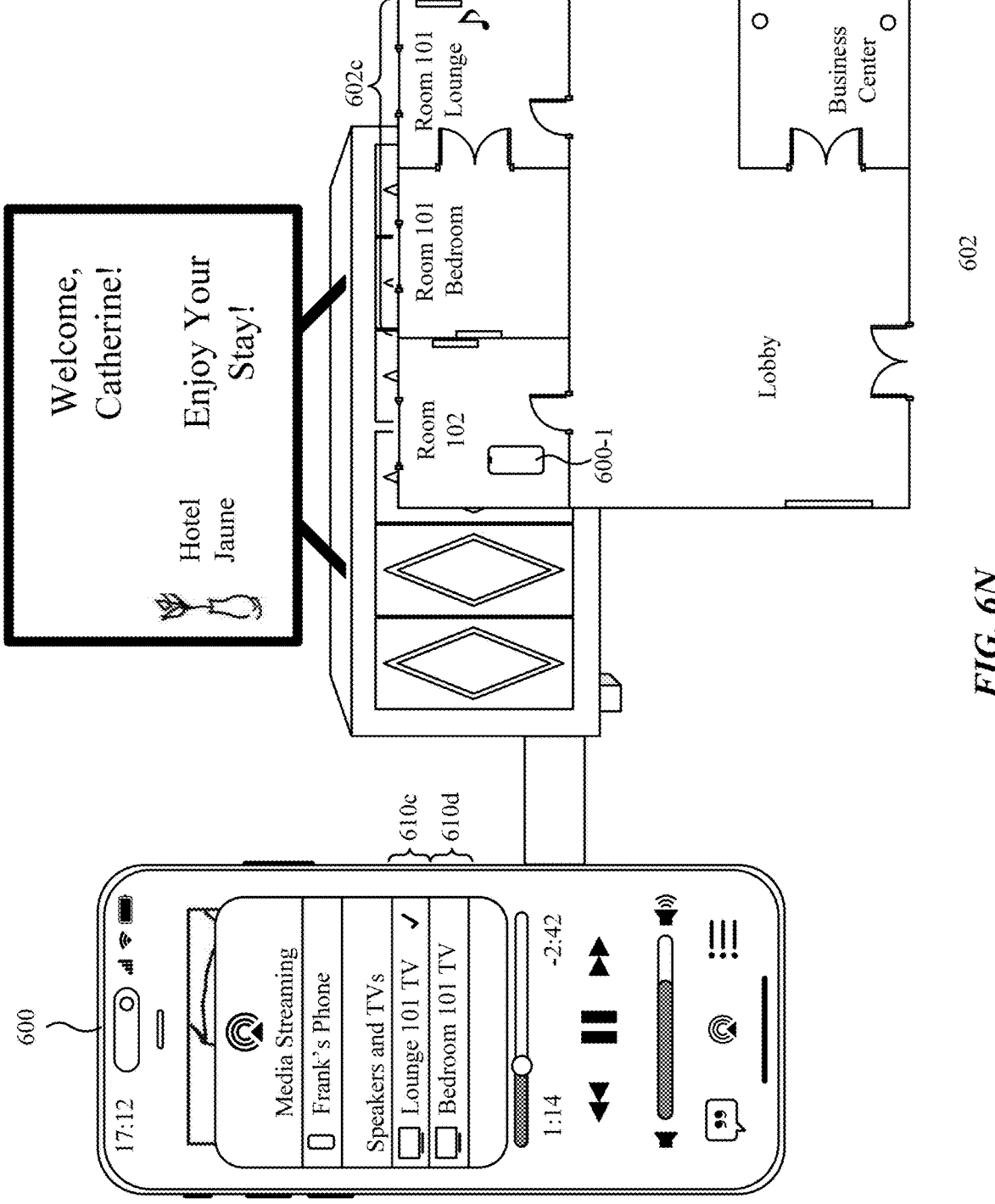
Figure 6O:
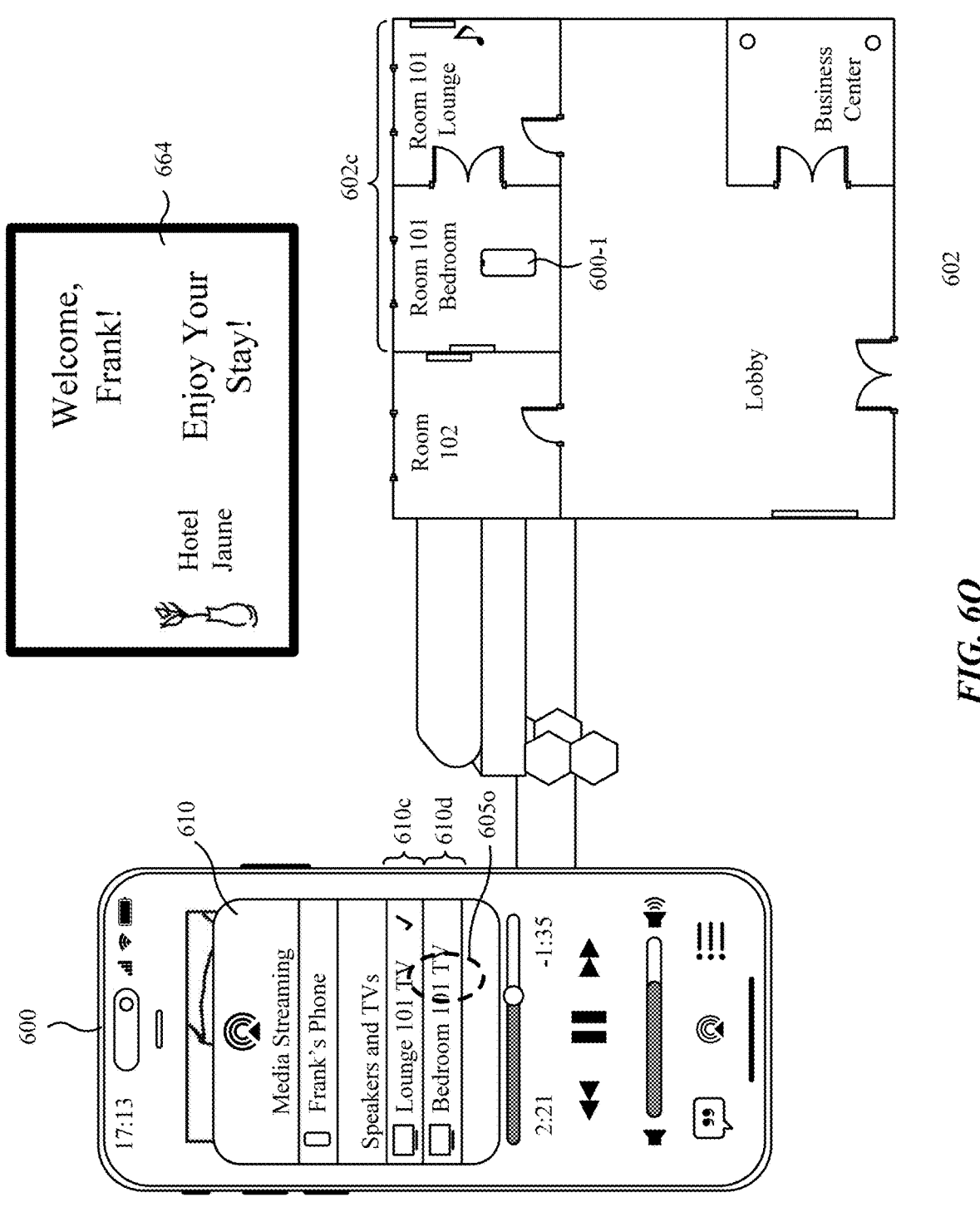
Figure 6P:
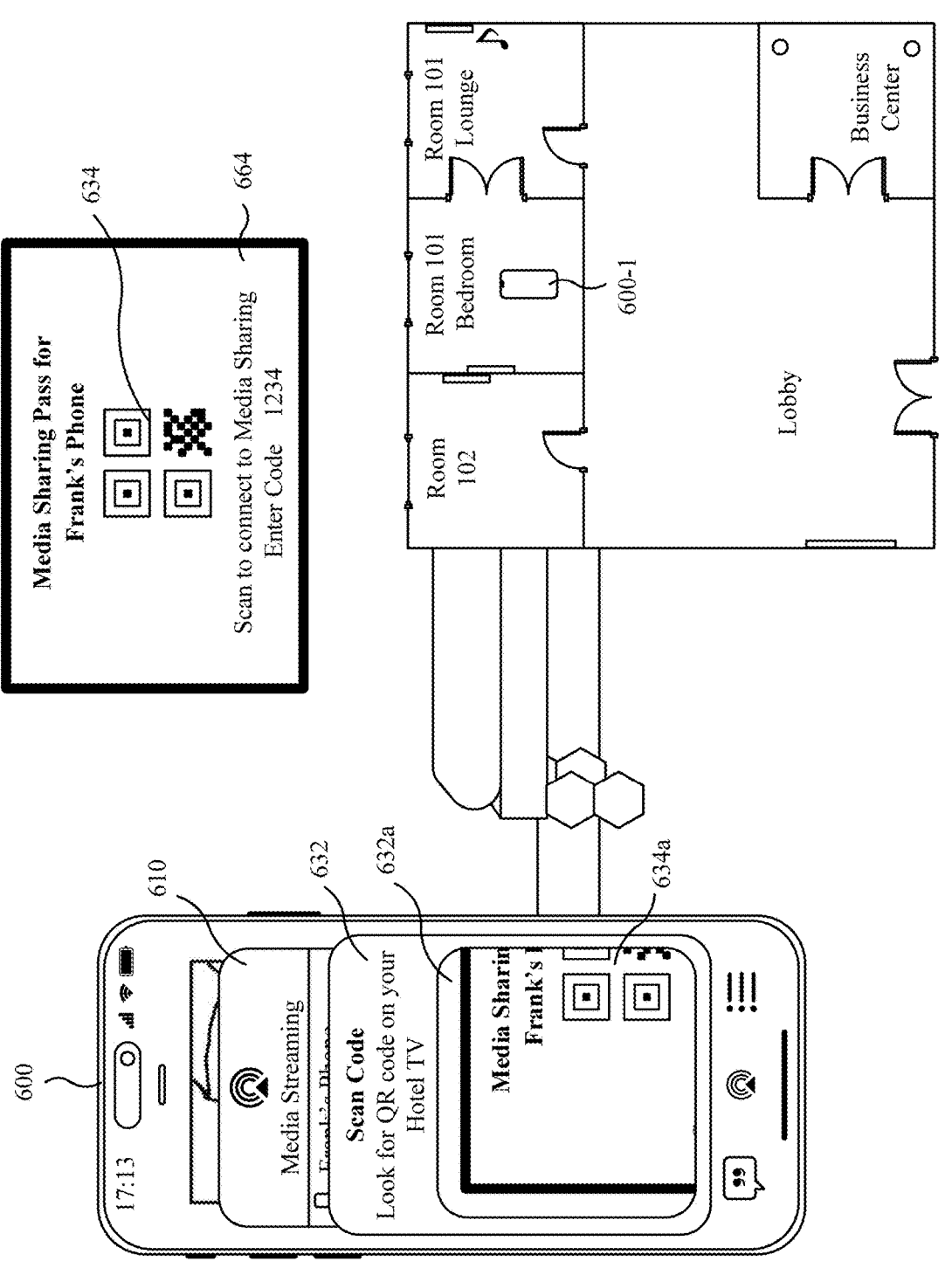
Figure 6Q:
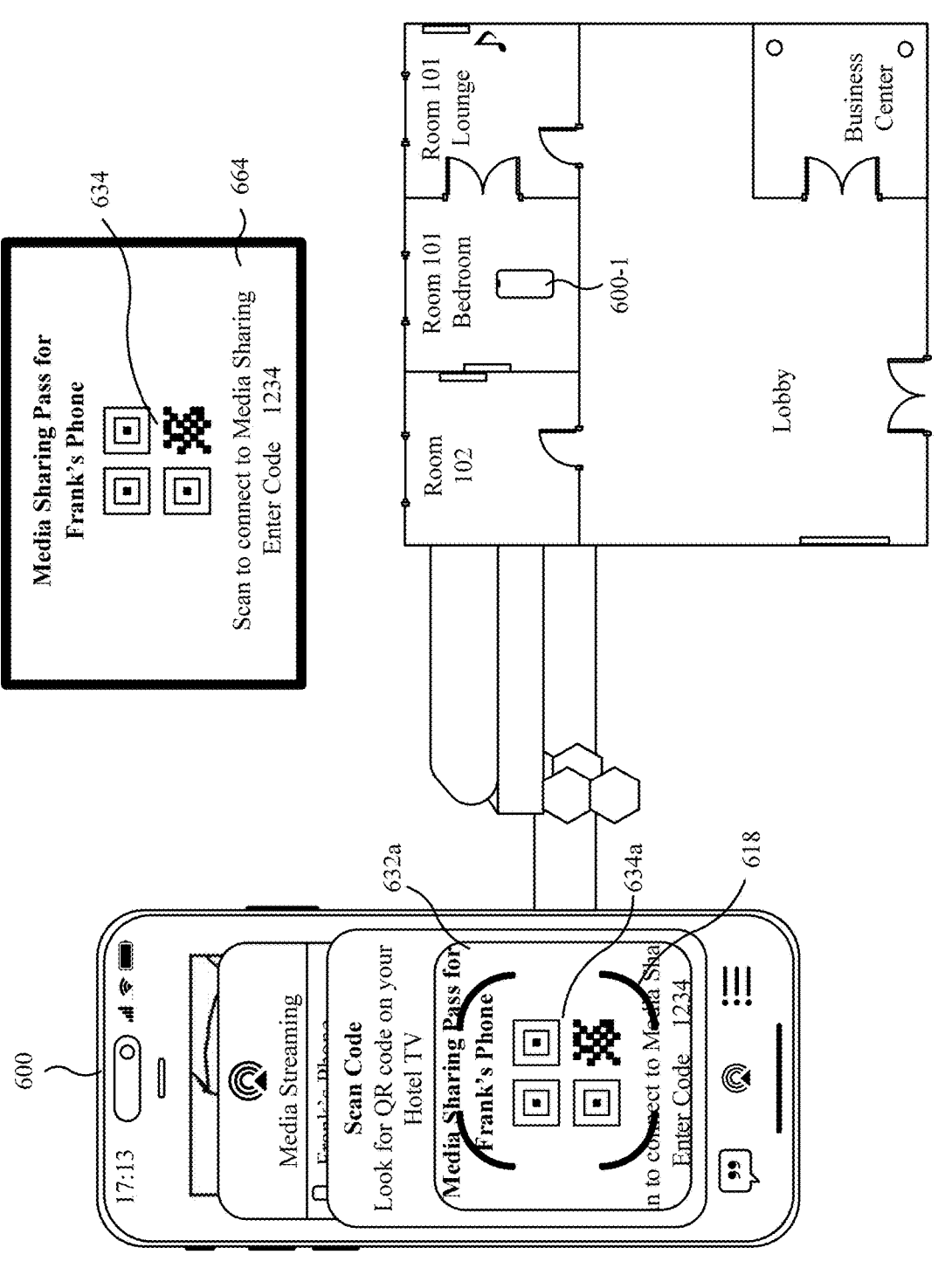
Figure 6R:
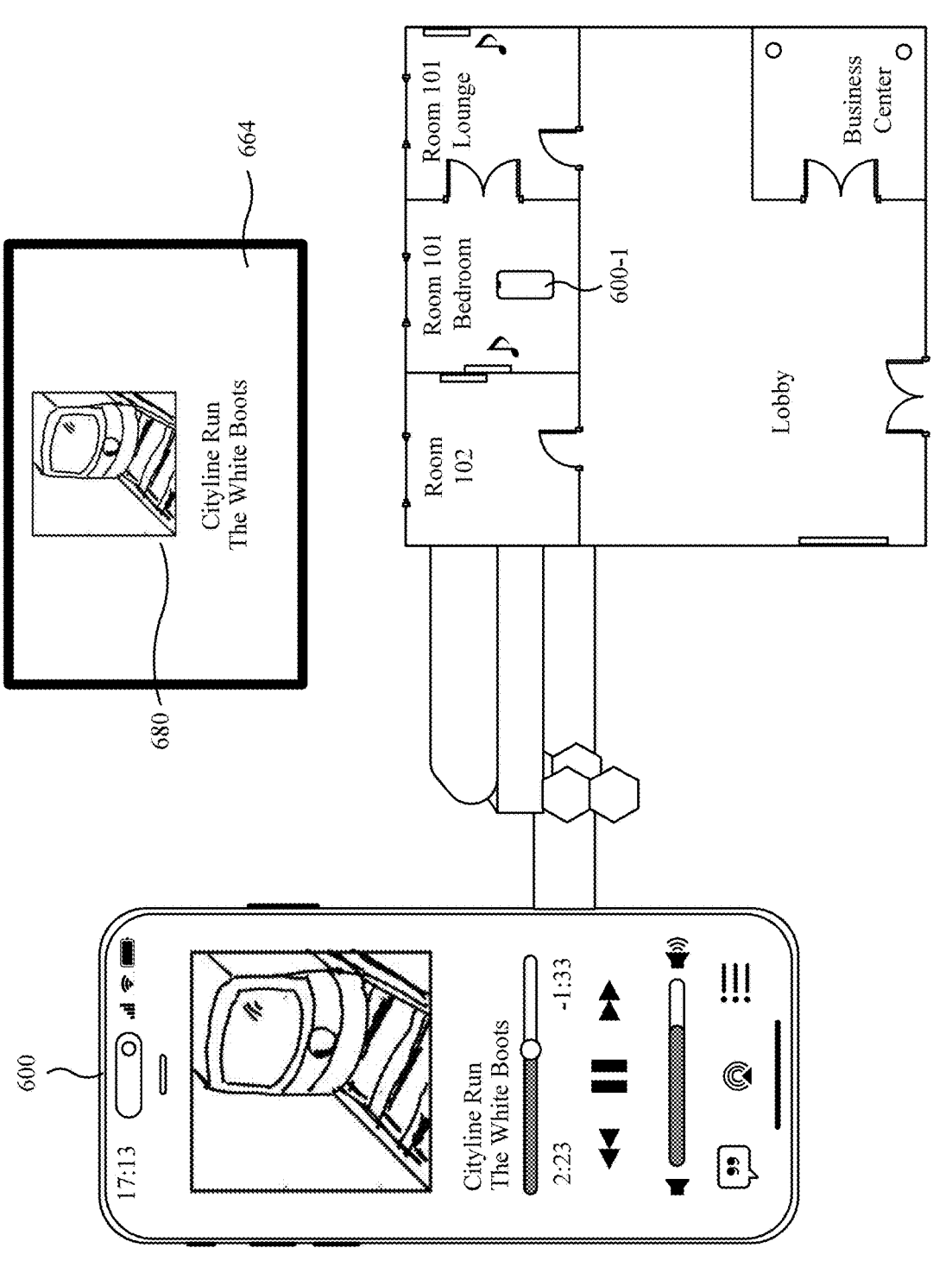
Figure 6S:
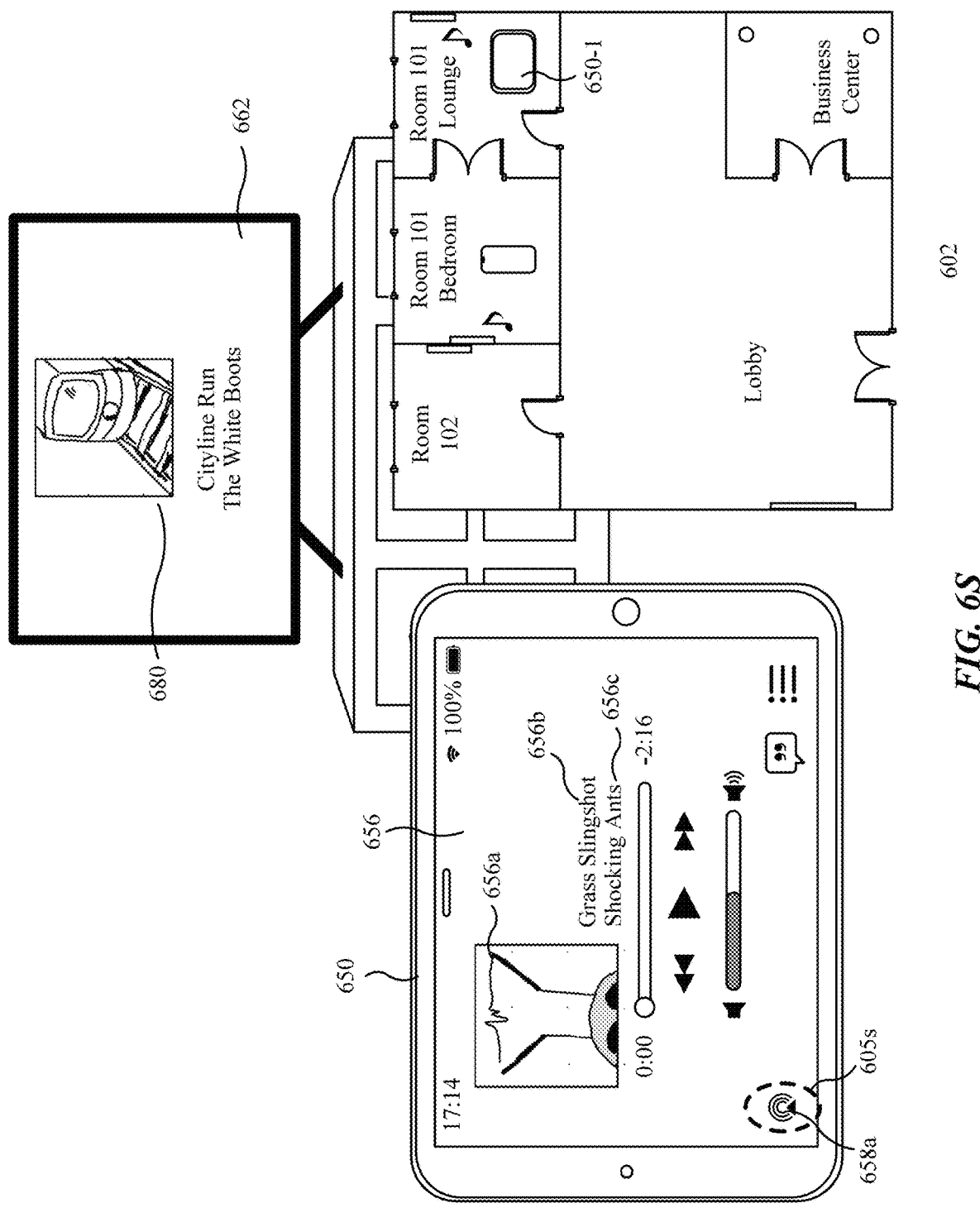
Figure 6T:
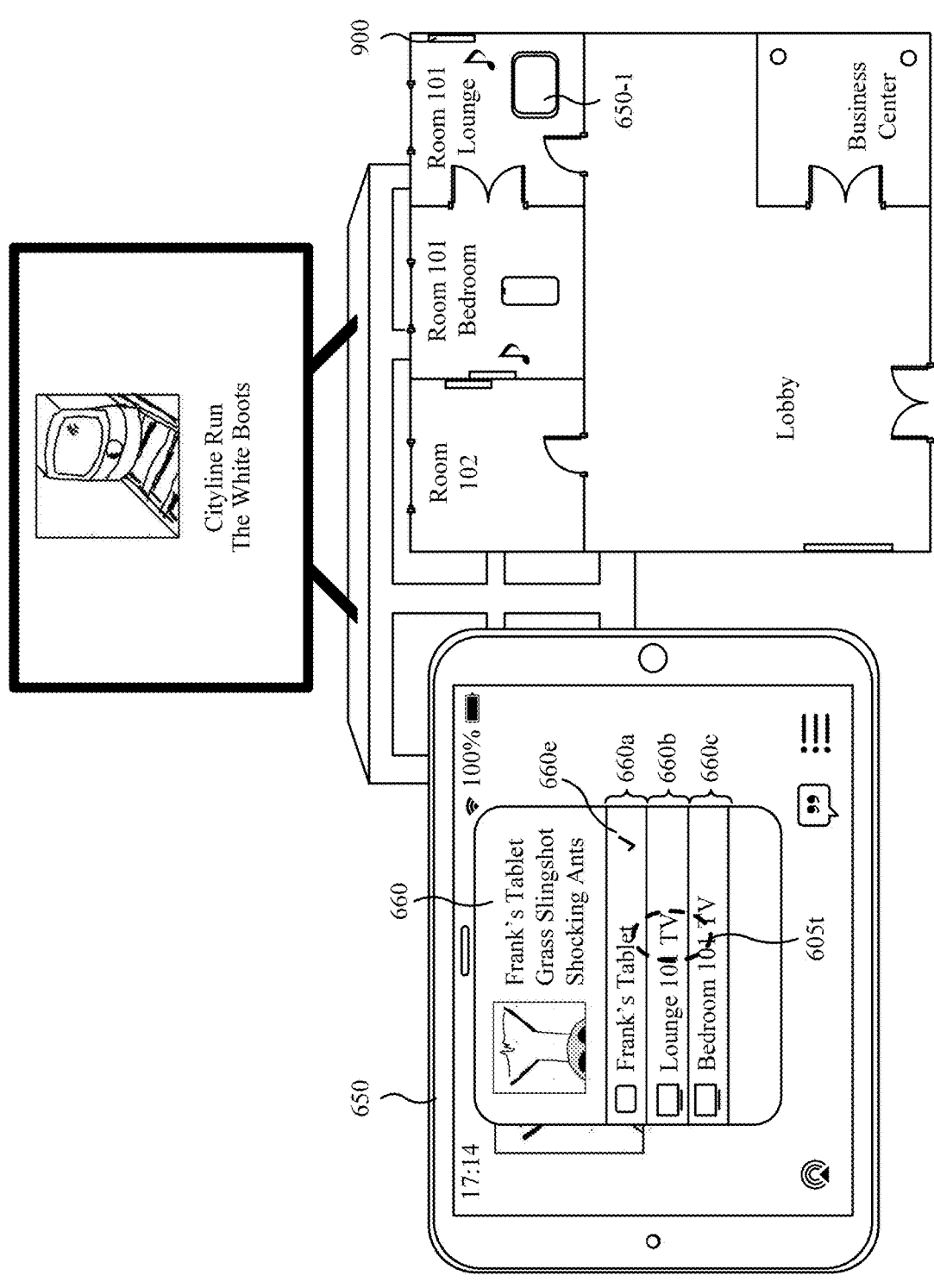
Figure 6U:
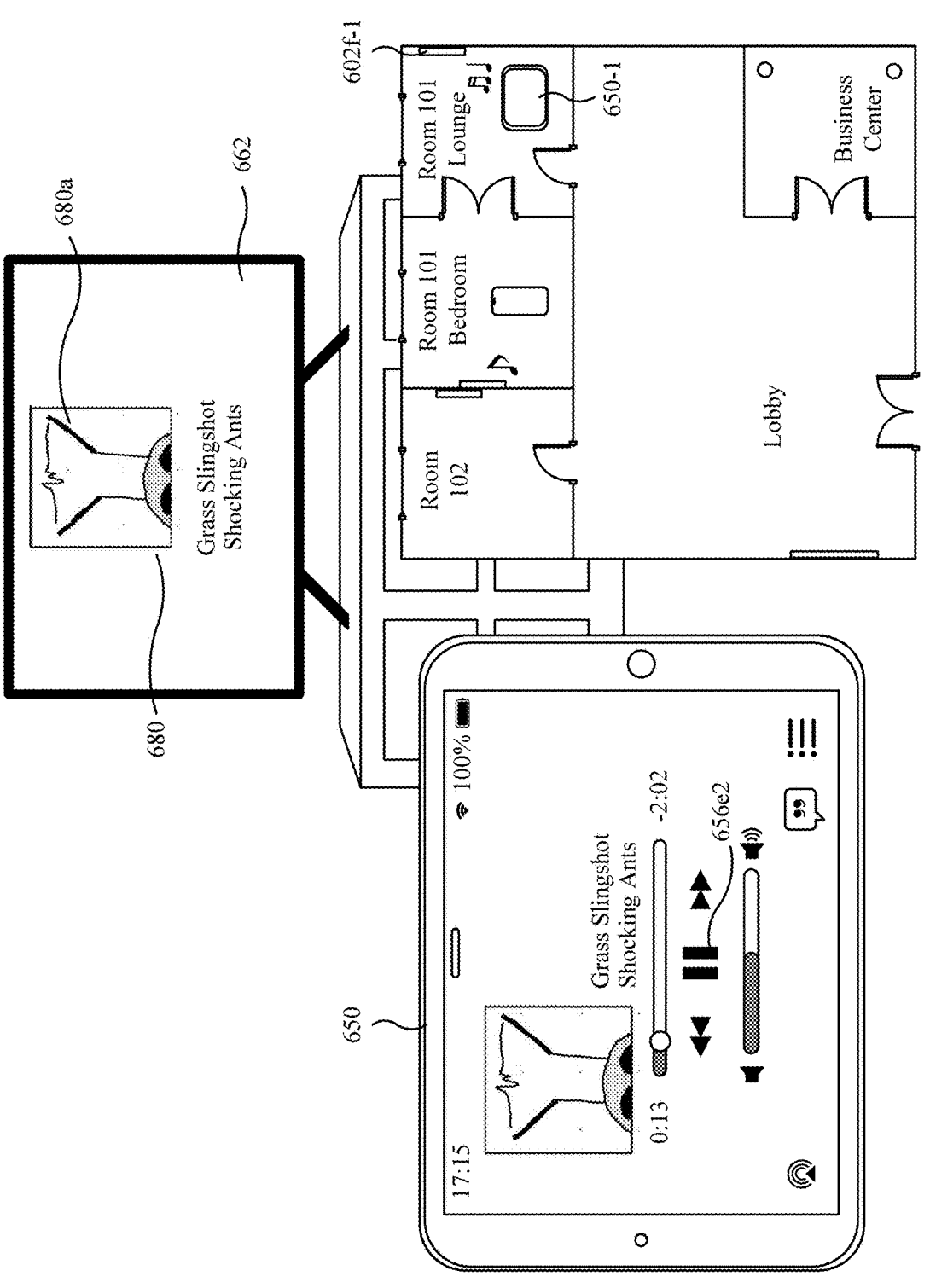

FIGS. 6F-6U illustrate a second method for connecting computer system 600 to external computer systems. The method illustrated in FIGS. 6F-6U involves computer system 600 performing an authentication process with one or more external computer systems. In some examples, the authentication process involves the one or more external computer systems providing an output (e.g., an audio output, visual output, and/or haptic output) that computer system 600 detects.

At FIG. 6F, as indicated by the positioning of representation of computer system 600-1 within diagram 602, computer system 600 is positioned within the lounge of the first room of the hotel (e.g., room 101). As illustrated in FIG. 6F, computer system 600 displays home user interface 612. Home user interface 612 includes graphical representations of various applications that are installed on computer system 600. As illustrated in FIG. 6F, home user interface 612 includes camera control 612a that corresponds to a camera application that is installed on computer system 600. Additionally, as illustrated in FIG. 6F, home user interface 612 includes quick controls 614 below camera control 612a. Quick controls 614 include phone control 614a, phone control 614b, chat control 614c, and media control 614d.

At FIG. 6F, the first room of the hotel (e.g., room 101) is registered with computer system 600 (e.g., and the second room of the hotel (e.g., room 102) is not registered with computer system 600). Because the first room of the hotel is registered with computer system 600, computer system 600 is granted permission to control lounge television 662 and bedroom television 664. However, at FIG. 6F, although computer system 600 is granted permission to control lounge television 662 and bedroom television 664, computer system 600 is not connected to lounge television 662 or bedroom television 664. At FIG. 6F, because computer system 600 is not connected to lounge television 662 and bedroom television 664, computer system 600 cannot control the media playback operations of lounge television 662 and bedroom television 664. For example, if device selection user interface 610 is accessed, computer system 600 would not display controls for lounge television 662 and bedroom television 664 (e.g., similar to as shown and describe above with respect to FIG. 6B).

As illustrated in FIG. 6F, lounge television 662 displays lounge quick reference ("QR") code 624. In some examples, lounge television 662 displays lounge QR code 624 in response to computer system 600 initially entering the first room of the hotel (e.g., room 101). In some examples, lounge television 662 displays lounge QR code 624 in response to lounge television 662 detecting an input. In some examples, lounge television 662 displays lounge QR code 624 based on received registration/registration information (e.g., and begins displaying during the designated reservation period). At FIG. 6F, computer system 600 detects tap input 605*f* directed at camera control 612*a*.

As illustrated in FIG. 6G, in response to detecting tap input 605*f*, computer system 600 displays camera user interface 616 which includes live preview 622 (e.g., a virtual viewfinder). Live preview 622 is a representation of a field of view of one or more cameras that are in communication (wireless communication and/or wired communication) with computer system 600. At FIG. 6G, lounge QR code 624 is within the field of view of the one or more cameras that are in communication with computer system 600. Accordingly, as illustrated in FIG. 6G, live preview 622 includes representation of lounge QR code 624*a*. In some examples, live preview 622 is a representation of a field of view of two or more cameras that are in communication with computer system 600. In some examples, live preview 622 is a representation of a field of view of a single camera that is in communication with computer system 600.

At FIG. 6G, computer system 600 detects lounge QR code 624 within the field of view of the one or more cameras. As illustrated in FIG. 6G, in response to detecting lounge QR code 624 within the field of view of the one or more cameras, computer system 600 displays QR detection indicator 618 and QR connection control 626. Computer system 600 displays QR detection indicator 618 around the representation of lounge QR code 624*a* included within live preview 622 to indicate that computer system 600 detects lounge QR code 624. At FIG. 6G, computer system 600 detects tap input 605*g* directed at QR connection control 626.

As illustrated in FIG. 6H, in response to detecting tap input 605*g*, computer system 600 displays connection identification user interface 628 overlaid on camera user interface 616. As illustrated in FIG. 6H, connection identification user interface 628 includes connection identification indicator 628*a* and connect control 628*b*. Connection identification indicator 628*a* includes the name of a network that computer system 600 will connect to in response to the selection of connect control 628*b*. In some examples, computer system 600 ceases to display camera user interface 616 as a part of displaying connection identification user interface 628. At FIG. 6H, computer system 600 detects tap input 605*h* directed to connect control 628*b*.

At FIG. 6I, in response to detecting tap input 605*h*, computer system 600 connects to the network that corresponds to (e.g., services) the first room of the hotel (e.g., room 101) (e.g., the network indicated by connection identification indicator 628*a*) and computer system 600 connects to lounge television 662 and bedroom television 664 positioned within the first room of the hotel. As illustrated in FIG. 6I, because computer system 600 successfully connects to the network, computer system 600 displays network indicator 604*c* within status region 604. At FIG. 6I, because computer system 600 detects lounge QR code 624 (e.g., as displayed by lounge television 662) as part of connecting to lounge television 662, computer system 600 is authenticated with respect to lounge television 662 (e.g., and is not authenticated with respect to bedroom television 664). In some examples, computer system 600 is connected to the network before computer system 600 connects to lounge television 662 and bedroom television 664 (e.g., computer system 600 connects to the network when the first room of the hotel is registered with computer system 600. In some examples, lounge television 662 and/or bedroom television 664 are connected to the same network that computer system 600 connects to.

As illustrated in FIG. 6I, as a part of computer system 600 successfully connecting to the network and/or lounge television 662 and/or bedroom television 664, computer system 600 displays connection confirmation user interface 630. In this example, connection confirmation user interface 630 includes the name of the network that computer system 600 is connected to as well as the names of lounge television 662 and bedroom television 664. In some examples, connection confirmation user interface 630 is not displayed.

As illustrated in FIG. 6J, computer system 600 displays home user interface 612. Computer system 600 displays home user interface 612 in response to computer system 600 detecting (e.g., at FIG. 6I) a set of one or more inputs (e.g., corresponding to a request to display home user interface 612). At FIG. 6J, computer system 600 detects tap input 605*j* directed at media control 614*d*. In some examples, computer system 600 detects an input directed at a control that corresponds to video player application such as an internet video streaming application or a video entertainment streaming application. In some examples, computer system 600 detects an input directed at a control that corresponds to an audio player application such as a podcast application, a music streaming application, and/or a radio streaming application.

As illustrated in FIG. 6K, in response to detecting tap input 605*j*, computer system 600 displays media player user interface 606. At FIG. 6K, the display of media player user interface 606 corresponds to the playback of the first media item. At FIG. 6K, as indicated by computer system 600 displaying play/pause control 606*e2* as a triangle, the first media item that is represented by media art 606*a* is currently not being played back. At FIG. 6K, computer system 600 detects tap input 605*k* directed at media streaming control 608*a*.

As illustrated in FIG. 6L, in response to detecting tap input 605*k*, computer system 600 displays device selection user interface 610. As illustrated in FIG. 6L, because computer system 600 is connected to lounge television 662 and bedroom television 664 (e.g., while computer system 600 is granted permission to control the media playback operations of lounge television 662 and bedroom television 664), device selection user interface 610 includes lounge television control 610*c* (e.g., representative of lounge television 662) and bedroom television control 610*d* (e.g., representative of bedroom television 664).

As illustrated in FIG. 6L, computer system 600 displays current selection indicator 610*a3* within current device control 610*a* to indicate that, at FIG. 6L, computer system 600 is the designated computer system that is configured to output (e.g., via one or more speakers) the playback the first media item (e.g., computer system 600 outputs the media when the playback of media item is initiated and/or resumed). At FIG. 6L, computer system 600 detects tap input 605*l* directed to lounge television control 610*c*.

At FIG. 6M, in response to detecting tap input 605*l*, computer system 600 causes lounge television 662 to initiate the playback of the first media item. As illustrated in FIG. 6M, as part of causing lounge television 662 to initiate playback of the first media item, computer system 600 causes lounge television 662 to display playback user interface 680. Playback user interface 680 corresponds to the playback of the first media item on lounge television 662. As illustrated in FIG. 6M, playback user interface 680 includes media art 680*a* that is a graphical representation of the first media item. Further, as illustrated in FIG. 6M, because lounge television 662 plays back the first media item, computer system 600 displays play/pause control 606*e*2 as two parallel bars to indicate that the first media item is being played back. In some examples, the first media item is a video media item (e.g., and is output by lounge television 662).

Further, as illustrated in FIG. 6M, computer system 600 displays current selection indicator 610*a*3 within lounge television control 610*c* (e.g., and not current device control 610*a*) to indicate that lounge television 662 is the designated computer system configured to output (e.g., via one or more speakers) the playback of the first media item (e.g., lounge television 662 outputs the media when the playback of media item is initiated and/or resumed). At FIG. 6M, computer system 600 is moved to the second room of the hotel (e.g., room 102).

At FIG. 6N, as indicated by the positioning of representation of computer system 600-1 within diagram 602, computer system 600 is positioned within the second room of the hotel (e.g., room 102). The second room (e.g., room number 102) of the hotel is not registered with computer system 600 nor is computer system 600 associated with the second room of the hotel. As illustrated in FIG. 6N, although computer system 600 is not positioned within the first room of the hotel (e.g., room 101), computer system 600 continues to display device selection user interface 610 with lounge television control 610*c* and bedroom television control 610*d*. That is, computer system 600 remains connected to (e.g., and able to control media operations of) lounge television 662 and bedroom television 664 while computer system 600 is not positioned within the first room of the hotel. In some examples, computer system 600 ceases being connected to lounge television 662 and bedroom television 664 in response to computer system 600 no longer being connected to the network that services the hotel and/or the first room of the hotel. In some examples, computer system 600 connects to computer systems positioned in the second room of the hotel and is able to control the media operations of the computer systems positioned in the second room of the hotel in response to computer system 600 being authorized from an external computer system that is registered with the second room of the hotel (e.g., an external computer system that belongs to a guest of the hotel that is registered (e.g., has checked in) with the second room of the hotel). In some examples, lounge television 662 continues to play back the first media item while computer system 600 is positioned within the second room of the hotel. In some examples, lounge television 662 ceases to play back the first media item based on a determination that computer system 600 is no longer within the first room of the hotel. In some examples, while computer system 600 is registered with the first room of the hotel and the second room of the hotel, computer system 600 disconnects from the computer systems positioned in the first room of the hotel and connects to the computer systems in the second room of the hotel based on a determination that computer system 600 moves from the first room of the hotel to the second room of the hotel. In some examples, while computer system 600 is connected to the computer systems in the first hotel room, computer system 600 connects to the computer systems in the second hotel room based on a determination that computer system 600 moves from the first room of the hotel to the second room of the hotel. At FIG. 6N, computer system 600 is moved to the bedroom of the first room of the hotel.

At FIG. 6O, as indicated by the positioning of representation of computer system 600-1 within diagram 602, computer system 600 is positioned within the bedroom of the first room of the hotel (e.g., room 101). As discussed above, the bedroom of the first room of the hotel includes bedroom television 664 (e.g., depicted in FIG. 6O). At FIG. 6O, bedroom television 664 does not display a respective QR code on its display when computer system 600 initially enters the bedroom of the first room of the hotel. As illustrated in FIG. 6O, computer system 600 continues to display device selection user interface 610 with lounge television control 610*c* and bedroom television control 610*d* while computer system 600 is positioned within the bedroom of the first room of the hotel. At FIG. 6O, computer system 600 detects tap input 605*o* directed at bedroom television control 610*d*.

At FIG. 6P, in response to detecting tap input 605*o*, computer system 600 initiates an authentication process with respect to bedroom television 664. At FIG. 6P, though computer system 600 is connected to bedroom television 664 (e.g., as discussed above), because computer system 600 has not previously performed an authentication process with respect to bedroom television 664, computer system 600 must successfully complete an authentication process with bedroom television 664 prior to computer system 600 being able to modify the media operations of bedroom television 664. As illustrated in FIG. 6P, as part of initiating the authentication process with respect to bedroom television 664, computer system 600 causes bedroom television 664 to display bedroom QR code 634.

As illustrated in FIG. 6P, as part of initiating the authentication process, computer system 600 displays camera user interface 632 as overlaid on device selection user interface 610. As illustrated in FIG. 6P, camera user interface 632 includes virtual viewfinder 632*a*. Virtual viewfinder 632*a* includes a representation of the field of view of the one or more cameras that are in communication with computer system 600. At FIG. 6P, the display of bedroom QR code 634 is not centered within the field of view of the one or more cameras. Accordingly, as illustrated in FIG. 6P, virtual viewfinder 632*a* includes a portion of representation of bedroom QR code 634*a*.

At FIG. 6P, because bedroom QR code 634 is not centered within the field of view of the one or more cameras, computer system 600 does not detect bedroom QR code 634. In some examples, computer system 600 does not detect bedroom QR code 634 because bedroom QR code 634 is too far away or too close to the one or more cameras. In some examples, computer system 600 does not detect bedroom QR code 634 because the one or more cameras have not focused in on bedroom QR code 634. At FIG. 6P, the positioning of computer system 600 is adjusted such that the bedroom QR code 634 is centered within the field of view of the one or more cameras.

At FIG. 6Q, bedroom QR code 634 is centered within the field of view of the one or more cameras. At FIG. 6Q, because bedroom QR code 634 is centered within the field of view of the one or more cameras, computer system 600 detects bedroom QR code 634. As illustrated in FIG. 6Q, in response to detecting bedroom QR code 634, computer system 600 displays QR detection indicator 618 around representation of bedroom QR code 634a included within virtual viewfinder 632a. Further, at FIG. 6Q, because computer system 600 detects bedroom QR code 634 (e.g., and exchanges data (e.g., based on the QR code) establishing authentication and/or satisfying authentication one or more criteria), computer system 600 successfully completes the authentication process with respect to bedroom television 664.

At FIG. 6R, in response to computer system 600 successfully completing the authentication process with respect to bedroom television 664, computer system 600 causes bedroom television 664 to initiate the playback of the first media item. That is, at FIG. 6R, both lounge television 662 and bedroom television 664 are playing back the first media item. As illustrated in FIG. 6R, computer system 600 causes bedroom television 664 to display playback user interface 680 as part of causing the initiation of the playback of the first media item on bedroom television 664. In some examples, computer system 600 transmits instructions to lounge television 662 that cause lounge television 662 to cease playing back the first media item in response to successfully completing the authentication process with respect to bedroom television 664. In some examples, the playback of the first media item on bedroom television 664 and lounge television 662 is synchronized. In some examples, the playback of the first media item on bedroom television 664 and lounge television 662 is not synchronized.

Additionally, at FIG. 6R, in response to successfully completing the authentication process, computer system 600 ceases to display virtual viewfinder 632a and device selection user interface 610. In some examples, computer system 600 continues to display device selection user interface 610 in response to successfully completing the authentication process.

FIGS. 6S-6U illustrate that the ability to control the playback operations of various computer systems is extended to other computer systems that share a common owner or are registered with a common user account as computer system 600. More specifically, FIGS. 6S-6U illustrate computer system 650 controlling the playback operations of various computer systems.

FIG. 6S illustrates computer system 650. Computer system 650 is a different type of computer system (e.g., a tablet) than computer system 600. Both computer system 650 and computer system 600 are registered with a common user account and/or are commonly owned. In some examples, as a result of computer system 650 and computer system 600 being registered with a common user account and/or commonly owned, the permission to control the media playback operations of lounge television 662 and bedroom television 664 received by computer system 600 is extended to computer system 650. Accordingly, computer system 650 has permission to control the media playback operations of lounge television 662 and bedroom television 664.

Further, at FIG. 6S, computer system 650 is connected to both lounge television 662 and bedroom television 664 based on computer system 600 being connected to lounge television 662 and bedroom television 664. That is, computer system 650 connects to both lounge television 662 and bedroom television 664 as a part of computer system 600 connecting to lounge television 662 and bedroom television 664. Accordingly, at FIG. 6S, computer system 650 is configured to control the media playback operations of both lounge television 662 and bedroom television 664 because computer system 650 is connected to both lounge television 662 and bedroom television 664 and has permission to control the media playback operations of lounge television 662 and bedroom television 664.

As illustrated in FIG. 6S, computer system 650 displays media user interface 656. Media user interface 656 includes the same and/or similar elements and/or features as media player user interface 606 (e.g., as described above). For example, similar to media player user interface 606, media user interface 656 includes media streaming control 658a. At FIG. 6S, media user interface 656 corresponds to the playback of a second media item (e.g., that is different from the first item). Accordingly, as illustrated in FIG. 6S, media user interface includes media art 656a that is a graphical representation of the second media item, media title 656b that includes a representation of the title of the second media item and, media artist 656c includes an indication of the name of the artist(s) of the second media item.

At FIG. 6S, diagram 602 includes representation of computer system 650-1 that is representative of computer system 650. At FIG. 6S, as indicated by the positioning of representation of computer system 650-1 within diagram 602, computer system 650 is positioned within the lounge of the first room of the hotel (e.g., room 101). At FIG. 6S, computer system 650 detects tap input 605s directed at media streaming control 658a.

As illustrated in FIG. 6T, in response to detecting tap input 605s, computer system 650 displays device selection user interface 660. Device selection user interface 660 includes the same and/or similar elements and/or features as device selection user interface 610 as described above. That is, device selection user interface 660 includes a list of computer systems whose media playback operations computer system 650 can control and/or computer systems that computer system 650 is connected to. Accordingly, as illustrated in FIG. 6T, device selection user interface 660 includes current device control 660a (e.g., representative of computer system 650), lounge television control 660b (e.g., representative of lounge television 662), and bedroom television control 660c (e.g., representative of bedroom television 664).

As illustrated in FIG. 6T, computer system 650 displays current selection indicator 660e within current device control 660a indicate that computer system 650 is the designated computer system configured to output (e.g., via one or more speakers) the playback of the second media item (e.g., computer system 650 outputs the media when the playback of media item is initiated and/or resumed). At FIG. 6T, computer system 650 detects tap input 605t directed at lounge television control 660b.

At FIG. 6U, in response to detecting tap input 605t, computer system 650 causes lounge television 662 to initiate playback of the second media item. Lounge television 662 ceases the playback of the first media item as part of initiating the playback of the second media item. Further, as illustrated in FIG. 6U, in response to detecting tap input 605t, computer system 650 causes lounge television 662 to display playback user interface 680 with media art 680a. Media art 680a is a graphical representation of the second media item. Additionally, at FIG. 6U, in response to detecting tap input 605t, computer system 650 ceases display of device selection user interface 660.

FIG. 7 is a flow diagram illustrating a method (e.g., method 700) for managing connections between computer systems in accordance with some examples. Some operations in method 700 are, optionally, combined, the orders of some operations are, optionally, changed, and some operations are, optionally, omitted.

As described below, method 700 provides an intuitive way for managing connections between computer systems. Method 700 reduces the cognitive burden on a user for managing connections between computer systems, thereby creating a more efficient human-machine interface. For battery-operated computing devices, enabling a user to manage connections between computer systems faster and more efficiently conserves power and increases the time between battery charges.

In some examples, method 700 is performed at a first computer system (e.g., 600). In some examples, the first computer system is a watch, a phone, a tablet, a processor, a head-mounted display (HMD) device, and/or a personal computing device. In some examples, the first computer system is in communication with one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some examples, the first computer system is in communication with a display generation component, (e.g., a display screen and/or a touch-sensitive display)

At 710, the first computer system receives, from a second computer system different from the first computer system, a communication corresponding to a network (e.g., a Bluetooth network, a Wi-Fi-network, and/or an Ultra-wideband network).

At 720, in response to receiving the communication, in accordance with (730) a determination that a first set of one or more criteria (e.g., the first computer system stores data that corresponds to credentials (e.g., a password, a passcode, a software token, a shared secret, a virtual ticket and/or a virtual key card) for the first location, the first computer system is positioned at the first location, the first computer system was previously positioned at the first location, the first computer system will be positioned at the first location, a user of the first computer system is positioned at the first location, the first compute system is connected to a network at the first location, and/or the first computer system stores an identifier corresponding to the first computer system and/or a user of the first computer system) is satisfied, wherein the first set of one or more criteria includes a criterion that corresponds to a first location (e.g., 602a, 602b, 602c1, 602c2, and/or 602d) (e.g., the criterion is unique to the first location, the criterion is satisfied when a condition is satisfied at the first location, the criterion is satisfied when the first computer is at the first location, the criterion cannot be satisfied while the first computer system is not at the first location, and/or satisfaction of the criterion enables the first computer system to control a set of one or more computer systems at the first location) (e.g., the first location includes a subset of one or more devices in a set of devices (e.g., the number of devices in the subset is less than the number of devices in the set), a geographic location (e.g., indoor and/or outdoor), a location within a building and/or structure (e.g., a room and/or a common area within a hotel, an office building, and/or a school), and/or a location within a vehicle and/or transport (e.g., a seat, compartment, and/or a cabin within an airplane, train, and/or boat)), the first computer system configures (e.g., enables, connects, and/or sets up) (e.g., automatically configures (e.g., without intervening user input)) itself to control a first set of one or more computer systems (e.g., 670, 662, 664, 674, and/or 668) (e.g., a set of televisions, laptops, one or more lights, one or more radios, one or more tablets, one or more smartphones, one or more smart watches, and/or one or more automobiles) (e.g., the first set of one or more computer systems does not include the first computer system and, in some examples, the second computer system) at the first location (e.g., a set of one or more computer systems that correspond to a common location (e.g., by virtue of being based on configuration settings (e.g., an assigned location or the location of the first set of one or more computer systems), a set of one or more computer systems that correspond to a common user account, a set of one or more computer systems controlled by a particular controller (e.g., smartphone, tablet, software and/or hardware broker))), wherein the first set of one or more computer systems is connected to (e.g., at least intermittently connected to and/or is included in) the network and at 7, in accordance with (740) a determination that a second set of one or more criteria (e.g., the first computer system stores data that corresponds to credentials (e.g., a password, a passcode, a software token, a shared secret, a virtual ticket and/or a virtual key card) for the second location, the first computer system is positioned at the second location, the first computer system was previously positioned at the second location, the first computer system will be positioned at the second location, a user of the first computer system is positioned at the second location, the first computer system is connected to a network at the second location and/or the first computer system stores an identifier corresponding to the first computer system and/or a user of the first computer system) (e.g., the second set of one or more criteria is different and/or distinct from the first set of one or more criteria or the second set of one or more criteria is the same as the first set of one or more criteria) is satisfied, wherein the second set of one or more criteria includes a criterion that corresponds to a second location (e.g., 602a, 602b, 602c1, 602c2, and/or 602d) (e.g., the criterion is unique to the second location, the criterion is satisfied when a condition is satisfied at the second location, the criterion is satisfied when the first computer is at the second location, the criterion cannot be satisfied while the first computer system is not at the second location, and/or satisfaction of the criterion enables the first computer system to control a set of one or more devices at the second location) (e.g., the second location includes a subset of one or more devices in a set of devices (e.g., the number of devices in the subset is less than the number of devices in the set), a geographic location (e.g., indoor and/or outdoor), a location within a building and/or structure (e.g., a room and/or a common area within a hotel, an office building, and/or a school), and/or a location within a vehicle and/or transport (e.g., a seat, compartment, and/or a cabin within an airplane, train, and/or boat)) that is different from the first location (e.g., 602a, 602b, 602c1, 602c2, and/or 602d), the first computer system configures (e.g., automatically configures (e.g., without intervening user input)) (e.g., enables, connects, and/or sets up) itself to control a second set of one or more computer systems (e.g., 670, 662, 664, 674, and/or 668) (e.g., a set of televisions, laptops, one or more lights, one or more radios, one or more tablets, one or more smartphones, one or more smart watches, and/or one or more automobiles) (e.g., the second set of one or more computer systems does not include the first computer system and, in some examples, the second computer system) at the second location (e.g., a set of one or more computer systems that correspond to a common location (e.g., by virtue of being based on configuration settings (e.g., an assigned location or the location of the first set of one or more computer systems), a set of one or more computer systems that correspond to a common user account, a set of one or more computer systems controlled by a particular controller (e.g., smartphone, tablet, software and/or hardware broker))), wherein the second set of one or more computer systems is different (e.g., the second set of one or more computer systems includes different types of computer systems than the first set of one or more computer systems and/or the second set of one or more computer systems includes a different number of computer systems than the first set of one or more computer systems) from the first set of one or more computer systems, and wherein the second set of one or more computer systems is connected to (e.g., at least intermittently connected to and/or is included in) the network. In some examples, the first set of one or more computer systems does not include any members of the second set of one or more computer systems (e.g., they are mutually exclusive). In some examples, the first set of one or more computer systems includes at least one member of the second computer system (e.g., all or less than all members). In some examples, the first set of one or more computer systems includes all members of the second set of one or more computer systems and one or more additional members not included in the second set of one or more computer systems. In some examples, the second set of one or more computer system includes all members of the first set of one or more computer systems and one or more additional members not included in the first set of one or more computer systems. In some examples, the first computer is not configured to control the first set of one or more computer systems while the first computer system is configured to control the second set of one or more computer system. In some examples, the first computer system is not configured to control the second set of one or more computer systems while the first computer system is configured to control the first set of one or more computer systems. In some examples, the first computer system displays a control user interface object in accordance with a determination that the first computer system satisfies the first set of one or more criteria and/or the second set of one or more criteria. In some examples, the first computer system connects to the network in response to detecting selection of the control user interface object. In some examples, the first computer system displays the control user interface object in response to the first computer system detecting a Quick Response ("QR") code. In some examples, the first computer system displays a captive portal user interface (e.g., a user interface that includes one or more fields for a user to fill out and/or terms and conditions of a merchant) as a part of configuring the first computer system to control the first set of one or more computer systems and/or the second set of one or more computer systems. In some examples, the first computer system causes an external display (e.g., television, display, personal computer, and/or laptop) to display a QR code as a part of configuring the first computer system to control the first set of one or more computer systems and/or the second set of one or more computer systems. In some examples, the first location and the second location are sub locations within a primary location. In some examples, either the first set of one or more criteria is satisfied or the second set of one or more criteria is satisfied. Configuring the first computer system to control the first set of one or more computer systems at the first location when a set of criteria that includes a criterion corresponding to the first location is satisfied, and/or configuring the first computer system to control a second set of one or more computer systems at the second location when a set of criteria that includes a criterion corresponding to the second location is satisfied, enables the first computer system to automatically be configured to control a relevant set of respective computer systems for a respective location, thereby reducing the number of inputs needed to perform an operation, providing additional control options without cluttering the user interface with additional displayed controls, and performing an operation when a set of conditions has been met without requiring further user input.

In some examples, the first set of one or more criteria includes a criterion that is satisfied in accordance with a determination that the first computer system (e.g., $600$) is positioned at the first location (e.g., $602a$, $602b$, $602c1$, $602c2$, and/or $602d$) (e.g., the first computer system is positioned within the first location, the first computer system is positioned adjacent to the first location, the first computer system is within a range of a wireless network that is sourced from the first location, and/or the first computer system is within a predetermined distance (e.g., 1-100 feet) from the first location). In some examples, the determination that the first computer system is positioned at the first location is based on one or more of sensor data (e.g., global positioning system (GPS) sensor data and/or other positioning sensor data) and/or location data (e.g., corresponding to and/or received from one or more other devices at the first location) and the first computer system stores data that corresponds to (e.g., is, represents, can be used to access, can be used to derive, and/or that is accepted and/or used as) a first credential (e.g., as described above with reference to FIG. 6C) (e.g., virtual key, virtual ticket, unique identifier, passcode, license, reservation, grant, token, user account, model number, service set identifier, user account, international mobile equipment identity ("IMEI")) for (e.g., that is configured to give access to, belonging to a user authorized to access, that corresponds to, that is provided by an entity associated with and/or that manages, that identifies the computer system to, and/or that is purchased for the purpose of having a right to occupy) the first location. In some examples, the second set of one or more criteria includes a criterion that is satisfied in accordance with a determination that the first computer is positioned at the second location (e.g., $602a$, $602b$, $602c1$, $602c2$, and/or $602d$) (e.g., the first computer system is positioned within the second location, the first computer system is positioned adjacent to the second location, the first computer system is within a range of a network that is sourced from the second location, and/or the first computer system is within a certain distance from the second location) and, the first computer system stores data that corresponds to a second credential (e.g., virtual key, token, user account, model number, service set identifier, user account, international mobile equipment identity ("IMEI")) for the second location. In some examples, the first credential and the second credential are the same. In some examples, the first credential and the second credential are different. Configuring the first computer system to control the first set of one or more computer systems at the first location when the first set of criteria includes a criterion that is satisfied when the first computer is positioned at the first location and stores data that corresponds to a first credential for the first location, and/or configuring the first computer system to control the second set of one or more computer systems at the second location when the second set of criteria includes a criterion that is satisfied when the first computer is positioned at the second location and stores data that corresponds to a second credential for the second location, enables the first computer system to automatically be configured to control a relevant set of respective computer systems for a respective location, thereby reducing the number of inputs needed to perform an operation, providing additional control options without cluttering the user interface with additional displayed controls, and performing an operation when a set of conditions has been met without requiring further user input.

In some examples, the first set of one or more criteria includes a criterion that is satisfied in accordance with a determination that the first computer system (e.g., 600) is positioned (e.g., currently positioned) at the first location (e.g., 602a, 602b, 602c1, 602c2, 602d) (e.g., the first computer system is positioned within the first location, the first computer system is positioned adjacent to the first location, the first computer system is within a range of a network that is positioned at the first location, and/or the first computer system is within a certain distance from the first location). In some examples, the second set of one or more criteria includes a criterion that is satisfied in accordance with a determination that the first computer system (e.g., 600) is positioned (e.g., currently positioned) at the second location (e.g., 602a, 602b, 602c1, 602c2, and/or 602d) (e.g., the first computer system is positioned within the second location, the first computer system is positioned adjacent to the second location, the first computer system is within a range of a network that is positioned at the second location, and/or the first computer system is within a certain distance from the second location). Configuring the first computer system to control the first set of one or more computer systems at the first location when the first set of criteria includes a criterion that is satisfied when the first computer is positioned at the first location, and/or configuring the first computer system to control the second set of one or more computer systems at the second location when the second set of criteria includes a criterion that is satisfied when the first computer is positioned at the second location, enables the first computer system to automatically be configured to control a relevant set of respective computer systems for a respective location, thereby reducing the number of inputs needed to perform an operation, providing additional control options without cluttering the user interface with additional displayed controls, and performing an operation when a set of conditions has been met without requiring further user input.

In some examples, the first set of one or more criteria includes a criterion that is satisfied in accordance with a determination that the first computer system (e.g., 600) stores data (e.g., on the computer system, on a cloud server, and/or an external memory) that corresponds to a third credential for the first location (e.g., 602a, 602b, 602c1, 602c2, and/or 602d) (e.g., as described above in reference to FIG. 6C). In some examples, the second set of one or more criteria includes a criterion that is satisfied in accordance with a determination that the first computer system stores data (e.g., on the computer system, on a cloud server, and/or an external memory) that corresponds to a fourth credential for the second location (e.g., 602a, 602b, 602c1, 602c2, and/or 602d) (e.g., as described above in reference to FIG. 6C). In some examples, the fourth credential is different from the third credential. In some examples, the fourth credential is the same as the third credential. In some examples, the third credential and/or the fourth credential include an identification of a user and/or a user account. Configuring the first computer system to control the first set of one or more computer systems at the first location when the first set of criteria includes a criterion that is satisfied when the first computer stores data that corresponds to a first credential for the first location, and/or configuring the first computer system to control the second set of one or more computer systems at the second location when the second set of criteria includes a criterion that is satisfied when the first computer stores data that corresponds to a second credential for the second location, enables the first computer system to automatically be configured to control a relevant set of respective computer systems for a respective location, thereby reducing the number of inputs needed to perform an operation, providing additional control options without cluttering the user interface with additional displayed controls, and performing an operation when a set of conditions has been met without requiring further user input.

In some examples, the first set of one or more criteria includes a criterion that is satisfied in accordance with a determination that the first computer system (e.g., 600) performs (e.g., has performed or will perform) a first authentication process (e.g., as described at FIGS. 6G-6I and FIGS. 6O-6Q) (e.g., the first computer system detects (e.g., via a microphone and/or one or more cameras) an output (e.g., a visual output, an audio output, and/or a haptic output) of a respective computer system that is positioned at the first location) at the first location (e.g., 602a, 602b, 602c1, 602c2, and/or 602d). In some examples, the second set of one or more criteria includes a criterion that is satisfied in accordance with a determination that the first computer system performs (e.g., has performed or will perform) a second authentication process (e.g., as described at FIGS. 6G-6I and FIGS. 6O-6Q) (e.g., the second authentication process is different from the first authentication process or the second authentication process is the same as the first authentication process) (e.g., the first computer system detects (e.g., via a microphone and/or one or more cameras) an output (e.g., a visual output, an audio output, and/or a haptic output) of a respective computer system that is positioned at the second location) at the second location (e.g., 602a, 602b, 602c1, 602c2, and/or 602d). In some examples, the first computer system performs the first authentication process at the first location or the second location. In some examples, the first computer system performs the first authentication process at both the first location and the second location. In some examples, the first computer system performs the first authentication process at the first location after the first computer system performs the first authentication process at the second location. Configuring the first computer system to control the first set of one or more computer systems at the first location when the first set of criteria includes a criterion that is satisfied when the first computer system performs a first authentication process at the first location, and/or configuring the first computer system to control the second set of one or more computer systems at the second location when the second set of criteria includes a criterion that is satisfied when the first computer system performs a second authentication process at the second location, enables the first computer system to automatically be configured to control a relevant set of respective computer systems for a respective location, thereby reducing the number of inputs needed to perform an operation, providing additional control options without cluttering the user interface with additional displayed controls, performing an operation when a set of conditions has been met without requiring further user input, and increasing security.

In some examples, the first set of one or more computer systems (e.g., 670, 662, 664, 674, and/or 668) includes a first type of computer system (e.g., type of computer system that corresponds to 600, 670, 662, 664, 674, and/or 668) (e.g., the first type of computer system is a watch, a phone, a tablet, a processor, a head-mounted display (HMD) device, and/or a personal computing device) and a second type of computer system (e.g., type of computer system that corresponds to 600, 670, 662, 664, 674, and/or 668) (e.g., the first type of computer system is a watch, a phone, a tablet, a processor, a head-mounted display (HMD) device, and/or a personal computing device) different from the first type of computer system. In some examples, the second set of one or more computer systems (e.g., 670, 662, 664, 674, and/or 668) includes the first type of computer system (e.g., type of computer system that corresponds to 600, 670, 662, 664, 674, and/or 668) and the second type of computer system (e.g., type of computer system that corresponds to 600, 670, 662, 664, 674, and/or 668). In some examples, the first type of computer system and the second type of computer system are the same. In some examples, first set of one or more computer systems and/or the second set of one or more computer systems only include the first type of computer system and the second type of computer system. In some examples, the first set of one or more computer systems and the second set of one or more computer systems include a type of computer system that is different and/or distinct from the first type of computer system and/or the second type of computer system. Configuring the first computer system to control the first set of one or more computer systems that includes a first type of computer system when the first set of criteria is satisfied, and/or configuring the first computer system to control the second set of one or more computer systems that includes a second type of computer system different from the first type when the second set of criteria is satisfied enables the first computer system to automatically be configured to control different types of computer systems at respective locations, thereby reducing the number of inputs needed to perform an operation, providing additional control options without cluttering the user interface with additional displayed controls, and performing an operation when a set of conditions has been met without requiring further user input.

In some examples, the first set of one or more computer systems (e.g., 670, 662, 664, 674, and/or 668) includes a third type of computer system (e.g., type of computer system that corresponds to 670, 662, 664, 674, and/or 668) (e.g., the third type of computer system is a watch, a tablet, a phone, a tablet, a processor, a head-mounted display (HMD) device, and/or a personal computing device) and a fourth type of computer system (e.g., type of computer system that corresponds to 670, 662, 664, 674, and/or 668) (e.g., the fourth type of computer system is a watch, a phone, a tablet, a processor, a head-mounted display (HMD) device, and/or a personal computing device) and does not include a fifth type of computer system (e.g., type of computer system that corresponds to 670, 662, 664, 674, and/or 668) (e.g., the fifth type of computer system is a watch, a phone, a tablet, a processor, a head-mounted display (HMD) device, and/or a personal computing device) and a sixth type of computer system (e.g., type of computer system that corresponds to 670, 662, 664, 674, and/or 668) (e.g., the sixth type of computer system is a watch, a phone, a tablet, a processor, a head-mounted display (HMD) device, and/or a personal computing device). In some examples, the second set of one or more computer systems (e.g., 670, 662, 664, 674, and/or 668) includes the fifth type of computer system and the sixth type of computer system and does not include the third type of computer system and the fourth type of computer system. In some examples, the fifth type of computer system and the sixth type of computer system are both different (e.g., and/or distinct) from the third type of computer system and the fourth type of computer system. In some examples, the third type of computer system and the fourth type of computer system are the same type of computer systems, and the fifth type of computer system and the sixth type of computer system are the same type of computer systems. In some examples, the third type of computer system and the fourth type of computer system are different types of computer systems, and the fifth type of computer system and the sixth type of computer system are different types of computer systems. In some examples, the first set of one or more computer systems includes the fifth type of computer system and the sixth type of computer system, and the second set of one or more computer systems includes the third type of computer system and the fourth type of computer system. Configuring the first computer system to control a set of one or more computer systems that includes the third and fourth type of computer system or the fifth type and the sixth type of computer system enables the first computer system to automatically control a set of respective computer systems of different types, thereby reducing the number of inputs needed to perform an operation, providing additional control options without cluttering the user interface with additional displayed controls, and performing an operation when a set of conditions has been met without requiring further user input.

In some examples, configuring the first computer system (e.g., 600) to control the first set of one or more computers system (e.g., 670, 662, 664, 674, and/or 668) at the first location (e.g., 602*a*, 602*b*, 602*c*1, 602*c*2, and/or 602*d*) includes connecting the first computer system to the network (e.g., the first computer system is connected to the network while the second computer system, the first set of one or more computer systems, and/or the second set of one or more computer systems are connected to the network). In some examples, in response to connecting the first computer system to the network, the first computer system displays an indication (e.g., 630) (e.g., a textual and/or graphical) (e.g., an icon representing connection to wireless network and/or one or more computer systems on the network) that the first computer system is connected to the network. In some examples, the first computer system displays the indication as overlaid on top of a respective user interface. In some examples, the first computer system does not display the indication as overlaid on top of a respective user interface. In some examples, the first computer system displays the indication in a persistent user interface (e.g., a menu bar, area, and/or location that is displayed at a position (e.g., along the top or bottom) on a display while other application user interfaces are displayed). In some examples, the first computer system causes an external display to display the indication. In some examples, the first computer system displays the indication in response to the first computer system being configured to control the first set of one or more computer systems. In some examples, the first computer system ceases to display a respective user interface as part of displaying the indication. Displaying the indication that the first computer system is connected to the network provides a user with visual feedback regarding the state of the first computer system and that the computer system successfully connected to the network, thereby providing improved visual feedback.

In some examples, the indication (e.g., 630) includes a representation (e.g., a textual representation and/or a graphical representation) corresponding to (e.g., a single representation for, multiple representations for, and/or a representation for each of) one or more computer systems included (e.g., some or all) in the first set of one or more computer systems (e.g., 670, 662, 664, 674, and/or 668) that the first computer system (e.g., 600) is configured to control (e.g., as discussed above at FIG. 6I) (e.g., and connected to via the network). Displaying the representation corresponding to one or more computer systems that the first computer system is configured to control provides a user with visual feedback regarding the state of the first computer system and of which computer systems it is configured to control, thereby providing improved visual feedback and reducing the number of inputs needed to perform an operation.

In some examples, the first computer system (e.g., before or after receiving the communication corresponding to the network) performs a third authentication process (e.g., as described at FIGS. 6G-6I and FIGS. 6O-6Q) (e.g., the first computer system detects (e.g., via one or more input devices, such as microphones and/or one or more cameras, in communication with the first computer system) a visual, audio, and or haptic output of a respective computer system) directed to (e.g., with, involving, required by, for access and/or control of, for pairing with, and/or for establishing a trusted relationship with) a respective computer system (e.g., 670, 662, 664, 674, and/or 668) of the first set of one or more computer systems (e.g., 670, 662, 664, 674, and/or 668), wherein. In some examples, in accordance with the respective computer system being a third computer system (e.g., 670, 662, 664, 674, and/or 668) (e.g., a television, a tablet, a smartphone, a personal computer, and/or a watch) of the first set of one or more computer systems (e.g., the third computer system outputs a visual, audio, and/haptic output), the first computer system configures the first computer system (e.g., 600) to control the first set of one or more computer systems (e.g., 670, 662, 664, 674, and/or 668) includes establishing a trusted relationship between (e.g., connecting to, connecting directly to, and/or making one device appear and/or be selectable at a user interface of the other device) (e.g., via the network and/or a short-range network) the first computer system and the third computer system (e.g., 670, 662, 664, 674, and/or 668). In some examples, in accordance with the respective computer system being a fourth computer system (e.g., 670, 662, 664, 674, and/or 668) (e.g., a television, a tablet, a smartphone, a personal computer, and/or a watch) (e.g., that is different and/or distinct from the third computer system) of the first set of one or more computer systems, the first computer system establishes a trusted relationship between the first computer system and the fourth computer system (e.g., and not between the first computer system and the third computer system). In some examples, the first computer system is connected to both the third computer system and the fourth computer system. In some examples, the first computer system is connected to the third computer system while the first computer system is connected to the fourth computer system or vice versa. In some examples, the third computer system and the fourth computer system are different types or the same type of computer system. In some examples, configuring the first computer system to control the first set of one or more computer systems does not include establishing the trusted relationship between the first computer system and the fourth computer system. Configuring the first computer system to control the first set of one or more computer systems including connecting the first computer system to the third computer system in accordance with the second authentication process corresponds to a third computer system of the first set of one or more computer systems, and/or connecting the first computer system to the fourth computer system in accordance with the second authentication process corresponds to a fourth computer system of the first set of one or more computer systems, enables the first computer system to automatically control and/or connect to a respective computer system based on the authentication process and therefore preventing erroneous connections and controls of computer systems that do not correspond to the authentication process, thereby providing improved visual feedback to the user, reducing the number of inputs needed to perform an operation, providing additional control options without cluttering the user interface with additional displayed controls, and performing an operation when a set of conditions has been met without requiring further user input.

In some examples, performing the third authentication process (e.g., as described at FIGS. 6G-6I and FIGS. 6O-6Q) directed to the respective computer system (e.g., 670, 662, 664, 674, and/or 668), (e.g., before connecting the first computer system to the third computer system) includes detecting (e.g., via one or more input devices, such as microphones and/or one or more cameras, that are in communication with the first computer system) an output (e.g., 624 and/or 634) (e.g., a visual output, an audio output, and/or a haptic output) of the respective computer system (e.g., as described at FIG. 6G and FIG. 6Q). In some examples, in accordance with a determination that the second authentication process corresponds to the fourth computer system, performing the second authentication process includes detecting an output (e.g., a visual output, an audio output, and/or a haptic output) of the fourth computer system. Performing the third authentication process, directed to the respective computer system, that includes detecting an output of the respective computer system enables the first computer system to ensure that the respective computer system is nearby and reduce inadvertent communication and/or authentication with an unintended recipient, thereby increasing security. Performing the third authentication process, directed to the respective computer system, that includes detecting an output of the respective computer system enables a user of the first computer system to ensure that the respective computer system is nearby and/or discern the identity (e.g., based on observation of the output), thereby providing improved feedback to the user.

In some examples, while the first computer system (e.g., 600) is in a trusted relationship with the third computer system (e.g., 670, 662, 664, 674, and/or 668) and not in a trusted relationship with the fourth computer system (e.g., 670, 662, 664, 674, and/or 668), the first computer system receives a request (e.g., 605o) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) to play back media (e.g., a song, a movie, a podcast, and/or an audio book). In some examples, in response to receiving the request to play back media and in accordance with a determination that the request to play back media corresponds to the third computer system, the first computer system causes the third computer system to play back the media (e.g., the third computer system initiates playback of the media and/or the third computer system resumes playback of the media) and in accordance with a determination that the request to play back media corresponds to the fourth computer system, the first computer system initiates a fourth authentication process (e.g., as described at FIGS. 6G-6I and FIGS. 6O-6Q) (e.g., the same or different from the third authentication process), wherein initiating the fourth authentication process includes causing the fourth computer system to display an authentication user interface (e.g., 664 at FIG. 6P) (e.g., the authentication user interface includes a quick response ("QR") code and/or a pin that corresponds to the fourth computer system). In some examples, causing the third computer system to play back the media includes causing the third computer system to cease playback of a respective media item. In some examples, causing the third computer system to play back the media includes ceasing playback of the media on the first computer system. In some examples, causing the fourth computer system to display an authentication user interface includes causing the fourth computer system to cease the display of a respective user interface (or, in some embodiments, overlaying the authentication user interface on the respective user interface). Causing the third computer system to playback the media if in a trusted relationship with the third computer system, and/or initiating a third authentication process if not in a trusted relationship with the fourth computer system, enables the first computer system to ensure that the respective computer system is nearby and reduce inadvertent communication and/or authentication with an unintended recipient, thereby increasing security, providing improved visual feedback to the user, and performing an operation when a set of conditions has been met without requiring further user input.

In some examples, the media includes an audio media item (e.g., 606a) (e.g., a song, a podcast, and/or an audio book) or a video media item (e.g., a television show, a movie, and/or a music video) (e.g., but not both). In some examples, the media includes an audio media item and/or a video media item. Causing the third computer system to playback the media if in a trusted relationship with the third computer system, wherein the media is an audio media item and/or a video media item enables the first computer system to automatically playback media of different types when connecting to certain computer systems and for other computer systems require an authentication process, preventing erroneous and not allowed playback of media on certain devices, thereby increasing security, providing improved visual feedback to the user, and performing an operation when a set of conditions has been met without requiring further user input.

In some examples, the first computer system displays, via a display generation component in communication with the first computer system (e.g., 600), a device selection user interface (e.g., 610 at FIG. 6B or 610 at FIG. 6L) (e.g., a route picker user interface for selecting a computer system to route media to and/or cause to output media) that includes a first control (e.g., 610c, 610d and/or 610a) corresponding to the third computer system (e.g., 670, 662, 664, 674, and/or 668) and a second control (e.g., 610c, 610d and/or 610a) that corresponds to the fourth computer system (e.g., 670, 662, 664, 674, and/or 668), wherein determining that the request to play back media corresponds to the third computer system includes detecting an (e.g., via one or more input devices) input (e.g., 605l and/or 605o) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to selection of the first control corresponding to the third computer system, and wherein determining that the request to play back media corresponds to the fourth computer (e.g., 670, 662, 664, 674, and/or 668) system includes detecting an input (e.g., 605l and/or 605o) (e.g., one or more tap inputs and/or in some examples, one or more non-tap inputs, such as an air inputs (e.g., pointing air gestures, tapping air gestures, swiping air gestures, and/or moving air gestures), gaze inputs, gaze-and-hold inputs, mouse clicks, mouse click-and-drags, voice commands, selection inputs, inputs that move the computer system in a particular direction) that corresponds to selection of the second control (e.g., 610c, 610d and/or 610a) that corresponds to the fourth computer system. Causing a respective computer system to play back media and/or initiating an authentication process when an input corresponds to selection of a control for the respective computer system enables the first computer system to automatically play back media at the respective device that corresponds to selection of the control as directed, thereby providing improved visual feedback to the user, providing additional control options without cluttering the user interface with additional displayed controls, and performing an operation when a set of conditions has been met without requiring further user input.

In some examples, the first computer system (e.g., 600) is included in a third set of one or more computer systems (e.g., 650, 670, 662, 664, 674, and/or 668) that corresponds to a user account (e.g., the third set of one or more computer systems is logged into, trusted by, and/or authenticated with the user account) (e.g., a user has logged into the user account using the first computer system and/or the user has assigned the first computer system to the user account) (e.g., the third set of one or more computer systems does not include the first computer system and/or the second computer system, or the third set of one or more computer systems does include the first computer system and/or the second computer system) (e.g., the third set of one or more computer systems is different and/or distinct from the second set of one or more computer systems and/or the first set of one or more computer systems). In some examples, after receiving the communication and, in accordance with a determination that the first set of one or more criteria is satisfied, the first computer system configures a fifth computer system (e.g., 650, 670, 662, 664, 674, and/or 668) of the third set of one or more computer systems (e.g., some or all of the third set of one or more computer systems, in addition to the first computer system, is configured to the control the first set of one or more computer systems) to control the first set of one or more computer systems (e.g., 670, 662, 664, 674, and/or 668) and in accordance with a determination that the second set of one or more criteria is satisfied, the first computer system configures the fifth computer system of the third set of one or more computer systems (e.g., some or all of the third set of one or more computer systems, in addition to the first computer system, is configured to the control the first set of one or more computer systems) to control the second set of one or more computer systems (e.g., 670, 662, 664, 674, and/or 668). In some examples, each computer system in the third set of one or more computer systems is configured to control the first and/or the second set of one or more computer systems before or after the first computer system is configured to control the first and/or the second set of one or more computer systems. In some examples, each computer system in the third set of one or more computer systems and the first computer system are configured at the same time to control the first and/or the second set of one or more computer systems Configuring the fifth computer system to control a particular set of computers systems based on whether a set of conditions are satisfied, enables the fifth computer system to automatically control a set of respective computer systems at respective locations when connected to the network, thereby providing improved visual feedback to the user, reducing the number of inputs needed to perform an operation, providing additional control options without cluttering the user interface with additional displayed controls, and performing an operation when a set of conditions has been met without requiring further user input.

In some examples, in accordance with a determination that a registration condition is no longer satisfied (e.g., leaves a network, checks out of a hotel, checks in for an appointment, and/or checks in for a cruise), the first computer system (e.g., 600) is configured to no longer control the first set of one or more computer systems (e.g., 670, 662, 664, 674, and/or 668). In some examples, the communication corresponding to the network corresponds to the registration condition (e.g., whether a user, a user account, and/or the device satisfies the condition, such as by being checked in for a flight, checked into a conference, checked in to a hotel room, checked in for an appointment, and/or checked in for a cruise) with respect to (e.g., established by, enforced by, subject to approval of, monitored by, negotiated with, and/or controlled by) an entity (e.g., hotel, cruise, airplane, hospital, dentist office, a conference). In some examples, the first computer system is reconfigured to control the first set of one or more computer systems after the first computer is configured to no longer control the first set of one or more computer systems. In some examples, the determination that the registration condition is no longer satisfied is made by a computer system that is owned by an entity (e.g., hotel, cruise ship, and/or doctor's office). In some examples, the first computer system receives the communication corresponding to the network in response to the registration condition being satisfied (e.g., the user registering with the entity). In some examples, the first computer system remains configured to control the first set of one or more computer systems as long as the registration condition is satisfied (e.g., with the entity). Configuring the first computer system to no longer control the first set of one or more computer systems when a registration condition is no longer satisfied enables the first computer system to automatically cease having the ability to control the one or more computer systems when they may no longer be relevant to the first computer system, thereby reducing the number of inputs needed to perform an operation, providing additional control options without cluttering the user interface with additional displayed controls, and performing an operation when a set of conditions has been met without requiring further user input.

In some examples, the first computer system (e.g., 600) is connected to the network while receiving the communication corresponding to the network. In some examples, the first computer system continues to be connected to the network while the first computer system is configured to control the first set of one or more computer systems. In some examples, the first computer system ceases to be connected to the network while the first computer system is configured to control the first set of one or more computer systems. In some examples, unconfiguring the first computer system from controlling the first set of one or more computer systems disconnects the first computer system from the network. Configuring the first computer system to control the first set of one or more computer systems connected to the network or configuring the first computer system to control the second set of one or more computer systems connected to the network while the first computer system is connected to the network enables the first computer system to be automatically configured to control a set of respective computer systems on the same network that are relevant to a respective location, thereby reducing the number of inputs needed to perform an operation, providing additional control options without cluttering the user interface with additional displayed controls, and performing an operation when a set of conditions has been met without requiring further user input.

Note that details of the processes described above with respect to method 700 (e.g., FIG. 7) are also applicable in an analogous manner to other methods described herein. For example, method 800 optionally includes one or more of the characteristics of the various methods described above with reference to method 700. For example, the computer system of method 800 can display an indication when the computer system successfully performs an authentication process. For brevity, these details are not repeated below.

FIG. 8 is a flow diagram illustrating a method (e.g., method 800) for performing an authentication process between computer systems in accordance with some examples. Some operations in method 800 are, optionally, combined, the orders of some operations are, optionally, changed, and some operations are, optionally, omitted.

As described below, method 800 provides an intuitive way for performing an authentication process between computer systems. Method 800 reduces the cognitive burden on a user for performing an authentication process between computer systems, thereby creating a more efficient human-machine interface. For battery-operated computing devices, enabling a user to perform an authentication process between computer systems faster and more efficiently conserves power and increases the time between battery charges.

In some examples, method 800 is performed at a computer system (e.g., 600) that is in communication with a display generation component (e.g., a display screen and/or a touch-sensitive display). In some examples, the computer system is a watch, a phone, a tablet, a processor, a head-mounted display (HMD) device, and/or a personal computing device. In some examples, the computer system is in communication with one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button).

At 810, in response to detecting a request (e.g., 605k, and/or 605a) to identify an output device (e.g., 662, 664, 674, 670, and/or 668) for a media item (e.g., 606a and/or 656a) (e.g., a music media item and/or a video media item), the computer system displays, via the display generation component, a selection user interface (e.g., 610) (e.g., a user interface that corresponds to a media application that is installed on the computer system, a user interface that corresponds to a sharing feature (e.g., a system sharing feature) of the computer system, a user interface for picking an external computer system to output the media item, a user interface that corresponds to streaming functionalities of the computer system, and/or a user interface that includes representations (e.g., textual representations and/or graphical representations) of external computer systems that the computer system is in communication (e.g., wireless communication and/or wired communication) with), wherein displaying the selection user interface includes displaying a control (e.g., 610a, 610c, 610d) that corresponds to a first external computer system (e.g., 662, 664, 674, 670, and/or 668) (e.g., the control includes a graphical and/or textual representation of the first external computer system, the control indicates what type of computer system the first external computer system is, the control includes an indication of media that the first external computer system outputs, the computer system modifies a playback status of the first external computer system in response to detecting selection of the control, display of the control indicates that the computer system is connected (e.g., via a wireless and/or wired connection) to the first external computer system) (e.g., an output device, a pair of headphone, a pair of earbuds, a smartwatch, a smartphone, a tablet, television, head-mounted display device, and/or a personal computing device) (e.g., the first external computer system and the computer system are different types of computer systems or the first external computer system and the computer system are the same type of computer system). In some examples, the selection user interface includes a plurality of different control user interface objects, each control user interface object corresponding to a different external computer system.

At 820, while displaying the selection user interface (e.g., 610), the computer system detects an input (e.g., 605o, 605t, and/or 605l) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to a request to play back the media item (e.g., 606a and/or 656a) (e.g., an audio and/or video media item) (e.g., playback the media item on the computer system or on an external computer system).

At 830, in response to detecting the request, the computer system displays (830), via the display generation component, a camera user interface (e.g., 632 and/or 622) (e.g., a user interface that corresponds to an application that is installed on the computer system, a digital viewfinder, and/or a camera user interface that corresponds to a web browser that is installed on the computer system). In some examples, detecting the request to play back a media item corresponds to a selection of a user interface object (e.g., a user interface object that is displayed by the computer system or a user interface object that is displayed by a respective external display). In some examples, displaying the camera user interface includes displaying a representation of a field of view of one or more cameras that are in communication with the computer system. In some examples, the computer system ceases the display of a respective user interface in response to detecting the request to play back a media item. In some examples, the control user interface object includes a representation of the first external computer system. In some examples, detecting the request to playback the media item corresponds to a selection of a user interface object. In some examples, the computer system and the first external computer system are connected to a common network. Displaying the camera user interface in response to detecting the request to play back the media item provides a user with visual feedback regarding the state of the computer system (e.g., the computer system has detected the request to play back the media item), thereby providing improved visual feedback and reducing the number of inputs needed to perform an operation.

In some examples, display of the selection user interface (e.g., 610) is maintained while displaying the camera user interface (e.g., 632 and/or 622) (e.g., the computer system displays the camera user interface as overlaid on top of the selection user interface, the computer system does not overlay the display of display of the selection user interface with the display of the camera user interface and/or the computer system displays the selection user interface in a first portion being displayed via the display generation component and the computer system displays the camera user interface in a second portion being displayed via the display generation component that is different from the first portion). Maintaining display of the selection user interface while displaying the camera user interface provides a user with visual feedback regarding the state of the computer system and a context in which the camera user interface is being displayed, thereby providing improved visual feedback.

In some examples, displaying the camera user interface (e.g., 632 and/or 622) includes displaying the camera user interface overlaid on at least a portion of the selection user interface (610) (e.g., the computer system displays the camera user interface over a minority portion of the selection user interface or the computer system displays the camera user interface over a majority portion of the selection user interface). In some examples, the computer system performs a respective action (e.g., updates stored data and/or transmits data to another computer system) in response to detecting an input (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to the selection user interface while the computer system displays the camera user interface as overlaid on top of the selection user interface. In some examples, the computer system does not perform a respective action in response to detecting an input that corresponds to the selection user interface while the computer system displays the camera user interface as overlaid on top of the selection user interface. Overlaying the camera user interface on at least a portion of the selection user interface in response to detecting the request to play back the media item provides a user with visual feedback regarding the state of the computer system and a context in which the camera user interface is being displayed, thereby providing improved visual feedback.

In some examples, while displaying the camera user interface (e.g., 632 and/or 622) (e.g., and while displaying the selection user interface), the computer system establishes a trusted relationship between (e.g., as described above with respect to method 700) (e.g., via a Wi-Fi, Bluetooth, and/or ultra-wideband network) the computer system (600) and the output device (e.g., 662, 664, 674, 670, and/or 668). In some examples, in response to establishing the trusted relationship between the computer system and the output device, the computer system ceases display of the camera user interface. In some examples, the computer system is in the trusted relationship with the output device after the computer system ceases to display the camera user interface. In some examples, the computer system continues to display the camera user interface in response to the computer system establishing the trusted relationship with the output device. In some examples, the computer system establishes the trusted relationship with the output device in response to detecting an input (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to selection of a user interface object that the computer system displays within the camera user interface. Ceasing display of the camera user interface in response to establishing a trusted relationship between the computer system and the output device provides a user with visual feedback regarding the state of the computer system, thereby providing improved visual feedback and reducing the number of inputs needed to perform an operation.

In some examples, in accordance with a determination that a set of one or more criteria is satisfied (e.g., one or more cameras that are in communication with the computer system detect an output of the output device, a quick response (QR) code is centered within the field of view of one or more cameras that are in communication with the computer system, the computer system is within a predetermined distance from the output device, the computer system is within a predetermined distance from a quick response code, the computer system is a predetermined distance from a quick response code), the computer system displays, via the display generation component, a visual indication (e.g., as discussed above at FIG. 6I) (e.g., an outline (e.g., a box) around a QR code detecting in a field of view of the camera) (e.g., a series of non-contiguous lines with a visual appearance that contrasts with the visual appearance of the camera user interface and/or a single contiguous line with a visual appearance that contrasts with the visual appearance of the camera user interface) within the camera user interface (e.g., 632 and/or 622). In some examples, the computer system ceases to display the visual indication in accordance with a determination that the set of one or more criteria cease to be satisfied. In some examples, the computer system forgoes displaying the visual indication in accordance with a determination that the set of one or more criteria is not satisfied. In some examples, the computer system displays a user interface object as part of displaying the visual indication. In some examples, when the computer system displays the user interface object as part of displaying the visual indication, the computer system connects to a set of devices and/or to a network in response to detecting an input (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to selection of the user interface object. Displaying a visual indication within the camera user interface when prescribed conditions are met allows the computer system to automatically indicate to a user that the set of one or more criteria is satisfied, thereby performing an operation when a set of conditions has been met without requiring further user input.

In some examples, the computer system (e.g., 600) is in communication (e.g., wireless communication (e.g., Bluetooth, Wi-Fi, and/or Ultra-Wideband) and/or wired communication) with one or more cameras. In some examples, the set of one or more criteria includes a criterion that is satisfied in accordance with a determination that the computer system detects a first quick response code (e.g., 624 and/or 634) in a field of view of the one or more cameras (e.g., a matrix barcode, a machine-readable optical image, and/or a series of black squares with fiducial markers) (e.g., the output device displays the quick response code, the one or more cameras detect the quick response code while the quick response code is not displayed on a respective device, and/or the quick response code is displayed by a respective device that is not the output device). Displaying a visual indication when the computer system detects a quick response code in field of view of one or more cameras provides a user with visual feedback that the quick response code is within the field of view of the one or more cameras, thereby providing improved visual feedback.

In some examples, the camera user interface (e.g., 632 and/or 622) is a digital viewfinder (e.g., 622) (e.g., as discussed above at FIG. FIG. 6G and FIG. 6P) (e.g., representing a field of view of the one or more cameras) (e.g., the camera user interface includes a representation of a field of view of one or more cameras that are in communication with the computer system). Displaying a digital viewfinder provides a user with visual feedback regarding what is in the field of view of one or more cameras that are in communication with the computer system, thereby providing improved visual feedback.

In some examples, in response to detecting the request (e.g., 605o, 605t, and/or 605l) to play back the media item (606a and/or 656a), the computer system initiates an authentication process (e.g., as described at FIGS. 6G-6I and FIGS. 6O-6Q) (e.g., as described above with respect to method 700) (e.g., a process, a procedure, a handshake, and/or a protocol for establishing a trusted relationship with another computer system) (e.g., with a respective other computer system corresponding to the request) (e.g., an authorization process) (e.g., successfully completing the authentication process configures the computer system to control the output device and/or a set of one or more output devices that are positioned at a common location as the computer system and/or successfully completing the authentication process connects the computer system to a network (e.g., Bluetooth, Wi-Fi, and/or Ultra-Wideband)) (e.g., successfully performing the authentication process includes the computer system detecting a visual, audio, and/or haptic output of the output device) (e.g., concurrently initiating the authentication process while displaying the generation component). In some examples, the authentication process is completed when the computer system detects an output of the output device. In some examples, initiating the authentication process includes causing an external display to display a quick response code and/or pin code. Initiating an authentication process in response to detecting the request to play back the media item enables the computer system to ensure that the respective computer system is nearby and/or reduce inadvertent communication and/or authentication with an unintended recipient, thereby increasing security.

In some examples, the computer system (e.g., 600) is in communication (e.g., wireless communication and/or wired communication) with the output device (e.g., 662, 664, 674, 670, and/or 668). In some examples, in response to detecting the request to play back (e.g., 605o, 605t, and/or 605l) the media item (e.g., 606a and/or 656a), the computer system causes the output device (e.g., 662, 664, 674, 670, and/or 668) (e.g., the first external computer system and/or another external computer system selected by the input that corresponds to the request to play back the media item) to display a second quick response code (e.g., 624 and/or 634) (e.g., a matrix barcode, a machine-readable optical image, and/or a series of black squares with fiducial markers). In some examples, the computer system causes the output device to cease to display the quick response code after a predetermined time (e.g., 1-120 seconds) of inactivity (e.g., a period of time when the computer system does not detect any user interactions). In some examples, the output device displays the quick response while the output device displays a respective user interface and/or while the output device outputs media. Causing the output device to display the second quick response code in response to detecting the request to play back the media item provides a user with visual feedback regarding the state of the computer system (e.g., the computer system has detected the request to play back the media item), thereby providing improved visual feedback. Causing the output device to display the second response code in response to detecting the request to play back the media item enables the computer system to ensure that the respective computer system is nearby and/or reduce inadvertent communication and/or authentication with an unintended recipient, thereby increasing security.

In some examples, the computer system (e.g., 600) is not configured to control the output device (e.g., 662, 664, 674, 670, and/or 668) (e.g., the computer system and the output device are not connected to a common network or the computer system and the output device are connected to a common network but the computer system does not have the authority to control the output device) while the computer system displays the camera user interface (e.g., 632 and/or 622). In some examples, the computer system is configured to control a respective output device while the computer system displays the camera user interface. In some examples, the computer system is configured to control the output device as a part of the computer system ceasing to display the camera user interface. In some examples, the computer system is not in a trusted relationship with the output device while the computer system displays the camera user interface. Displaying the camera user interface while the computer system is not configured to control the output device provides a user with visual feedback regarding whether the computer system is configured to control the output device, thereby providing improved visual feedback.

In some examples, the computer system (e.g., 600) and the output device (e.g., 662, 664, 674, 670, and/or 668) are connected to the same network (e.g., Bluetooth, Wi-Fi, and/or Ultra-Wideband network) (e.g., the computer system and the output device are connected to the same network before, during, and after the computer system displays the camera user interface).

Note that details of the processes described above with respect to method 800 (e.g., FIG. 8) are also applicable in an analogous manner to other methods described herein. For example, method 700 optionally includes one or more of the characteristics of the various methods described above with reference to method 800. For example, the computer system of method 700 can use the authentication process described in method 800 to connect to one or more external computer systems.

FIGS. 9A-9J illustrate exemplary user interfaces for managing media playback operations of computer systems in accordance with some embodiments. The user interfaces in these figures are used to illustrate the processes described below including the processes in FIG. 10.

FIG. 9A illustrates computer system 600. At FIG. 9A, as indicated by the positioning of representation of computer system 600-1 within diagram 602, computer system 600 is positioned within the business center of the hotel. As illustrated in FIG. 9A, computer system 600 displays home user interface 612. At FIG. 9A, computer system 600 is positioned within the hotel at a point in time when a user of computer system 600 has not checked into any room of the hotel. Because the user has not checked into any room of the hotel, neither the first room of the hotel (e.g., room 101) or the second room of the hotel (e.g., room 102) are registered with computer system 600).

As illustrated in FIG. 9A, computer system 600 displays network indicator 604b within status region 604 to indicate that computer system 600 is connected to a network of the hotel (e.g., a Wi-Fi network of the hotel). More specifically, at FIG. 9A, computer system 600 is connected to a public network (e.g., a network that is accessible by the public and/or non-registered guests) that is within and is operated by the hotel. In some examples, computer system 600 is not connected to the public network (e.g., or any network), but can see and discover certain devices that have been designated as discoverable and/or controllable to the public (e.g., without needed to connect to a particular network to do so). At FIG. 9A, because computer system 600 is connected to the public network of the hotel, computer system 600 is configured to control computer systems that the hotel has designated as public computer systems. For example, at FIG. 9A, the hotel has designated lobby television 668 (represented by lobby television representation 602j-1 in FIG. 9J) and business center speakers 670 (represented by speaker's representation 602e-1 in FIG. 9J) as public computer systems. Accordingly, at FIG. 9A, computer system 600 is connected to and configured to control the media operations of both lobby television 668 that is positioned in the lobby area of the hotel and business center speakers 670 that are positioned within the business center of the hotel. In some examples, when computer system 600 is not registered with any rooms of the hotel and is connected to a network of the hotel, information regarding the network (e.g., password and/or SSID of the network) of the hotel is removed from computer system 600 (e.g., by computer system 600 and/or by an external computer system (e.g., that is owned by the hotel)) in response to the positioning of computer system 600 transitioning from being within the hotel to outside of the hotel. In some examples, when computer system 600 is registered with one or more rooms of the hotel and is connected to a network of the hotel, information regarding the network e.g., password and/or SSID of the network) of the hotel remains on computer system 600 in response to the positioning of computer system 600 transitioning from being within the hotel to outside of the hotel. For example, while connected to a network associated with a location (e.g., the hotel), a determination is made (e.g., detecting by computer system 600) that a user (e.g., of computer system 600) is leaving the location: if the user is a non-registered user (e.g., a temporary guest who does not have a reservation at the hotel), information associated with the network (e.g., password and/or SSID) is removed from the user's device (e.g., computer system 600). If the user is a registered user (and/or is otherwise determined to not be a temporary guest but is a hotel guest) removal of the information is forgone (e.g., removing does not occur because hotel guest is likely to return and need to reconnect without reauthorizing with the hotel and/or reobtaining permission to access the network). At FIG. 9A, computer system 600 detects downward swipe input 905a starting at the top right corner of home user interface 612 representing a request to display a quick select user interface.

As illustrated in FIG. 9B, in response to detecting downward swipe input 905a, computer system 600 displays quick select user interface 904. As illustrated in FIG. 9B, quick select user interface 904 includes quick media controls 906. At FIG. 9B, quick media controls 906 correspond to the playback of the first media item (e.g., the first media item entitled "Cityline Run"). Quick media controls 906 include media streaming control 906*a*, quick media title 906*b*, and quick playback controls 906*c*. Because quick media controls 906 corresponds to the playback of the first media item, quick media title 906*b* indicates the title of the first media item and computer system 600 modifies the playback of the first media item in response to detecting an input that corresponds to selection of a control included in quick playback controls 906*c*. At FIG. 9B, computer system 600 detects tap input 905*b* directed at media streaming control 906*a*.

As illustrated in FIG. 9C, in response to detecting tap input 905*b*, computer system 600 displays device selection user interface 910. At FIG. 9C, computer system 600 displays device selection user interface 910 at a point in time when the first room of the hotel (e.g., room 101) and the second room of the hotel (e.g., room 102) are not registered with computer system 600 (e.g., at a point in time before the user checks in to the hotel or after the user checks out of the hotel) (e.g., at a point in time when no rooms of the hotel are registered with computer system 600).

As illustrated in FIG. 9C, device selection user interface 910 includes playback controls 912, current device control 910*a* that corresponds to computer system 600, business center speakers control 910*c* that corresponds to business center speakers 670, and lobby television control 910*d* that corresponds to lobby television 668. Current device control 910*a* includes current device icon 910*a1* that is a graphical representation of computer system 600 and current device name 910*a2* that is a textual indication of a name assigned to computer system 600. Business center speakers control 910*c* includes speaker icon 910*c1* that is a graphical representation of business center speakers 670 and includes speakers name representation 910*c2* that is a textual indication of a name assigned to business center speakers 670. Lobby television control 910*d* includes television icon 910*d1* that is a graphical representation of lobby television 668 and lobby television name 910*d2* that is a textual indication of the name assigned to lobby television 668. As illustrated in FIG. 9C, computer system 600 displays current selection indicator 920 within current device control 910*a* to indicate computer system 600 is the designated computer system configured to output (e.g., via one or more speakers) the playback of the first media item (e.g., computer system 600 outputs the media when the playback of media item is initiated and/or resumed).

At FIG. 9C, playback controls 912 correspond to the playback of the first media item. Computer system 600 modifies the playback of the first media item in response to detecting an input that corresponds to selection of a respective control included in playback controls 912. As illustrated in FIG. 9C, playback controls 912 includes media art 912*a* and media title 912*b*. Because playback controls 912 correspond to the playback of the first media item, each of media art 912*a*, media title 912*b*, and media artist 912*c* are representative of the first media item. That is, media art 912*a* is a graphical representation of the first media item, media title 912*b* is a textual indication of the title of the first media item, and media artist 912*c* includes an indication of artist(s) of the first media item. At FIG. 9C, because neither the first room of the hotel (e.g., room 101) or the second room (e.g., room 102) of the hotel are registered with computer system 600, computer system 600 does not display respective controls that correspond to lounge television 662 or bedroom television 664 with device selection user interface 910.

At a time that occurs between FIGS. 9C and 9D, the first room of the hotel is registered with computer system 600 (e.g., and computer system 600 is granted permission to control the media playback operations of lounge television 662 and bedroom television 664) (e.g., the user checks into the first room of the hotel) and computer system 600 connects to and is successfully authenticated with both lounge television 662 and bedroom television 664 (e.g., as described above in reference to FIG. 6G-6I and FIGS. 6O-6R) within the first room of the hotel.

As illustrated in FIG. 9D, computer system 600 displays quick select user interface 904. At FIG. 9D, a determination is made (e.g., by computer system 600 and/or another computer system) that computer system 600 is registered with the first room of the hotel. Based on the determination being made that computer system 600 is registered with the first room of the hotel, computer system 600 disconnects (e.g., or is disconnected from) from the public network (e.g., and as a result disconnects from lobby television 668). That is, computer system 600 is connected to certain publicly available computer systems in the hotel based on whether computer system 600 is registered with a specific room within the hotel. If registered with the hotel, computer system 600 connects to private network for hotel guests and disconnects from the public network. At FIG. 9D, computer system 600 detects tap input 905*d* directed at media streaming control 906*a*.

As illustrated in FIG. 9E, in response to detecting tap input 905*d*, computer system 600 displays device selection user interface 910. As illustrated in FIG. 9E, device selection user interface 910 includes business center speakers control 910*c*, lounge television control 910*e*, and bedroom television control 910*f*. As illustrated in FIG. 9E, computer system 600 displays device selection user interface 910 with lounge television control 910*e* and bedroom television control 910*f* because computer system 600 is now connected to lounge television 662 and bedroom television 664. The controls included within device selection user interface 910 are time dependent. Device selection user interface 910 includes a first set of controls (e.g., as shown in FIG. 9C) when computer system 600 displays device selection user interface 910 at a point in time when no room of the hotel is registered with computer system 600. Device selection user interface 910 includes a second set of controls (e.g., as shown in FIG. 9E) when computer system 600 displays device selection user interface 910 at a point in time when one or more rooms of the hotel are registered with computer system 600. In some examples, device selection user interface 910 includes lounge television control 910*e* and bedroom television control 910*f* based on the first room of the hotel being registered with computer system 600.

At FIG. 9E, because computer system 600 is not connected to lobby television 668, device selection user interface 910 does not include lobby television control 910*d*. At FIG. 9E, computer system 600 is moved from the business center of the hotel to the first room of the hotel.

At FIG. 9F, as indicated by the positioning of representation of computer system 600-1 within diagram 602, computer system 600 is positioned within the first room of the hotel. At FIG. 9F, a determination is made (e.g., by computer system 600 and/or another computer system) that computer system 600 is positioned in the first room of the hotel and not the business center. At FIG. 9F, based on the determination being made that computer system 600 is positioned in the first room of the hotel and not the business center, computer system 600 ceases to display business center speakers control 910*c* within device selection user interface 910. Computer system 600 cannot control (e.g., is not configured to control) the media playback operations of business center speakers 670 while computer system 600 is positioned outside of the business center. For example, the ability of computer system 600 to control the media playback operations of various computer systems within the hotel can be based on the location of computer system 600 within the hotel. In some examples, computer system 600 ceases to be configured to control the media playback operations of business centers speaker 670 based on a determination that the distance between computer system 600 and business center speakers 670 is greater than a threshold. In some examples, computer system 600 remains connected to business centers speakers 670 while computer system is positioned in the first room of the hotel.

As illustrated in FIG. 9F, computer system 600 displays current selection indicator 920 within current device control 910*a* to indicate that computer system 600 is the designated computer system configured to output (e.g., via one or more speakers) the playback of the first media item (e.g., computer system 600 outputs the media when the playback of media item is initiated and/or resumed). At FIG. 9F, computer system 600 detects tap input 905*f* directed at lounge television control 910*e*.

At FIG. 9G, in response to detecting tap input 905*f*, computer system 600 causes lounge television 662 to initiate the playback of the first media item (e.g., as described above with respect to FIG. 6M). As part of causing the initiation of the playback of the first media item on lounge television 662, computer system 600 causes lounge television 662 to display a media interface that corresponds to the playback of the first media item (e.g., as shown above in FIG. 6M when lounge television 662 displays playback user interface 680).

As illustrated in FIG. 9G, computer system 600 displays current selection indicator 920 within lounge television control 910*e* to indicate that lounge television 662 is the designated computer system configured to output (e.g., via one or more speakers) the playback of the first media item (e.g., lounge television 662 outputs the media when the playback of media item is initiated and/or resumed). At FIG. 9G, computer system 600 is moved from the first room of the hotel to the business center of the hotel. In some examples, lounge television 662 continues to play back the first media item when a determination is made (e.g., by computer system 600 and/or another computer system) that computer system 600 transitions from being positioned inside of the first room of the hotel to being positioned outside of the first room of the hotel. In some examples, lounge television 662 ceases to play back the first media item when a determination is made (e.g., by computer system 600 and/or another computer system) that computer system 600 transitions from being positioned inside of the first rom of the hotel to being positioned outside side of the first room of the hotel.

A period of time elapses between FIG. 9G and FIG. 9H. Computer system 600 remains connected to and authenticated with lounge television 662 and bedroom television 664 (e.g., as described above in reference to FIG. 6G-6I and FIGS. 6O-6R) between FIGS. 9G and 9H.

At FIG. 9H, as indicated by the positioning of representation of computer system 600-1 within diagram 602, computer system 600 is positioned within the business center of the hotel. As illustrated in FIG. 9H, computer system 600 displays device selection user interface 910. At FIG. 9H, a determination is made (e.g., by computer system 600 and/or another computer system) that computer system 600 positioned within the business center of the hotel while computer system 600 is connected to the network of the hotel. As illustrated in FIG. 9H, based on the determination being made that computer system 600 is positioned within the business center of the hotel while computer system 600 is connected to the network of the hotel, computer system 600 displays business center speakers control 910*c* within device selection user interface 910 (e.g., in addition to the controls for the devices in the first room of the hotel).

At FIG. 9H, playback controls 912 correspond to the playback of the second media item (e.g., entitled "Grass Slingshot"). At FIG. 9H, because playback controls 912 correspond to the playback of the second media item, computer system 600 modifies the playback of the second media item in response to detecting an input that corresponds to selection of a respective control included in playback controls 912. Further, at FIG. 9H, because playback controls 912 correspond to the playback of the second media item, both media art 912*a* and media title 912*b* are representative of the second media item. More specifically, media art 912*a* is a graphical representation of the second media item and media title 912*b* includes an indication of the title of the second media item.

As illustrated in FIG. 9H, computer system 600 displays current selection indicator 920 within current device control 910*a* to indicate that computer system 600 is the designated computer system outputting (e.g., via one or more speakers) the playback of the second media item. At FIG. 9H, computer system 600 detects tap input 905*h* directed at bedroom television control 910*f*.

At FIG. 9I, in response to detecting tap input 905*h*, computer system 600 causes bedroom television 664 to initiate playback of the second media item. While computer system 600 is connected to both lounge television 662 and bedroom television 664, computer system 600 maintains the ability to control the playback operations of both lounge television 662 and bedroom television 664 while computer system 600 is not positioned within the first room of the hotel. As illustrated in FIG. 9I, because bedroom television 664 plays back the second media item, computer system 600 displays current selection indicator 920 within bedroom television control 910*f* to indicate that bedroom television 664 is the designated computer system outputting (e.g., via one or more speakers) the playback of the second media item.

A period of time elapses between FIG. 9I and FIG. 9J. During the period of time that elapses between FIGS. 9I and 9J, the first room of the hotel is unregistered with computer system 600 (e.g., the user checks out of the hotel) and computer system 600 disconnects from both lounge television 662 and bedroom television 664.

At FIG. 9J, as indicated by the positioning of representation of computer system 600-1 within diagram 602, computer system 600 is positioned within the lobby of the hotel. As illustrated in FIG. 9J, computer system 600 displays device selection user interface 910. At FIG. 9J, a determination is made (e.g., by computer system 600 and/or another computer system) that neither the first room of the hotel (e.g., room 101) or the second room of the hotel (e.g., room 102) is registered with computer system 600 (e.g., no room of the hotel is registered with computer system 600) (e.g., the user has checked out of the hotel). As illustrated in FIG. 9J, based on the determination being made that that neither the first room of the hotel or the second room of the hotel is registered with computer system 600, computer system 600 does not display bedroom television control 910*f* and lounge television control 910*e*. As discussed above, because neither the first room of the hotel or the second room of the hotel are registered with computer system 600, device selection user interface 910 does not include respective controls that correspond to lounge television 662 or bedroom television 664. That is, computer system 600 loses the ability to control the media playback operations of lounge television 662 and bedroom television 664 once the first room of the hotel is unregistered with computer system 600.

At FIG. 9J, as indicated by the display of network indicator 604b within status region 604 computer system 600 remains connected to (and/or reconnects to) the public network of the hotel after the first room (e.g., room 101) and second room of the hotel (e.g., room 102) are unregistered with computer system 600. At FIG. 9J, because computer system is connected to the network of the hotel and the hotel has designated lobby television 668 and business center speakers as public speakers, computer system 600 is able to control the media playback operations of both lobby television 668 and business center speakers 670. Accordingly, as illustrated in FIG. 9J, computer system 600 displays business center speakers control 910c and lobby television control 910d within device selection user interface 910.

FIG. 10 is a flow diagram illustrating a method (e.g., method 1000) for managing media playback operations in accordance with some examples. Some operations in method 1000 are, optionally, combined, the orders of some operations are, optionally, changed, and some operations are, optionally, omitted.

As described below, method 1000 provides an intuitive way for managing media playback operations. Method 1000 reduces the cognitive burden on a user for managing media playback operations, thereby creating a more efficient human-machine interface. For battery-operated computing devices, enabling a user to manage media playback operations faster and more efficiently conserves power and increases the time between battery charges.

In some examples, method 1000 is performed at a computer system (e.g., 600) that is in communication with a display generation component (e.g., a display screen and/or a touch-sensitive display). In some examples, the first computer system is a watch, a phone, a tablet, a processor, a head-mounted display (HMD) device, and/or a personal computing device. In some examples, the first computer system is in communication with one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button).

At 1010, while the computer system (e.g., 600) is positioned at a first location (e.g., 602a, 602b, 602c1, 602c2 and/or 602d) (e.g., a sub-location within an entity (e.g., hotel, airplane, boat, home, and/or office building)) and while a first set of one or more computer systems (e.g., 670, 662, 664, 674, and/or 668) are connected to a network (e.g., a Bluetooth network, a Wi-Fi network, and/or a Ultra-Wideband network), the computer system detects (1010) a first request (e.g., 905b and/or 905d) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) to identify a first output computer system (e.g., 670, 662, 664, 674, and/or 668) (e.g., a speaker, a tablet, a smartphone, a smartwatch, and/or a personal computer) for a first media item (e.g., 912a) (e.g., a music media item and/or a video media item).

At 1020, in response to detecting the first request (905b and/or 905d) to identify the first output computer system (e.g., 670, 662, 664, 674, and/or 668) for the first media item (e.g., 912a), the computer system displays (1020), via the display generation component, a selection user interface (e.g., 910) (e.g., the selection user interface corresponds to a media application that is installed on the computer system or the selection user interface corresponds to a web browser that is installed on the computer system), wherein in accordance with (1030) a determination that the first request (e.g., 905b and/or 905d) to identify the first output computer system (e.g., 670, 662, 664, 674, and/or 668) of the first media item (e.g., 812 and/or 912a) is detected at a first time (e.g., the first time corresponds to a point in time when a set of one or more criteria are is satisfied, the first time corresponds to a point in time when and/or after a user registers with an entity, a point in time when the computer system has been authorized to control the first output computer system, the morning, afternoon, or evening), displaying the selection user interface (e.g., 910) includes displaying a first set of one or more controls (e.g., 910e, 910f, 910c, and/or 910a) that correspond to the first set of one or more computer systems (e.g., 670, 662, 664, 674, and/or 668) and in accordance with (1040) a determination that the first request (e.g., 905b and/or 905d) to identify the first output computer system (e.g., 670, 662, 664, 674, and/or 668) of the first media item (e.g., 812 and/or 912a) is detected at a second time that is different from the first time (e.g., the second time corresponds to a point in time when a set of one or more criteria is not satisfied and the first time corresponds to a point in time when the set of one or more criteria is satisfied, the second time is before the first time, the second time corresponds to a point in time when the computer system does not have authorization to control the first output computer system, the second time is after the first time, the second time is removed by a threshold amount of time (e.g., 1-48 hours) from the first time), displaying the selection user interface (e.g., 910) does not include displaying the first set of one or more controls (e.g., 910e, 910f, 910c, and/or 910a). In some examples, the first set of one or more controls include a textual representation and/or graphical representation of the computer systems included in the first set of one or more computer systems. In some examples, the computer system is not connected to the network when the request to identify the output computer system is detected. In some examples, the computer system displays the selection user interface as overlaid on top of a respective user interface. In some examples, the computer system ceases to display the selection user interface in response to detecting an input (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that does not correspond to the selection user interface. In some examples, the selection user interface includes a respective set of one or more controls in accordance with a determination that the first request to identify the first output computer system is detected at the second time. In some examples, the selection user interface includes a graphical and/or textual representation of the first set of one or more computer systems. In some examples, the selection user interface provides an indication regarding the playback status of the set of one or more computer systems (e.g., what media item the set of one or more computer systems is outputting and/or the volume of the output of the set of one or more computer systems). Displaying the selection user interface with the first set of one or more controls that correspond to the first set of one or more computer systems when the first request is detected at a first time, and displaying the selection user interface without the first set of one or more controls when the first request is detected at a second time different from the first time, enables the computer system to automatically display the first set of one or more controls based on the time the request is received providing a user with additional controls when relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the computer system (e.g., 600) is configured (e.g., the computer system is authorized by an entity, the computer system is automatically authorized based on the satisfaction of criteria (e.g., the location of the computer system, whether a user account that corresponds to the computer system is authorized, whether the computer system is connected to a respective network, and/or whether the computer system stores data that corresponds to authorized credentials)) to control (e.g., control the playback, control the display, and/or control the volume) the first set of one or more computer systems (e.g., 670, 662, 664, 674, and/or 668) at the first time. In some examples, the computer system (e.g., 600) is not configured to control (e.g., control the playback, control the display, and/or control the volume) the first set of one or more computer systems at the second time. In some examples, the computer system transitions from being authorized to control the first set of one or more computer systems to not being authorized to control the first set of one or more computer systems. In some examples, the computer system transitions from being not authorized to control the first set of one or more computer systems to being authorized to control the first set of one or more computer systems. In some examples, the computer system is authorized to control the first set of one or more computer systems at the second time. In some examples, the computer system is not authorized to control the first set of one or more computer systems at the first time. Displaying the selection user interface with the first set of one or more controls when the computer system is configured to control the first set of one or more computer systems, and displaying the selection user interface without the first set of one or more controls when the computer system is not configured to control the first set of one or more computer systems, enables the computer system to automatically display the first set of one or more controls based on the time the request is received providing a user with additional controls when relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, after displaying the selection user interface (e.g., 910) without the first set of one or more controls (e.g., 910e, 910f, 910c, and/or 910a) and while the computer system (e.g., 600) is positioned at the first location (e.g., 602a, 602b, 602c1, 602c2, and/or 602d), the computer system detects, at a third time (e.g., the third time is different and/or distinct from the first time and/or the second time), a second request (e.g., 905b and/or 905d) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) to identify a second output computer system (e.g., 670, 662, 664, 674, and/or 668) (e.g., speaker, tablet, smartphone, smartwatch, and/or personal computer) (e.g., the second output computer system is the same or different from the first output computer system) for a second media item (e.g., 912a) (e.g., the second media item is the same as the first media item or different from the first media item) (e.g., a video media item and/or an audio media item). In some examples, in response to detecting the second request to identify the second output computer system for the second media item, the computer system displays, via the display generation component, the selection user interface (e.g., 910) with the first set of one or more controls (e.g., 910e, 910f, 910c, and/or 910a) that correspond to the first set of one or more computer systems (e.g., 670, 662, 664, 674, and/or 668). In some examples, the third time is before or after the first time. In some examples, the third time is before or after the second time. In some examples, the third time corresponds to a point in time when the user of the computer system is registered with an entity (e.g., the user has checked into a hotel, the user has checked into a flight, or the user has checked into a cruise). Displaying, via the display generation component, the selection user interface with the first set of one or more controls that correspond to the first set of one or more computer systems in response to detecting the second request to identify the second output computer system for the second media item, enables computer system to display the first set of one or more controls based on the time the request is received providing a user with additional controls when relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the computer system (e.g., 600) is connected to the network (e.g., the computer system is connected to the network while the first set of one or more computer systems are connected to the network or the computer system is connected to the network while the first set of one or more computer systems are not connected to the network). In some examples, the computer system is connected to the network while the computer system detects the request to identify the output computer system. In some examples, the computer system is not connected to the network while the computer system detects the request to identify the output computer system.

In some examples, displaying the selection user interface (e.g., 910) includes in accordance with a determination that the first request (e.g., 905b and/or 905d) to identify the first output computer system (e.g., 670, 662, 664, 674, and/or 668) of the first media item (e.g., 912a) is detected at the first time, forgoing displaying a second set of one or more controls (e.g., 910a, 910c, 910e, and/or 910f) that correspond to a second set of one or more computer systems (e.g., 670, 662, 664, 674, and/or 668) (e.g., speaker, tablet, smartphone, smartwatch, and/or personal computer) (e.g., the second set of one or more computer systems is different and/or distinct from the first set of one or more computer systems) (e.g., the first set of one or more computer systems is not included in the second set of one or more computers or the first set of one or more computer is included in the second set of one or more computers) and in accordance with a determination that the first request to identify the first output computer system of the first media item is detected at the second time, displaying the second set of one or more controls (e.g., that is different and/or distinct from the first set of one or more controls) that corresponds to the second set of one or more computer systems (e.g., the second set of one or more computer systems is different and/or distinct from the first set of one or more computer systems). In some examples, the computer system concurrently displays the first set of one or more controls and the second set of one or more controls. In some examples, the first set of one or more computer systems and the second set of one or more computer systems include one or more of the same computer systems. In some examples, the first set of one or more computer systems and the second set of one or more computer systems do not include one or more of the same computer systems. In some examples, the computer system and the second set of one or more computer systems are connected to the same network when the request to identify the output computer system is detected. In some examples, the computer system causes a playback status of the second set of one or more computer systems to change in response to detecting an input (e.g., one or more tap inputs and/or in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to selection of the second set of one or more controls. Displaying the selection user interface with the second set of one or more controls that correspond to the first set of one or more computer systems when the first request is detected at the second time, and displaying the selection user interface without the second set of one or more controls when the first request is detected at the first time, enables the computer system to automatically display the second set of one or more controls based on the time the request is received providing a user with additional controls when relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the first set of one or more computer systems (e.g., 670, 662, 664, 674, and/or 668) and the computer system (e.g., 600) are positioned at the first location (e.g., 602a, 602b, 602c1, 602c2, and/or 602d) (e.g., a sub location (e.g., hotel room, a conference room, and/or a seat on mass transportation of a primary location)) when the first request (905b and/or 905d) to identify the first output computer system (e.g., 670, 662, 664, 674, and/or 668) for the first media item (e.g., 912a) is detected. In some examples, the first location includes a first sub-location and a second sub-location and the first set of one or more computer systems is positioned in the first sub-location and the computer system is positioned in the second sub-location. In some examples, the first set of one or more computer systems and the computer systems are separated by a distance (e.g., 1-100 feet) while the first set of one or more computer systems and the computer system are positioned at the first location. Displaying the selection user interface with the first set of one or more controls when the computer system is positioned at the first location enables the computer system to automatically display the first set of one or more controls based on a location at which the request is received providing a user with additional controls where relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the first set of one or more computer systems (e.g., 670, 662, 664, 674, and/or 668) is positioned at a second location (e.g., 602a, 602b, 602c1, 602c2, and/or 602d) (e.g., a sub location (e.g., hotel room, a conference room, and/or a seat on mass transportation) of a primary location) when the first request (e.g., 905b and/or 905d) to identify the first output computer system (e.g., 670, 662, 664, 674, and/or 668) for the first media item (e.g., 912a) is detected. In some examples, the computer system (e.g., 600) is not positioned at the second location when the first request to identify the first output computer system (e.g., 670, 662, 664, 674, and/or 668) for the first media item is detected. In some examples, the second location is a sub-location within a primary location and the computer system is positioned within the primary location when the request to identify the first output computer system is detected. In some examples, the second location is a sub-location within a primary location and the computer system is not positioned within the primary location when the request to identify the first output computer system is detected. In some examples, the computer system is positioned at the second location when the request to identify the first output computer system is detected. Displaying the selection user interface that does not include the first set of one or more controls when the computer system is positioned at the second location enables the computer system to forgo automatically displaying the first set of one or more controls based on a location at which the request is received to avoid providing a user with additional controls where they are not relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the first time corresponds to a point in time while a registration condition is satisfied (e.g., a user and/or user account corresponding to the computer system checks in for a flight, checks in to a conference, checks in to a hotel, checks in for an appointment, and/or checks in for a cruise) with a first entity (e.g., as discussed above at FIGS. 9D-9E) (e.g., a hotel, a cruise, an airplane, a hospital, a dentist office, and/or a conference). In some examples, the first time corresponds to a point in time before the registration condition ceases to be satisfied (e.g., after a first user unregisters with the first entity). In some examples, the second time corresponds to a point in time while the registration condition is not satisfied (e.g., not yet checked in, checked out, ticket not yet purchased, and/or ticket not yet valid (e.g., travel is scheduled in future) or has expired (e.g., scheduled travel time has passed)). Displaying the selection user interface with the first set of one or more controls when the registration condition is satisfied, enables the computer system to automatically display the first set of one or more controls based on the state of a condition when the request is received providing a user with additional controls when relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the second time corresponds to a point in time while the registration condition is not satisfied (e.g., a user and/or user account corresponding to the computer system leaves a network, checks out of a hotel, checks in for an appointment, and/or checks in for a cruise) with a second entity (e.g., as discussed above at FIGS. 9B and 9C) (e.g., hotel, cruise, airplane, hospital, dentist office, a conference). In some examples, the second time corresponds to a point in time before the second user registers with the second entity. In some examples, the second entity is the same as the first entity. In some examples, the second entity is different from the first entity. Displaying the selection user interface that does not include the first set of one or more controls when the registration condition is not satisfied, enables the computer system to forgo automatically displaying the first set of one or more controls based on the state of a condition when the request is received avoiding providing a user with additional controls when not relevant, thereby providing improved visual feedback to the user, reducing the number of inputs needed to perform an operation, providing additional control options without cluttering the user interface with additional displayed controls, and performing an operation when a set of conditions has been met without requiring further user input.

In some examples, the first time occurs before (e.g., 0.1-160 hours before) the second time. In some examples, the first time occurs after (e.g., 1-160 hours after) the second time.

In some examples, the second time occurs before (e.g., 0.1-160 hours before) the first time. In some examples, the second time occurs after (e.g., 1-160 hours after) the first time.

In some examples, the computer system (e.g., 600) is in communication (e.g., wireless communication (e.g., Bluetooth, Wi-Fi, and/or Ultra-Wideband) and/or wired communication) with a playback computer system (e.g., 670, 662, 664, 674, and/or 668) (e.g., an external speaker, a smartphone, a tablet, a smartwatch, and/or a personal computer) of the first set of one or more computer systems (e.g., 670, 662, 664, 674, and/or 668). In some examples, while the first set of one or more controls (e.g., 910e, 910f, 910c, and/or 910a) are displayed, the computer system detects an input (e.g., 905F and/or 0095h) (e.g., one or more tap inputs and/or in some examples, one or more non-tap inputs, such as an air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, inputs that move the computer system in a particular direction) that corresponds to selection of the first set of one or more controls. In some examples, in response to detecting the input, the computer system causes a playback status of the playback computer system to change (e.g., as discussed at FIGS. 9F-9I) (e.g., initiates playback of a media item, pauses playback of a media item, decreases the volume of the playback computer system, increases the volume of the playback computer, skips to a next media item in a queue and/or restarts the playback of a media item). Causing a playback status of the playback computer system to change, in response to detecting the input, enables the computer system to cause an operation of playback as directed, thereby providing improved feedback and/or performing an operation when a set of conditions has been met without requiring further user input.

Note that details of the processes described above with respect to method 1000 (e.g., FIG. 10) are also applicable in an analogous manner to the methods described herein. For example, method 700 optionally includes one or more of the characteristics of the various methods described above with reference to method 1000. For example, the computer system described in method 700 can connect to one or more external computer systems based on a time when a request to connect to the one or more external computer systems is made. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a media playback experience for users. The present disclosure contemplates that, in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to connect a computer system of the user to external computer systems that are of greater interest to the user. Accordingly, use of such personal information data enables users to have calculated control of the playback operations of various computer systems. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of media streaming services, the present technology can be configured to allow users to select to "opt in" or "opt out" of participation in the collection of personal information data during registration for services or anytime thereafter. In another example, users can select not to provide location data for targeted media playback suggestions. In yet another example, users can select to limit the length of time location data is maintained or entirely prohibit the development of a location profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring media preferences based on non-personal information data or a bare minimum amount of personal information, such as the content being requested by the device associated with a user, other non-personal information available to the media streaming services, or publicly available information.

What is claimed is:

1. A method, comprising:
at a first computer system that is in communication with one or more display generation components and one or more input devices:
   while displaying, via the one or more display generation components, a connect user interface element, detecting, via one or more input devices, an input corresponding to the connect user interface element; and;
   in response to detecting the input corresponding to the connect user interface element:
      in accordance with a determination that a first set of one or more criteria is satisfied, wherein the first set of one or more criteria includes a criterion that corresponds to a first location;
      connecting to a first network; and
      configuring the first computer system to control a first set of one or more computer systems at the first location; and
      in accordance with a determination that a second set of one or more criteria is satisfied, wherein the second set of one or more criteria includes a criterion that corresponds to a second location that is different from the first location;
      connecting to a second network; and
      configuring the first computer system to control a second set of one or more computer systems at the second location, wherein the second set of one or more computer systems is different from the first set of one or more computer systems, and wherein the second set of one or more criteria is different from the first set of one or more criteria.

2. The method of claim 1, further comprising:
performing a third authentication process directed to a respective computer system of the first set of one or more computer systems, wherein:
   in accordance with the respective computer system being a third computer system of the first set of one or more computer systems, configuring the first computer system to control the first set of one or more computer systems includes establishing a trusted relationship between the first computer system and the third computer system; and
   in accordance with the respective computer system being a fourth computer system of the first set of one or more computer systems, establishing a trusted relationship between the first computer system and the fourth computer system.

3. The method of claim 2, further comprising:
while the first computer system is in a trusted relationship with the third computer system and not in a trusted relationship with the fourth computer system, receiving a request to play back media; and
in response to receiving the request to play back media:
   in accordance with a determination that the request to play back media corresponds to the third computer system, causing the third computer system to play back the media; and
   in accordance with a determination that the request to play back media corresponds to the fourth computer system, initiating a fourth authentication process, wherein initiating the fourth authentication process includes causing the fourth computer system to display an authentication user interface.

4. The method of claim 3, wherein the media includes an audio media item or a video media item.

5. The method of claim 3, further comprising:

displaying, via the one or more display generation components, a device selection user interface that includes a first control corresponding to the third computer system and a second control that corresponds to the fourth computer system, wherein determining that the request to play back media corresponds to the third computer system includes detecting an input that corresponds to selection of the first control corresponding to the third computer system, and wherein determining that the request to play back media corresponds to the fourth computer system includes detecting an input that corresponds to selection of the second control that corresponds to the fourth computer system.

6. The method of claim 2, wherein performing the third authentication process directed to the respective computer system, includes detecting an output of the respective computer system.

7. The method of claim 1, further comprising:

in response to connecting the first computer system to the first network, displaying an indication that the first computer system is connected to the first network.

8. The method of claim 7, wherein the indication includes a representation corresponding to one or more computer systems included in the first set of one or more computer systems that the first computer system is configured to control.

9. The method of claim 1, wherein:

the first set of one or more criteria includes a criterion that is satisfied in accordance with a determination that:

the first computer system is positioned at the first location; and the first computer system stores data that corresponds to a first credential for the first location; and the second set of one or more criteria includes a criterion that is satisfied in accordance with a determination that:

the first computer system is positioned at the second location; and the first computer system stores data that corresponds to a second credential for the second location.

10. The method of claim 1, wherein the first set of one or more criteria includes a criterion that is satisfied in accordance with a determination that the first computer system is positioned at the first location, and wherein the second set of one or more criteria includes a criterion that is satisfied in accordance with a determination that the first computer system is positioned at the second location.

11. The method of claim 1, wherein the first set of one or more criteria includes a criterion that is satisfied in accordance with a determination that the first computer system stores data that corresponds to a third credential for the first location, and wherein the second set of one or more criteria includes a criterion that is satisfied in accordance with a determination that the first computer system stores data that corresponds to a fourth credential for the second location.

12. The method of claim 1, wherein the first set of one or more criteria includes a criterion that is satisfied in accordance with a determination that the first computer system performs a first authentication process at the first location, and wherein the second set of one or more criteria includes a criterion that is satisfied in accordance with a determination that the first computer system performs a second authentication process at the second location.

13. The method of claim 1, wherein the first set of one or more computer systems includes a first type of computer system and a second type of computer system different from the first type of computer system, and wherein the second set of one or more computer systems includes the first type of computer system and the second type of computer system.

14. The method of claim 1, wherein the first set of one or more computer systems includes a third type of computer system and a fourth type of computer system and does not include a fifth type of computer system and a sixth type of computer system, wherein the second set of one or more computer systems includes the fifth type of computer system and the sixth type of computer system and does not include the third type of computer system and the fourth type of computer system, and wherein the fifth type of computer system and the sixth type of computer system are both different from the third type of computer system and the fourth type of computer system.

15. The method of claim 1, wherein the first computer system is included in a third set of one or more computer systems that corresponds to a user account, the method further comprising:

in response to detecting the input corresponding to the connect user interface element:

in accordance with a determination that the first set of one or more criteria is satisfied, configuring a fifth computer system of the third set of one or more computer systems to control the first set of one or more computer systems; and in accordance with a determination that the second set of one or more criteria is satisfied, configuring the fifth computer system of the third set of one or more computer systems to control the second set of one or more computer systems.

16. The method of claim 1, further comprising:

in accordance with a determination that a registration condition is no longer satisfied, configuring the first computer system to no longer control the first set of one or more computer systems.

17. The method of claim 1, wherein the criterion of the first set of one or more criteria is satisfied when the computer system reads a first credential of the first location, and wherein the criterion of the second set of one or more criteria is satisfied when the computer system reads a second credential of the second location.

18. The method of claim 1, wherein the first network is the second network.

19. A first computer system that is configured to communicate with one or more display generation components and one or more input devices, comprising:

one or more processors; and memory storing one or more programs configured to be executed by the one or more processors, the one or more programs including instructions for:

while displaying, via the one or more display generation components, a connect user interface element, detecting, via one or more input devices, an input corresponding to the connect user interface element; and;

in response to detecting the input corresponding to the connect user interface element:

in accordance with a determination that a first set of one or more criteria is satisfied, wherein the first set of one or more criteria includes a criterion that corresponds to a first location:

connecting to a first network; and configuring the first computer system to control a first set of one or more computer systems at the first location; and in accordance with a determination that a second set of one or more criteria is satisfied, wherein the second set of one or more criteria includes a criterion that corresponds to a second location that is different from the first location:

connecting to a second network; and configuring the first computer system to control a second set of one or more computer systems at the second location, wherein the second set of one or more computer systems is different from the first set of one or more computer systems, and the second set of one or more criteria is different from the first set of one or more criteria.

20. The first computer system of claim 19, the one or more programs including instructions for:

performing a third authentication process directed to a respective computer system of the first set of one or more computer systems, wherein:

in accordance with the respective computer system being a third computer system of the first set of one or more computer systems, configuring the first computer system to control the first set of one or more computer systems includes establishing a trusted relationship between the first computer system and the third computer system; and in accordance with the respective computer system being a fourth computer system of the first set of one or more computer systems, establishing a trusted relationship between the first computer system and the fourth computer system.

21. The first computer system of claim 20, the one or more programs including instructions for:

while the first computer system is in a trusted relationship with the third computer system and not in a trusted relationship with the fourth computer system, receiving a request to play back media; and in response to receiving the request to play back media:

in accordance with a determination that the request to play back media corresponds to the third computer system, causing the third computer system to play back the media; and in accordance with a determination that the request to play back media corresponds to the fourth computer system, initiating a fourth authentication process, wherein initiating the fourth authentication process includes causing the fourth computer system to display an authentication user interface.

22. The first computer system of claim 21, wherein the media includes an audio media item or a video media item.

23. The first computer system of claim 21, the one or more programs including instructions for:

displaying, via the one or more display generation components, a device selection user interface that includes a first control corresponding to the third computer system and a second control that corresponds to the fourth computer system, wherein determining that the request to play back media corresponds to the third computer system includes detecting an input that corresponds to selection of the first control corresponding to the third computer system, and wherein determining that the request to play back media corresponds to the fourth computer system includes detecting an input that corresponds to selection of the second control that corresponds to the fourth computer system.

24. The first computer system of claim 20, wherein performing the third authentication process directed to the respective computer system, includes detecting an output of the respective computer system.

25. The first computer system of claim 19, the one or more programs including instructions for:

in response to connecting the first computer system to the first network, displaying an indication that the first computer system is connected to the first network.

26. The first computer system of claim 25, wherein the indication includes a representation corresponding to one or more computer systems included in the first set of one or more computer systems that the first computer system is configured to control.

27. The first computer system of claim 19, wherein:

the first set of one or more criteria includes a criterion that is satisfied in accordance with a determination that:

the first computer system is positioned at the first location; and the first computer system stores data that corresponds to a first credential for the first location; and the second set of one or more criteria includes a criterion that is satisfied in accordance with a determination that:

the first computer system is positioned at the second location; and the first computer system stores data that corresponds to a second credential for the second location.

28. The first computer system of claim 19, wherein the first set of one or more criteria includes a criterion that is satisfied in accordance with a determination that the first computer system is positioned at the first location, and wherein the second set of one or more criteria includes a criterion that is satisfied in accordance with a determination that the first computer system is positioned at the second location.

29. The first computer system of claim 19, wherein the first set of one or more criteria includes a criterion that is satisfied in accordance with a determination that the first computer system stores data that corresponds to a third credential for the first location, and wherein the second set of one or more criteria includes a criterion that is satisfied in accordance with a determination that the first computer system stores data that corresponds to a fourth credential for the second location.

30. The first computer system of claim 19, wherein the first set of one or more criteria includes a criterion that is satisfied in accordance with a determination that the first computer system performs a first authentication process at the first location, and wherein the second set of one or more criteria includes a criterion that is satisfied in accordance with a determination that the first computer system performs a second authentication process at the second location.

31. The first computer system of claim 19, wherein the first set of one or more computer systems includes a first type of computer system and a second type of computer system different from the first type of computer system, and wherein the second set of one or more computer systems includes the first type of computer system and the second type of computer system.

32. The first computer system of claim 19, wherein the first set of one or more computer systems includes a third type of computer system and a fourth type of computer system and does not include a fifth type of computer system and a sixth type of computer system, wherein the second set of one or more computer systems includes the fifth type of computer system and the sixth type of computer system and does not include the third type of computer system and the fourth type of computer system, and wherein the fifth type of computer system and the sixth type of computer system are both different from the third type of computer system and the fourth type of computer system.

33. The first computer system of claim 19, wherein the first computer system is included in a third set of one or more computer systems that corresponds to a user account, the one or more programs including instructions for:

in response to detecting the input corresponding to the connect user interface element:

in accordance with a determination that the first set of one or more criteria is satisfied, configuring a fifth computer system of the third set of one or more computer systems to control the first set of one or more computer systems; and in accordance with a determination that the second set of one or more criteria is satisfied, configuring the fifth computer system of the third set of one or more computer systems to control the second set of one or more computer systems.

34. The first computer system of claim 19, the one or more programs including instructions for:

in accordance with a determination that a registration condition is no longer satisfied, configuring the first computer system to no longer control the first set of one or more computer systems.

35. The first computer system of claim 19, wherein the criterion of the first set of one or more criteria is satisfied when the first computer system reads a first credential of the first location, and wherein the criterion of the second set of one or more criteria is satisfied when the computer system reads a second credential of the second location.

36. The first computer system of claim 19, wherein the first network is the second network.

37. A non-transitory computer-readable storage medium storing one or more programs configured to be executed by one or more processors of a first computer system that is in communication one or more display generation components and one or more input devices, the one or more programs including instructions for:

while displaying, via the one or more display generation components, a connect user interface element, detecting, via one or more input devices, an input corresponding to the connect user interface element; and;

in response to detecting the input corresponding to the connect user interface element:

in accordance with a determination that a first set of one or more criteria is satisfied, wherein the first set of one or more criteria includes a criterion that corresponds to a first location:

connecting to a first network; and configuring the first computer system to control a first set of one or more computer systems at the first location; and in accordance with a determination that a second set of one or more criteria is satisfied, wherein the second set of one or more criteria includes a criterion that corresponds to a second location that is different from the first location:

connecting to a second network; and configuring the first computer system to control a second set of one or more computer systems at the second location, wherein the second set of one or more computer systems is different from the first set of one or more computer systems, and wherein the second set of one or more criteria is different from the first set of one or more criteria.

38. The non-transitory computer-readable storage medium of claim 37, the one or more programs including instructions for:

performing a third authentication process directed to a respective computer system of the first set of one or more computer systems, wherein:

in accordance with the respective computer system being a third computer system of the first set of one or more computer systems, configuring the first computer system to control the first set of one or more computer systems includes establishing a trusted relationship between the first computer system and the third computer system; and in accordance with the respective computer system being a fourth computer system of the first set of one or more computer systems, establishing a trusted relationship between the first computer system and the fourth computer system.

39. The non-transitory computer-readable storage medium of claim 38, the one or more programs including instructions for:

while the first computer system is in a trusted relationship with the third computer system and not in a trusted relationship with the fourth computer system, receiving a request to play back media; and in response to receiving the request to play back media:

in accordance with a determination that the request to play back media corresponds to the third computer system, causing the third computer system to play back the media; and in accordance with a determination that the request to play back media corresponds to the fourth computer system, initiating a fourth authentication process, wherein initiating the fourth authentication process includes causing the fourth computer system to display an authentication user interface.

40. The non-transitory computer-readable storage medium of claim 39, wherein the media includes an audio media item or a video media item.

41. The non-transitory computer-readable storage medium of claim 39, the one or more programs including instructions for:

displaying, via the one or more display generation components, a device selection user interface that includes a first control corresponding to the third computer system and a second control that corresponds to the fourth computer system, wherein determining that the request to play back media corresponds to the third computer system includes detecting an input that corresponds to selection of the first control corresponding to the third computer system, and wherein determining that the request to play back media corresponds to the fourth computer system includes detecting an input that corresponds to selection of the second control that corresponds to the fourth computer system.

42. The non-transitory computer-readable storage medium of claim 38, wherein performing the third authentication process directed to the respective computer system, includes detecting an output of the respective computer system.

43. The non-transitory computer-readable storage medium of claim 37, the one or more programs including instructions for:

in response to connecting the first computer system to the first network, displaying an indication that the first computer system is connected to the first network.

44. The non-transitory computer-readable storage medium of claim 43, wherein the indication includes a representation corresponding to one or more computer systems included in the first set of one or more computer systems that the first computer system is configured to control.

45. The non-transitory computer-readable storage medium of claim 37, wherein:

the first set of one or more criteria includes a criterion that is satisfied in accordance with a determination that:
the first computer system is positioned at the first location; and
the first computer system stores data that corresponds to a first credential for the first location; and
the second set of one or more criteria includes a criterion that is satisfied in accordance with a determination that:
the first computer system is positioned at the second location; and
the first computer system stores data that corresponds to a second credential for the second location.

46. The non-transitory computer-readable storage medium of claim 37, wherein the first set of one or more criteria includes a criterion that is satisfied in accordance with a determination that the first computer system is positioned at the first location, and wherein the second set of one or more criteria includes a criterion that is satisfied in accordance with a determination that the first computer system is positioned at the second location.

47. The non-transitory computer-readable storage medium of claim 37, wherein the first set of one or more criteria includes a criterion that is satisfied in accordance with a determination that the first computer system stores data that corresponds to a third credential for the first location, and wherein the second set of one or more criteria includes a criterion that is satisfied in accordance with a determination that the first computer system stores data that corresponds to a fourth credential for the second location.

48. The non-transitory computer-readable storage medium of claim 37, wherein the first set of one or more criteria includes a criterion that is satisfied in accordance with a determination that the first computer system performs a first authentication process at the first location, and wherein the second set of one or more criteria includes a criterion that is satisfied in accordance with a determination that the first computer system performs a second authentication process at the second location.

49. The non-transitory computer-readable storage medium of claim 37, wherein the first set of one or more computer systems includes a first type of computer system and a second type of computer system different from the first type of computer system, and wherein the second set of one or more computer systems includes the first type of computer system and the second type of computer system.

50. The non-transitory computer-readable storage medium of claim 37, wherein the first set of one or more computer systems includes a third type of computer system and a fourth type of computer system and does not include a fifth type of computer system and a sixth type of computer system, wherein the second set of one or more computer systems includes the fifth type of computer system and the sixth type of computer system and does not include the third type of computer system and the fourth type of computer system, and wherein the fifth type of computer system and the sixth type of computer system are both different from the third type of computer system and the fourth type of computer system.

51. The non-transitory computer-readable storage medium of claim 37, wherein the first computer system is included in a third set of one or more computer systems that corresponds to a user account, the one or more programs including instructions for:

in response to detecting the input corresponding to the connect user interface element:

in accordance with a determination that the first set of one or more criteria is satisfied, configuring a fifth computer system of the third set of one or more computer systems to control the first set of one or more computer systems; and in accordance with a determination that the second set of one or more criteria is satisfied, configuring the fifth computer system of the third set of one or more computer systems to control the second set of one or more computer systems.

52. The non-transitory computer-readable storage medium of claim 37, the one or more programs including instructions for:

in accordance with a determination that a registration condition is no longer satisfied, configuring the first computer system to no longer control the first set of one or more computer systems.

53. The non-transitory computer-readable storage medium of claim 37, wherein the criterion of the first set of one or more criteria is satisfied when the computer system reads a first credential of the first location, and wherein the criterion of the second set of one or more criteria is satisfied when the computer system reads a second credential of the second location.

54. The non-transitory computer-readable storage medium of claim 37, wherein the first network is the second network.

\* \* \* \* \*